(12) United States Patent
Chamon et al.

(10) Patent No.: US 12,561,486 B2
(45) Date of Patent: Feb. 24, 2026

(54) SECURELY EXECUTING ON A PUBLIC COMPUTER CODE THAT OPERATES ON ENCRYPTED DATA BASED ON ONE CONTIGUOUS STAGE OF LINEAR 3-BIT GATES AND A DIFFERENT STAGE OF NON-LINEAR GATES

(71) Applicant: USEncryption Inc., Orlando, FL (US)

(72) Inventors: Claudio Chamon, Lexington, MA (US); Jonathan Jakes-Schauer, Orlando, FL (US); Andrei Ruckenstein, Brighton, MA (US)

(73) Assignee: USEncryption Inc., Orlando, FL (US)

( * ) Notice: Subject to any disclaimer, the term of this patent is extended or adjusted under 35 U.S.C. 154(b) by 122 days.

(21) Appl. No.: 18/703,394

(22) PCT Filed: Nov. 1, 2022

(86) PCT No.: PCT/US2022/079084
§ 371 (c)(1),
(2) Date: Apr. 22, 2024

(87) PCT Pub. No.: WO2023/077167
PCT Pub. Date: May 4, 2023

(65) Prior Publication Data
US 2024/0411937 A1      Dec. 12, 2024

Related U.S. Application Data

(60) Provisional application No. 63/274,180, filed on Nov. 1, 2021.

(51) Int. Cl.
*G06F 21/76* (2013.01)
*G06F 21/75* (2013.01)

(52) U.S. Cl.
CPC .............. *G06F 21/76* (2013.01); *G06F 21/75* (2013.01)

(58) Field of Classification Search
CPC ................................ G06F 21/76; G06F 21/75
See application file for complete search history.

(56) References Cited

U.S. PATENT DOCUMENTS

| | | | |
|---|---|---|---|
| 7,734,043 B1 * | 6/2010 | Jefferson | ................. G06F 21/76 380/37 |
| 8,443,205 B2 * | 5/2013 | Kolesnikov | ............ H03K 19/21 380/255 |

(Continued)

FOREIGN PATENT DOCUMENTS

WO      2023/077167 A1      4/2023

OTHER PUBLICATIONS

Bryant, R. E., "Binary Decision Diagrams and Beyond: Enabling Technologies for Formal Verification", Proceedings of IEEE International Conference on Computer Aided Design (ICCAD), Aug. 6, 2002, 8 pages.

(Continued)

*Primary Examiner* — Viral S Lakhia
(74) *Attorney, Agent, or Firm* — Wolter Van Dyke Davis, PLLC; Eugene J. Molinelli

(57) ABSTRACT

Data is encrypted using only first and second stages of only 3-bit gates, that are linear, and non-linear, respectively. Each 3-bit gate for a function is conjugated by the first stage, i.e., straddled with the first stage and its inverse, to form a set of gates that are replaced using a finite set of substitution rules to form an ordered set of daughter gates. The daughter gates are conjugated by the second stage to form for each output bit of each layer of a daughter gate, a binary decision diagram (BDD). A module chip is formed by combining all BDDs for each daughter gate. The obfuscated module is (Continued)

configured by combining the module chips. The obfuscated module is sent to an unsecured device for execution thereon.

30 Claims, 30 Drawing Sheets

(56) References Cited

U.S. PATENT DOCUMENTS

| | | | | |
|---|---|---|---|---|
| 9,705,501 | B2 * | 7/2017 | Muchsel | H03K 19/00315 |
| 9,817,980 | B2 * | 11/2017 | Rajendran | G06F 21/602 |
| 10,439,613 | B2 * | 10/2019 | Karpinskyy | H04L 9/0866 |
| 10,742,406 | B2 * | 8/2020 | Pisasale | H04L 9/0643 |
| 11,356,100 | B2 * | 6/2022 | Vrudhula | G06F 30/347 |
| 11,461,435 | B2 * | 10/2022 | Mucciolo | G09C 1/00 |
| 11,689,352 | B2 * | 6/2023 | Anderson | H04L 9/06 |
| | | | | 380/28 |
| 11,797,736 | B2 * | 10/2023 | Bhunia | G06F 30/327 |
| 12,346,461 | B2 * | 7/2025 | Chamon | G06F 21/72 |
| 12,355,863 | B2 * | 7/2025 | Farrahi Moghaddam | |
| | | | | G09C 1/00 |
| 2009/0214024 | A1 | 8/2009 | Schneider | |
| 2013/0080836 | A1 | 3/2013 | Stergiou et al. | |
| 2014/0013123 | A1 | 1/2014 | Khazan et al. | |
| 2015/0003557 | A1 | 1/2015 | Perry et al. | |
| 2020/0394287 | A1 * | 12/2020 | Mucciolo | H04L 9/06 |

OTHER PUBLICATIONS

Bryant, R. E., "Graph-Based Algorithms for Boolean Function Manipulation", IEEE Transactions on Computers, vol. C-35, Issue 8, Aug. 1986, pp. 677-691.

Cheon, J. H., et al., "Homomorphic Encryption for Arithmetic of Approximate Numbers", Lecture Notes in Computer Science, vol. 1062, Nov. 30, 2017, 23 pages.

Chillotti, I., et al., "TFHE: Fast Fully Homomorphic Encryption Over the Torus", Journal of Cryptology, vol. 33, Apr. 24, 2019, pp. 34-91.

Gentry, C., et al., "Fully homomorphic encryption using ideal lattices", STOC '09: Proceedings of the forty-first annual ACM symposium on Theory of computing, May 31, 2009, pp. 169-178.

Goldwasser, S., et al., "On Best-Possible Obfuscation", Lecture Notes in Computer Science, vol. 4392, 2007, pp. 194-213.

International Preliminary Report on Patentability received for PCT Patent Application No. PCT/US22/79084, mailed on May 16, 2024, 7 pages.

International Search Report and Written Opinion received for PCT Patent Application No. PCT/US22/79084, mailed on Feb. 7, 2023, 8 pages.

Iwama, K., et al., "Transformation rules for designing CNOT-based quantum circuits", DAC '02: Proceedings of the 39th annual Design Automation Conference, Jun. 10, 2002, 6 pages.

Mazonka, O., et al., "Practical Data-in-Use Protection Using Binary Decision Diagrams", IEEE Access, vol. 8, Jan. 28, 2020, pp. 23847-23862.

Regev, O., et al., "On lattices, learning with errors, random linear codes, and cryptography", Journal of the ACM (JACM), vol. 56, Issue 6, May 2, 2009, 37 pages.

Rivest, R. L., "On Data Banks And Privacy Homomorphisms" Massachusetts Institute of Technology, 1978, 11 pages.

Saeedi et al., "Synthesis and Optimization of Reversible Circuits—A Survey", ACM Computing Surveys (CSUR), vol. 45, No. 2, Oct. 12, 2011, 34 pages.

* cited by examiner

PLAINTEXT
n-BIT WORD
422a

LINEAR
INFLATIONARY
STAGE (L) 430

NON-LINEAR
STAGE (N) 440

ENCRYPTED
n-BIT WORD
422b

L LAYER(S) 432

N LAYER(S) 442

PERMUTATION
ENCRYPTION E
420

FUNCTION F
OPERATOR
410

PLAINTEXT
INPUT
Xn-BIT WORD
402a

PLAINTEXT
OUTPUT
X n-BIT WORD
402b

F LAYER(S) 412     FIG. 4B

ENCRYPTED
INPUT
X n-BIT WORDS
422a

ENCRYPTED
OOUTPUT
X n-BIT WORDS
422b

OBFUSCATED
CHIPS
468

BDDS 467

OBFUSCATED D
FUNCTION F$^E$
460

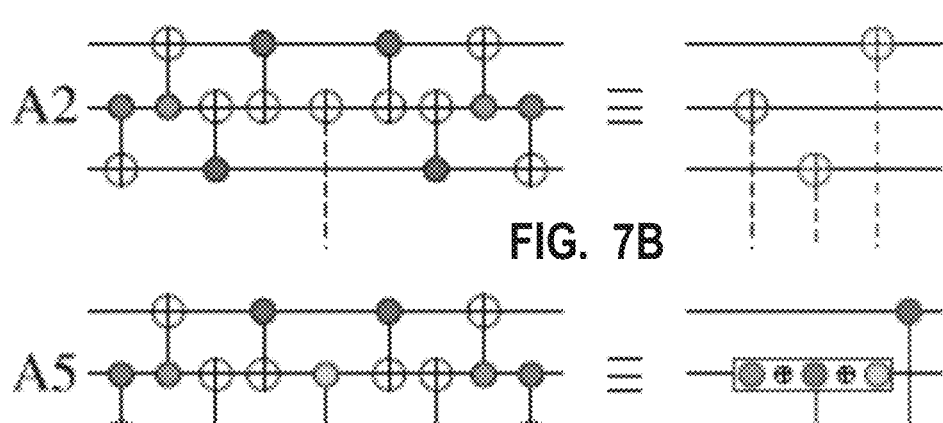
FIG. 7B
FIG. 7E
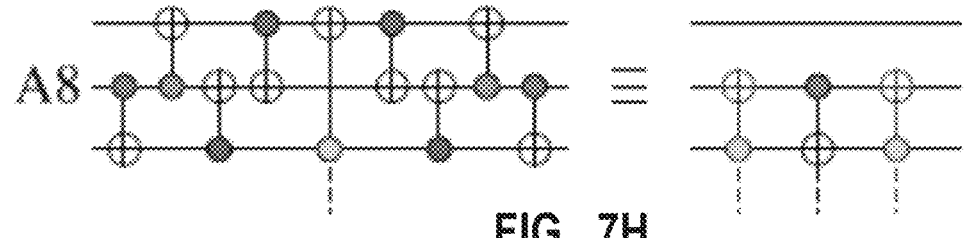
FIG. 7H
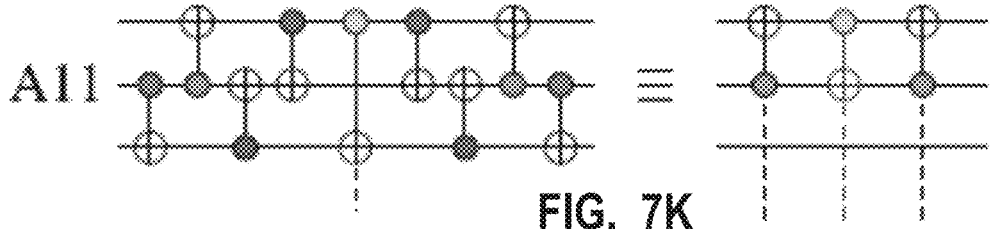
FIG. 7K
FIG. 7N
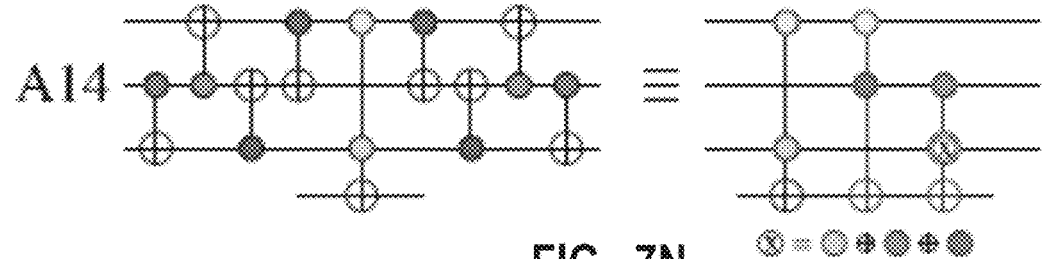
FIG. 7Q

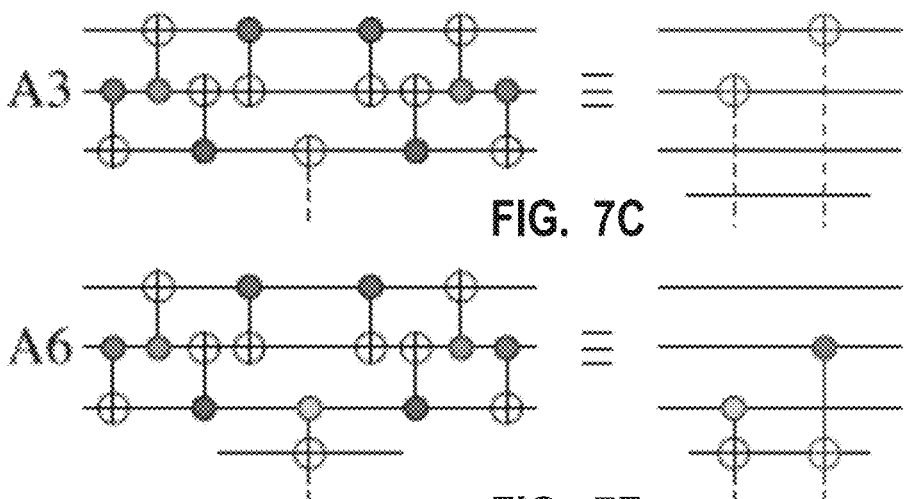
A3
FIG. 7C
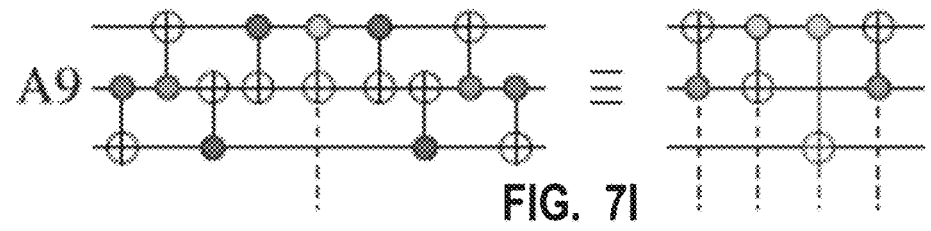
A6
FIG. 7F
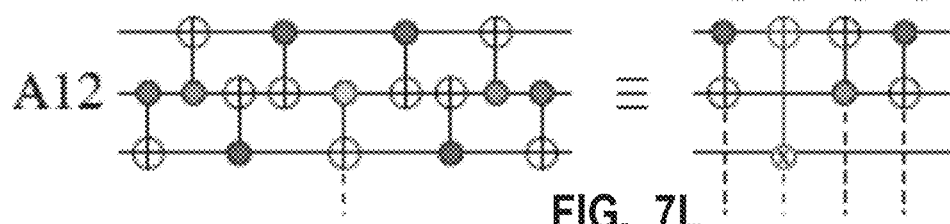
A9
FIG. 7I
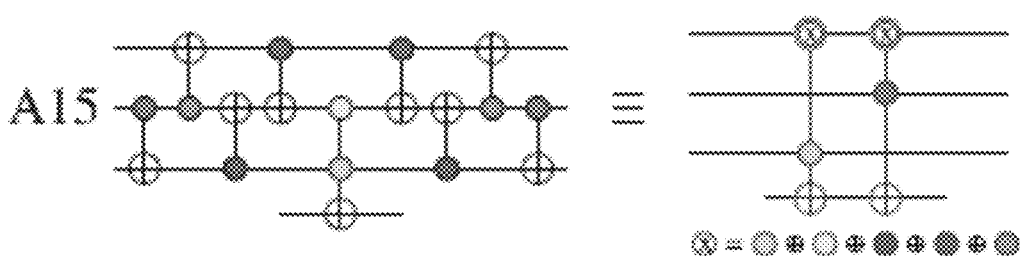
A12
FIG. 7L
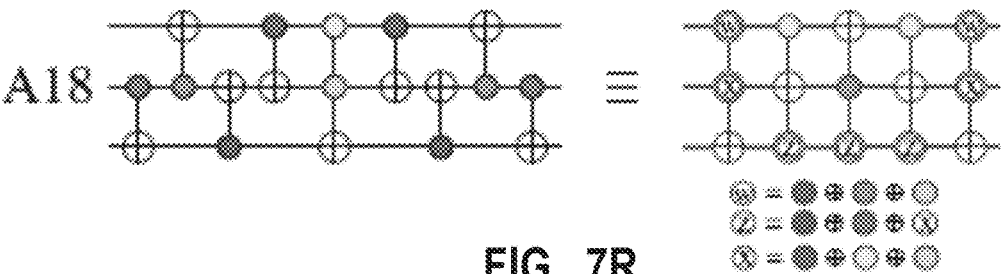
A15
FIG. 7O
A18
FIG. 7R

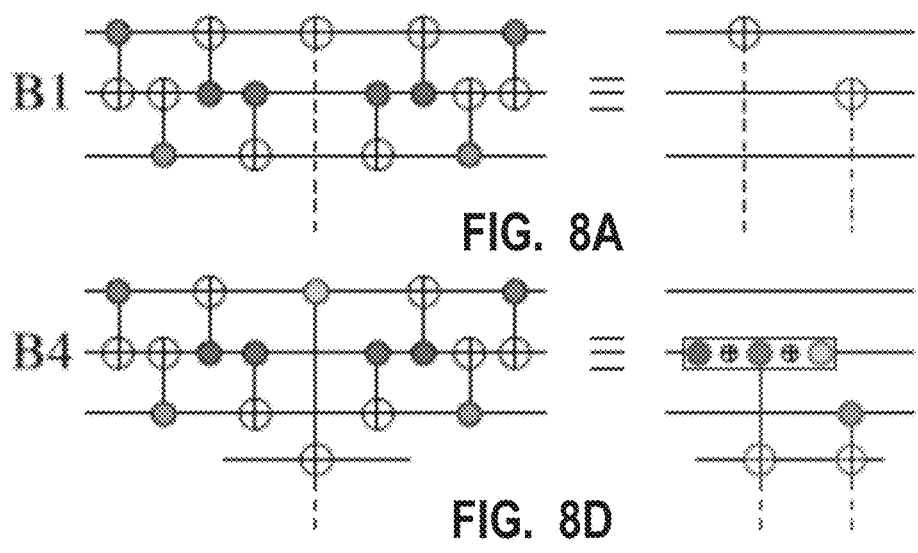
B1
FIG. 8A
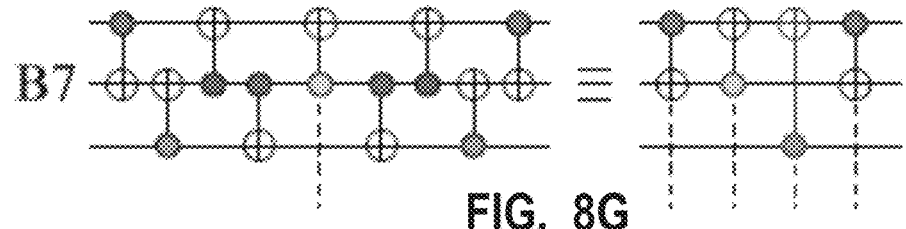
B4
FIG. 8D
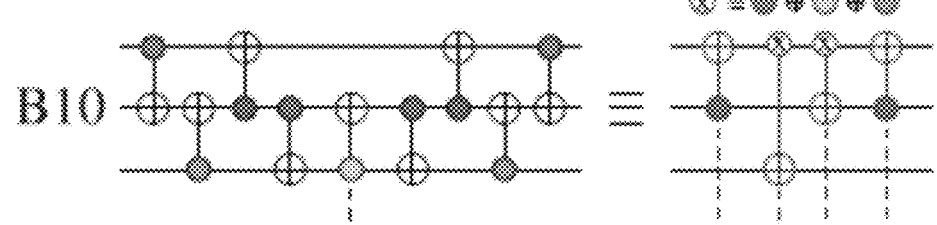
B7
FIG. 8G
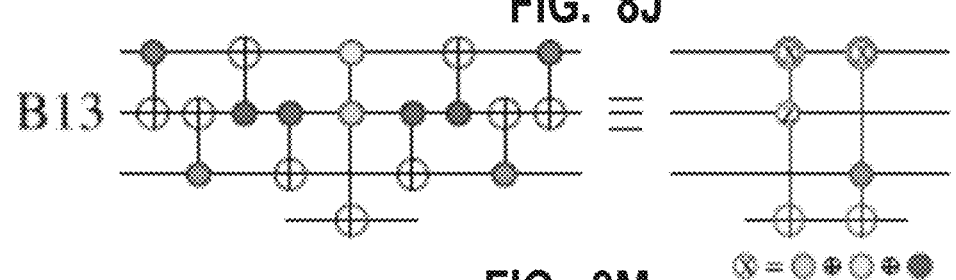
B10
FIG. 8J
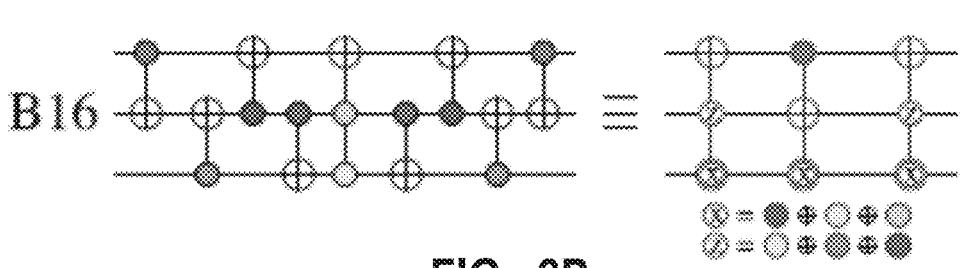
B13
FIG. 8M
B16
FIG. 8P

C1

C4

C7

C10

C13

C16

C2

C5

C8

C11

C14

C17

C3

C6

C9

C12

C15

C18

D1

D4

D7

D10

D13

D16

D2

D5

D8

D11

D14

D17

D3

D6

D9

D12

D15

D18

SECURELY EXECUTING ON A PUBLIC COMPUTER CODE THAT OPERATES ON ENCRYPTED DATA BASED ON ONE CONTIGUOUS STAGE OF LINEAR 3-BIT GATES AND A DIFFERENT STAGE OF NON-LINEAR GATES

CROSS-REFERENCE TO RELATED APPLICATIONS

This application is a 371 National Stage Application of PCT Application No. PCT/US22/79084, filed Nov. 1, 2022, and claims benefit under 35 U.S.C. § 119(c) of Provisional Appln. 63/274,180, filed Nov. 1, 2021, the entire contents of which are hereby incorporated by reference as if fully set forth herein.

BACKGROUND

It is often convenient to keep data confidential from the public by encrypting the data and storing the encrypted data using powerful public resources such as cloud data storage and cloud computing. However, when the amount of data so stored is very large, e.g. on the order of Terabits (Tb, 1 $Tb=10^{12}$ bits), some efficiency is lost if a large fraction of the encrypted data has to be returned to a local secure processor for processing. Similarly, if the operation involves tremendous computational resources, even on relatively little data, it would be advantageous to run on powerful public resources, such as cloud processors, rather than on a secure computer of relatively limited computing power. Yet, to decrypt the data, a processor on the powerful public resources exposes the encryption method and reveals the underlying data.

Logic gates are well known for performing Boolean logic, including permutation encryption applications and implementation of various types of computer code. According to Wikipedia at the time of writing, "A logic gate is an idealized or physical device implementing a Boolean function, a logical operation performed on one or more binary inputs that produces a single binary output. Depending on the context, the term may refer to an ideal logic gate, one that has for instance zero rise time and unlimited fan-out, or it may refer to a non-ideal physical device. Logic gates are primarily implemented using diodes or transistors acting as electronic switches, but can also be constructed using vacuum tubes, electromagnetic relays (relay logic), fluidic logic, pneumatic logic, optics, molecules, or even mechanical elements. Now, most logic gates are made from MOS-FETs (metal-oxide-semiconductor field-effect transistors). With amplification, logic gates can be cascaded in the same way that Boolean functions can be composed, allowing the construction of a physical model of all of Boolean logic, and therefore, all of the algorithms and mathematics that can be described with Boolean logic. Logic circuits include such devices as multiplexers, registers, arithmetic logic units (ALUs), and computer memory, all the way up through complete microprocessors, which may contain more than 100 million logic gates. Compound logic gates AND-OR-Invert (AOI) and OR-AND-Invert (OAI) are often employed in circuit design because their construction using MOSFETs is simpler and more efficient than the sum of the individual gates. In reversible logic, Toffoli or Fredkin gates are used." Gates can also be implemented in physical devices such as field programmable gate arrays and quantum computers.

Boolean logic accepts a 0 or 1 at each bit in an n-bit input word and outputs either a 0 or a 1 at each bit in an output word of one or more bits. The CNOT gate is a 2-bit gate that flips the second bit (the target bit) if and only if the first bit (the control qubit) is 1 (TRUE). Linear gates satisfy $g(x\oplus y)=g(x)\oplus g(y)\oplus c$, where the symbol $\oplus$ indicates an exclusive OR and c is a constant, for any input values x and y. Nonlinear gates do not satisfy this condition. Linear inflationary gates further have the property that, for any input state, flipping one input bit flips at least 2 output bits. Thus, linear non-inflationary gates further have the property that, for any input state, flipping one input bit does not always flip more than one output bit.

The result of a series of Boolean logic gates at an output bit can be represented by a graph implemented in a data structure called a binary decision diagram (BDD). Fundamentally, a Boolean function can be represented as a rooted, directed, acyclic graph, which consists of several (decision) nodes and two terminal nodes. The two terminal nodes are labeled 0 (FALSE) and 1 (TRUE). Each decision node is labeled by a Boolean variable which can have one of the two binary values 0 or 1. Each decision node has two child nodes called low child and high child. The edge from node to a low (or high) child represents an assignment of the value FALSE (or TRUE, respectively) to the variable. Such a BDD is called 'ordered' if different variables appear in the same order on all paths from a root node. A BDD is said to be 'reduced' if the following two rules have been applied to its graph: Merge any isomorphic subgraphs. Eliminate any node whose two children are isomorphic. In popular usage, the term BDD almost always refers to Reduced Ordered Binary Decision Diagram (ROBDD in the literature, used when the ordering and reduction aspects are emphasized). The advantage of an ROBDD is that it is canonical (unique) for a particular function and variable order. This property makes it useful in functional equivalence checking and other operations like functional technology mapping. A path from the root node to the 1-terminal represents a (possibly partial) variable assignment for which the represented Boolean function is true. As the path descends to a low (or high) child from a node, then that node's variable is assigned to 0 (respectively 1).

All the binary Boolean operators on ROBDDs are implemented by the same general algorithm APPLY that for two ROBDDs computes the ROBDD for the Boolean expression of an operation between the first and the second. COMPOSITION is the ROBDD operation performing the equivalent of substitution on Boolean expression.

As used herein, gates refer to a physical device that enforces a Boolean function at one or more bits in an n-bit register (also called an n-bit word herein), or code indicating such a physical device. The output of the gate may be placed in the same input register or different output or intermediate temporary register.

SUMMARY

Techniques are provided for secure processing of encrypted data on unsecured but potentially powerful public resources using permutation encryption based on separated linear 3-bit gates and non-linear 3-bit gates. These techniques take advantage of properties of linear 3-bit gates to simplify the results of obfuscation, including reducing the size of obfuscated circuits, compared to the results obtained in previous approaches. As used herein a chip is a data structure that stores data that indicates the Boolean logic to generate binary values for a set of output bits based on values for a set of input bits. The data structure is organized to store multiple ROBDDs.

In a first set of embodiments, a method executing on a first (e.g., local and secure) processor includes configuring a permutation encryption module for n-bit words which module includes only a first stage and a second stage. The first stage can be decomposed into only linear 3-bit gates. The second stage can be decomposed into k-bit gates including at least one non-linear k-bit gate, wherein k is not less than 3. The method further includes; receiving first data that indicates a first function to be implemented as a first obfuscated module operating on and producing only encrypted data formed according to the permutation encryption module. Furthermore, the method includes configuring the first obfuscated module. This latter configuring includes determining a first set of 3-bit gates that implement the first function. This latter configuring also includes straddling each gate in the first set with the first stage in reverse order and the first stage to form a linear expanded set of gates (i.e., a set of gates expanded with linear gates). This latter configuring further includes replacing the linear expanded set of gates using a finite set of substitution rules to form an ordered set of daughter gates. This latter configuring still further includes concatenating the ordered set of daughter gates produced for each gate in the first plurality. Even further still, this configuring includes straddling each gate in the concatenated ordered set of daughter gates with the second stage in reverse order and the second stage to form a non-linear expanded set of gates (i.e., a set of gates expanded with non-linear gates) for each daughter gate. This latter configuring still further yet includes, for each output bit of the non-linear expanded set of gates for each daughter gate form a binary decision diagram (BDD) that indicates a value based on the bits input to the non-linear expanded set of gates for each daughter gate. This latter configuring includes in addition generating a module chip by combining all BDDs. This latter configuring includes in further addition configuring the first obfuscated module by including the chip. The method still further yet includes sending to an unsecured device the first obfuscated module for execution by the unsecured device.

In some embodiments of the first set, the first stage is decomposed into only one or more of 144 inflationary linear 3-bit gates. In some of these embodiments, each inflationary linear 3-bit gate in the first stage is further decomposed into a set of three or four 2-bit CNOT gates.

In some embodiments of the first set, the first stage includes separate layers each layer comprising only a set of contiguous gates that can act in parallel. In some of these embodiments, it is advantageous to fully pack a layer, so that a layer of gates cover most or all of the bits in the n-bit word. For example in the case in which n is a multiple of 3, a fully-packed layer contains n/3 3-bit gates. In some of these embodiments, the number of layers in the first stage is on the order of $\log_2$ n to balance security with size of the resulting obfuscated module.

In some embodiments of the first set, said configuring the first obfuscated module further includes, for the non-linear expanded set for each daughter gate, collect successively each layer of contiguous gates that can be operated in parallel in the second stage. Then, said forming a binary decision tree (BDD) also includes forming a BDD for each bit in each layer. Said generating a module chip by combining all BDDs then includes generating a module chip by combining all BDDs for all layers of each daughter gate. Said configuring the first obfuscated module then further includes incorporating the module chip for each daughter gate.

In some embodiments of this latter set, the number of layers in the second stage is on the order of $\log_3$ n to balance security with size of the resulting obfuscated module. In some embodiments of that set, complimentary pairs of logical identities, such as pairs of NOT gates, are inserted, respectively, into corresponding randomly chosen bits of successive levels of iteration through the layers of the second stage. For example, a NOT gate is added to one output bit of the non-linear expanded bits of one daughter gate and a second NOT gate is at a corresponding input bit of the non-linear expanded bits of a successive daughter gate. The iterative addition of random pairs of NOT gates in between successive processing steps with layers of the second stage injects randomness into the obfuscated module of each daughter gate and thus injects further randomness into the obfuscated module.

In some embodiments of the first set, steps b, c and d are repeated for a second different function to be implemented as a second obfuscated module operating on and producing only encrypted data formed according to the permutation encryption module.

In other sets of embodiments, a computer readable medium or a system is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 4B is a block diagram that illustrates an example circuit that implement an arbitrary function F on one or more words of plaintext data, according to an embodiment;

FIG. 7A through FIG. 7R are block diagrams that illustrate rules for conjugation with the inflationary gates in class A of FIG. 6, according to an embodiment;

DETAILED DESCRIPTION

Figure 1:
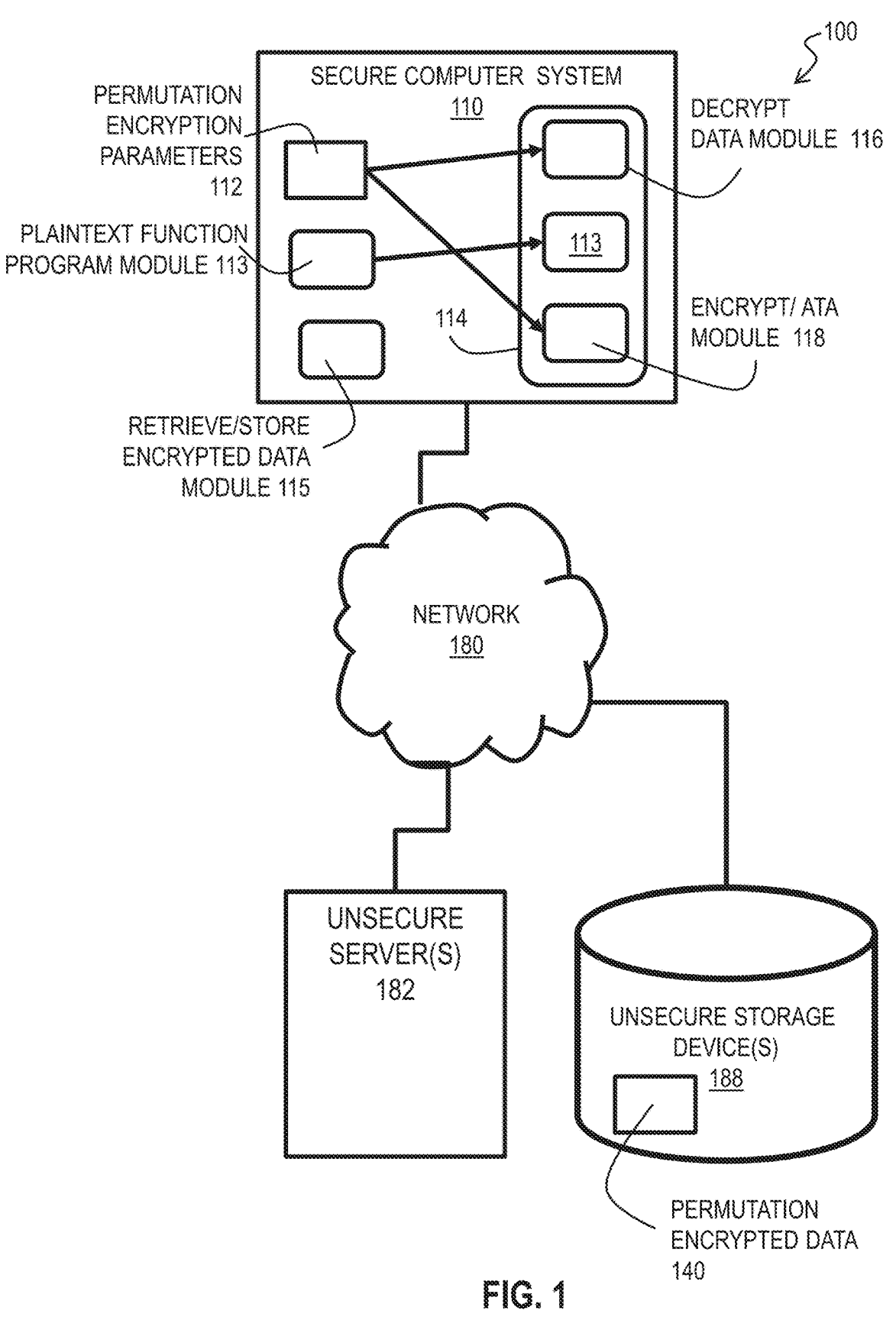
FIG. 1 is a block diagram that illustrates an example system for using encrypted data that is stored on a public resource.

A method and system are described for securely processing encrypted data on public resources, e.g., to take advantage of superior processing power, efficiency or resilience, or some combination, on the public resources, such as the cloud. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of certain example functions and example 3-bit gates and example options for conjugating gates. However, the invention is not limited to this context. In other embodiments, other functions and 3-bit gates and replacement strategies are employed that follow the methods described herein. For example, an asymmetric encryption extension is enabled by a choice of probabilistic encryption (an encryption scheme that has multiple ciphertexts that represent the same plaintext) in combination with the access to addition and multiplication operations on encrypted data. For example, the cipher can be substantially shortened if probabilistic encryption is employed. Explicitly, if $m=n-p$ of the n input bits are (randomly chosen) random padding bits, the depth of the linear stage L of the cipher E can be reduced to $O(1)$ if m and p are of the same order, thus eliminating the polynomial overhead associated with conjugation by inflationary gates. Moreover, the same probabilistic encryption allows EOC to be extended to asymmetric encryption, where a public key can be chosen to be any of the $2^m$ encryptions of 1. (An encryption of 1 allows for the encryption of any number, given access to the addition and multiplication operators).

In some embodiments, one or more stages include 4-bit gates and larger gates. In particular the non-linear stage, described below, can include one or more 4-bit gates and 5-bit gates and higher bit gates, i.e., k-bit gates where k is not less than 3, all of which can be adequately expressed as BDDs, and thus do not require new conjugation rules.

Some embodiments are described in the context of cloud processing of encrypted data. By keeping data encrypted at all times even while being processed, data owners can consider trusting third parties with their most confidential data, in encrypted format, to process and extract value without ever decrypting it. Since the owners keep control over how the data gets used and how the results get decrypted, data can now be treated as a service and no longer has to be treated as an asset. As an asset and unprotected, there is a clear trade-off between utilizing confidential data and keeping it private: one typically can have either one or the other. But as a service and encrypted, a service provider can achieve both: a customer can extract value from confidential data, while encrypted, with privacy and security—for instance to train machine learning models using encrypted data or to combine proprietary encrypted data with other public datasets to make decisions and execute on a marketing campaign.

Thus advantages of various embodiments include: (i) allowing data to stay encrypted at all times (in storage, in transit, and in use), helping to protect confidential data and build trust to migrate it to the cloud; and (ii) unlocking opportunities to share or monetize confidential data as a service with full privacy, powered by encryption and never compromising the unencrypted data, through encrypted data as a service.

For example, in the case of health care, it is valuable to combine and research different sets of confidential data from health care providers, research institutions and pharmaceutical companies to investigate patterns and find treatment or cures for diseases, without compromising the privacy and security of patients' data. Similar use cases can be found in a wide range of industries and companies that already rely on data for new discoveries and business decisions, or could do so more effectively if they could have access to certain confidential data that is not publicly or commercially available. These industries range from financial and insurance services to health care and manufacturing to the military and government intelligence.

In addition, by providing obfuscated modules of various original operators that operate on and produce encrypted data, more complex operations can be performed by stringing together the original operators without having to generate a new obfuscated module for the more complex operation. Thus, each obfuscated module produced by the techniques disclosed herein can be assembled into a library of obfuscated modules that can be used to build more complex operations.

1. OVERVIEW

FIG. 1 is a block diagram that illustrates an example system for using encrypted data that is stored on a public resource. Encrypted data 140 is stored on one or more unsecure storage devices 188. In the illustrated embodiments, the encrypted data 140 is encrypted using permutation encryption. In permutation encryption, a plaintext n-bit word is changed to a ciphertext n-bit word by changing the positions and values of the bits from the plaintext to the positions and values in ciphertext in a prescribed manner called the permutation key. The ciphertext is the permutation encrypted data 140. Each n-bit plaintext word is directed to an n-bit ciphertext word. No two different n-bit plaintext words end up as the same n-bit ciphertext word. By knowing the permutation key, the ciphertext can be converted back to the plaintext and used in computations. The number of possible permutations is $2^n!$, so, the larger the number of bits n in each n-bit ciphertext, the more secure is the encrypted data 140.

One or more unsecure servers 182 may have access to the unsecure storage device 188, either directly or through unsecure communications network 180. Without access to the permutation key, these servers 182 and devices in network 180 do not have access to the plaintext. A secure computing system 110 may also have access to the unsecure storage device 188, e.g., through any method known in the art, such as a firewall (not shown). The secure computer system 110 is subject to physical and communication control of an authorized user of the plaintext corresponding to the ciphertext in encrypted data 140. The permutation key, comprising one or more permutation encryption parameters in data structure 112, is known to the users of secure computer system 110.

While there may be more computational power or efficiency if the encrypted data were to be used in processing on one or more unsecure servers 182, current methods are not known to avoid disclosing the permutation key comprising data 112 to any process operating on the unsecure server 182 or network 180. Thus, a user of encrypted data 140 is generally constrained to retrieve some or all the encrypted data 140 from the unsecure storage device 188 through the network 180 for at least temporary local storage on the secure system 110. This retrieval process is performed by the retrieve/store encrypted data module 115 and takes care of identifying which encrypted data to retrieve. If the retrieval criteria depends on information stored as ciphertext, then much data, e.g., most bits in each of one or more n-bit cyphertext word, is transmitted and stored locally that is not needed for the function to be performed.

The function to be performed on the plaintext is represented by the plaintext function program module 113. A different module 114 performs the processes of decrypting the ciphertext (using module 116), operating on the plaintext (using module 113), and encrypting the result using module 118. Both module 116 and module 118 depend on the encryption parameters 112. The module 115 then stores the encrypted result back on the unsecure storage device 188. If the storage location depends on information stored as ciphertext, then much data that is not changed by the plaintext function of module 113 is transmitted over the network 180 and stored on the unsecure device 188. For example, if you want to retrieve persons who have social security numbers (SSNs) beginning with "123", then you have to decrypt the SSN before you can determine if you want to operate on the data. Since you can't do that on the non-secure device, you have to bring all the data to the local device, decrypt at least the SSN of all, and then operate on the desired data, a small subset of the data you downloaded.

Here is presented a different paradigm referred to as Encrypted-Operator Computing (EOC), in which operations are carried out on encrypted data via an encrypted program based on reversible computation, without any addition of noise to the data. Reversible logic allows formulations of computation on encrypted data in terms of operators (gates) in a transformed frame acting on transformed state vectors (data). The change of frame hides information about both the operators (the program) and the state (the data).

2. CIRCUITS OF 3-BIT GATES

It is here observed that: 1) permutation encryption can be implemented by a sequence of one or more 3-bit gates; 2) functions that map inputs one-to-one to outputs can also be implemented by a sequence of one or more 3-bit gates or larger (for purposes of illustration, it is assumed that function program module 113 implements such a bijective function); and, 4) because there is more than one set of gates that produce the same output for the same input, the decryption, plaintext function and encryption gates can be replaced by a different sequence of executable instructions corresponding to gates that do not correspond directly to the decryption, plaintext function and encryption operations. Thus, those operations are obfuscated. An obfuscated code or device (called module herein) to implement the different sequence of gates can be generated that does not reveal those operations. Thus, the obfuscated module can be sent for operation on the unsecure servers 182 or other device, unlike the prior art system of FIG. 1. Such code can take advantage of any computing power or efficiencies or resilience of the unsecure servers 182 and unsecure devices 188 without divulging the permutation key. A series of gates is also called a circuit herein. Thus, a program that performs an intended function on the data is converted into a description in terms of gates, as in the circuit model of computation. The logic gates are then expressed in terms of one or more executable instructions that could safely be executed by the unsecured server 182.

Figure 2A:
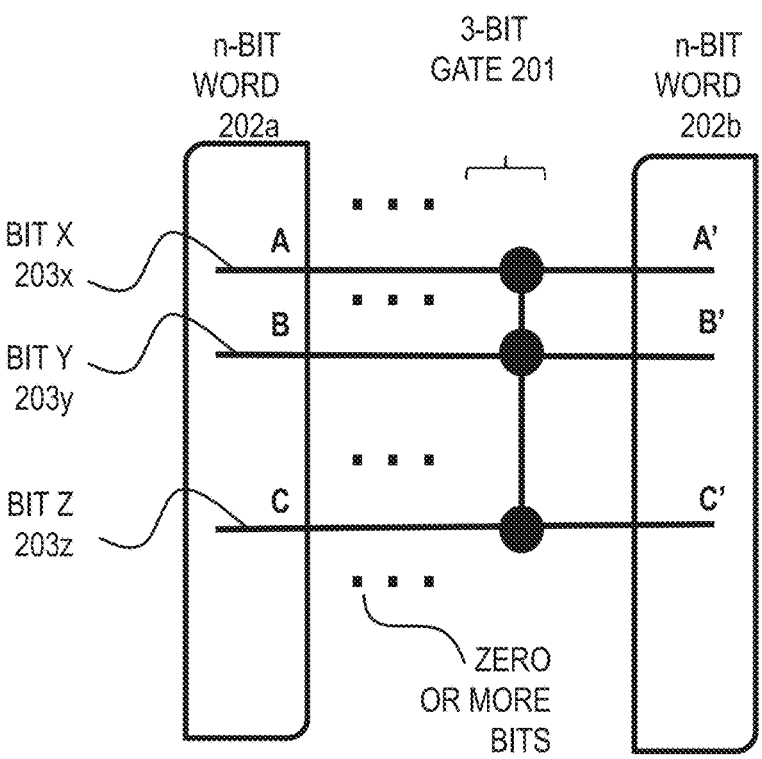
FIG. 2A is a block diagram that illustrates an example 3-bit gate operating on an n-bit word, according to an embodiment.

FIG. 2A is a block diagram that illustrates an example 3-bit gate 201 operating on an n-bit word, according to an embodiment. Three bit locations from an input n-bit word 202a, represented by bit X 203x, bit Y 203y and bit Z 203z, separated or preceded or followed by zero or more bit locations represented by ellipses, are passed into the reversible 3-bit gate 201. The results are passed to the next or output n-bit word 202b in the same three-bit locations. But the contents at one or more of those three bit locations may have been changed. In a control gate, only one of the three bits (the target bit) may be changed and the other two are unchanged, so if Z is the target bit, only two results are possible: C unchanged ABC; and C changed ABC'.

Figure 2B:
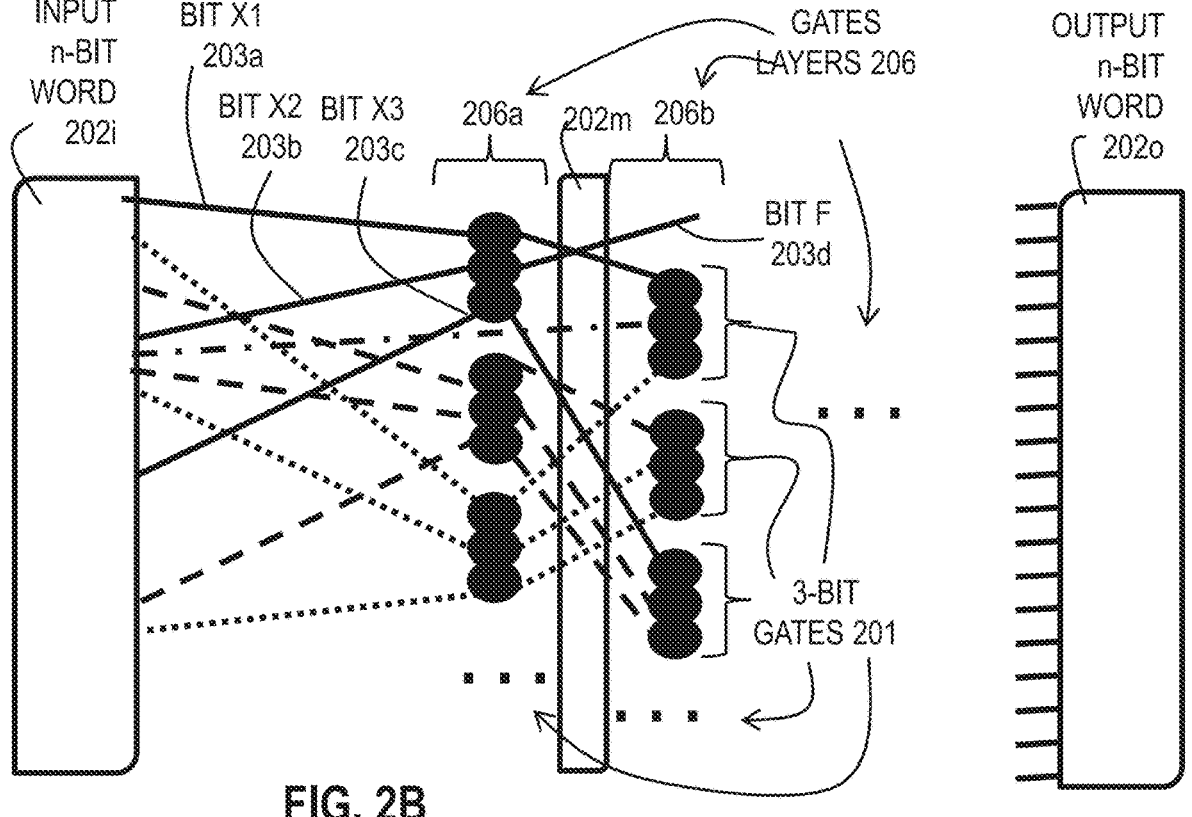
FIG. 2B is a block diagram that illustrates an example set of 3-bit gates in two layers operating on an n-bit word, according to an embodiment.

FIG. 2B is a block diagram that illustrates an example set of 3-bit gates 201 in two layers 206 operating on an n-bit word 202i, according to an embodiment. Multiple 3-bit gates 201 operate on an input n-bit word 202i to produce an output n-bit word 202o. Here, for convenience, a 3-bit gate 201 is represented as an integral stack of three overlapping filled circles, one filled circle for each bit. Because the three bits of the gate are not separated in this diagram, the bit lines, in general, are not horizontal—but are slanted to connect 3 bits in the input word 202i to the three bits of each gate 201. The bit lines for the top left 3-bit gate 201 are represented by solid lines, for the middle left 3-bit gate 201 by dashed lines, and for the bottom left 3-bit gate 201 by dotted lines. Additional gates 201, if any are indicated by ellipsis below the bottom left 3-bit gate 201. These gates may be operated in parallel as long as none has an input bit that is changed (because these are binary bits, a change means a bit value is flipped between 0 and 1) by another gate operated in parallel. Unless it is known what gates flip which bit lines, it is safest to avoid reusing the same bit line for more than one gate in parallel. All the gates that can be operated in parallel are said to be in a layer of gates, e.g., gates layer 206. Thus, in some embodiments, each layer 206 includes only a set of contiguous gates that can be operated in parallel, e.g., contiguous gates that do not repeat any input bit of an n-bit word input to the layer.

Not all bits in an n-bit input word 202i are necessarily input to a gate in a layer for an arbitrary operation. An example of a bit line not operated on by the gates in the leftmost layer 206a is indicated by a dot-dashed line.

Before gates from a different layer can operate, the outputs of these gates are advantageously provided to a temporary, intermediate or output n-bit word 202m such as a local register. The output of each bit is placed into 202m at the original position of that bit in the n-bit word 202i, but to avoid congestion a bit line showing such a placement is not drawn in FIG. 2B.

Another layer 206b of 3-bit gates 201, if any, is drawn immediately to the right of n-bit word 202m and any additional intermediate n-bit words 202 and layers 206 are indicated by the ellipsis between layer 206b and n-bit word 202o. As can be seen in FIG. 2B a bit belonging to a gate in one layer 206a can be a member of a different gate in a different layer 206b.

Figure 2C:
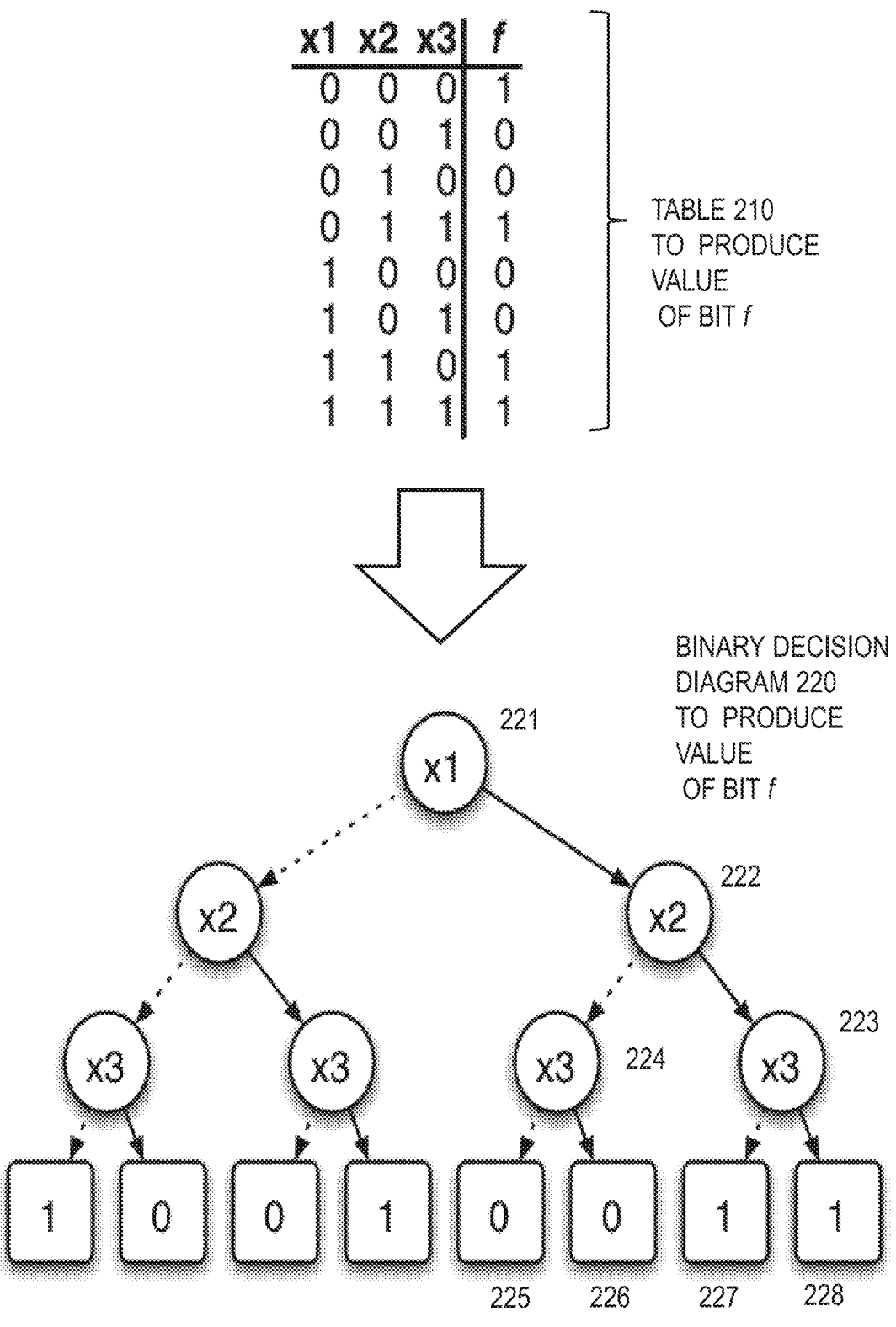
FIG. 2C is a block diagram that illustrates an example binary decision tree (BDD) that describes the operation of an arbitrary 3-bit gate for one output bit.

FIG. 2C is a block diagram that illustrates an example binary decision tree (BDD) that describes the operation of an arbitrary 3-bit gate for one output bit. A BDD can be used to represent any output from an input for any gate of any size. For simplicity sufficient to demonstrate the concept, a single output bit (f) based on the values of three input bits x1, x2, x3 is illustrated. This for example, describes, the output bit f 203d of the top 3-bit gate in layer 206a based on input bits x1 203a, x2 203b, and x3 303c.

Table 210 lists the value on bit f based on the values in bits x1, x2 and x3. All possible combinations of values for the three input bits are listed in the columns for x1, x2, x3. Any arbitrary output can be described by changing the values in column f of Table 210.

BDD 220 is an acyclic graph which uses any of the input bits as a root node, here going in order from x1 to x2 to x3 for simplicity. Every node represented by a circle has two edges proceeding downward, a solid edge for a TRUE value (e.g., 1) at the node and a dotted edge for a FALSE value (e.g., 0) at that node. The graph terminates at a box with a value. Every different combination of values for x1 and x2 and x3 is represented. For example, if x1=1, x2=1, and x3=1, then one transits the graph from x1 node 221 along solid arrow to x2 node 222 along solid arrow to x3 node 223 along solid arrow to a boxed value 228 indicating a 1, in agreement with the value of f in Table 210. The BDD can be reduced by eliminating nodes and edges that do not make a difference to the final value. For example, nodes 223 and 224 and the four boxed values 225, 226, 227, 228 descending therefrom can be reduced to a boxed value 225 (equal to 0) for a dotted arrow from 222 and a boxed value 228 (equal to 1) for a solid arrow from node 222. This is because when x1=1, it doesn't matter what x3 equals according to Table 210.

Table 210 can be implemented as a set of 3-bit gates in a layer. In general, any layer of 3-bit gates can be represented as a set of BDDs like BDD 220 depicted in FIG. 2C, one BDD 220 for each output bit of the layer that can be flipped by the layer. Further generalized, any layer of gates of any size can be represented by a BDD. Different layers can be combined in a BDD by replacing each of one or more nodes of one layer with a BDD for the nodes in a previous layer contributing to the node replaced. Similarly, any set of BDDS can be implements as a set of gates in one or more layers of gates in a circuit connecting an input n-bit word 202i to an output n-bit word 202o, as depicted in FIG. 2B.

3. SYSTEM

Figure 3:
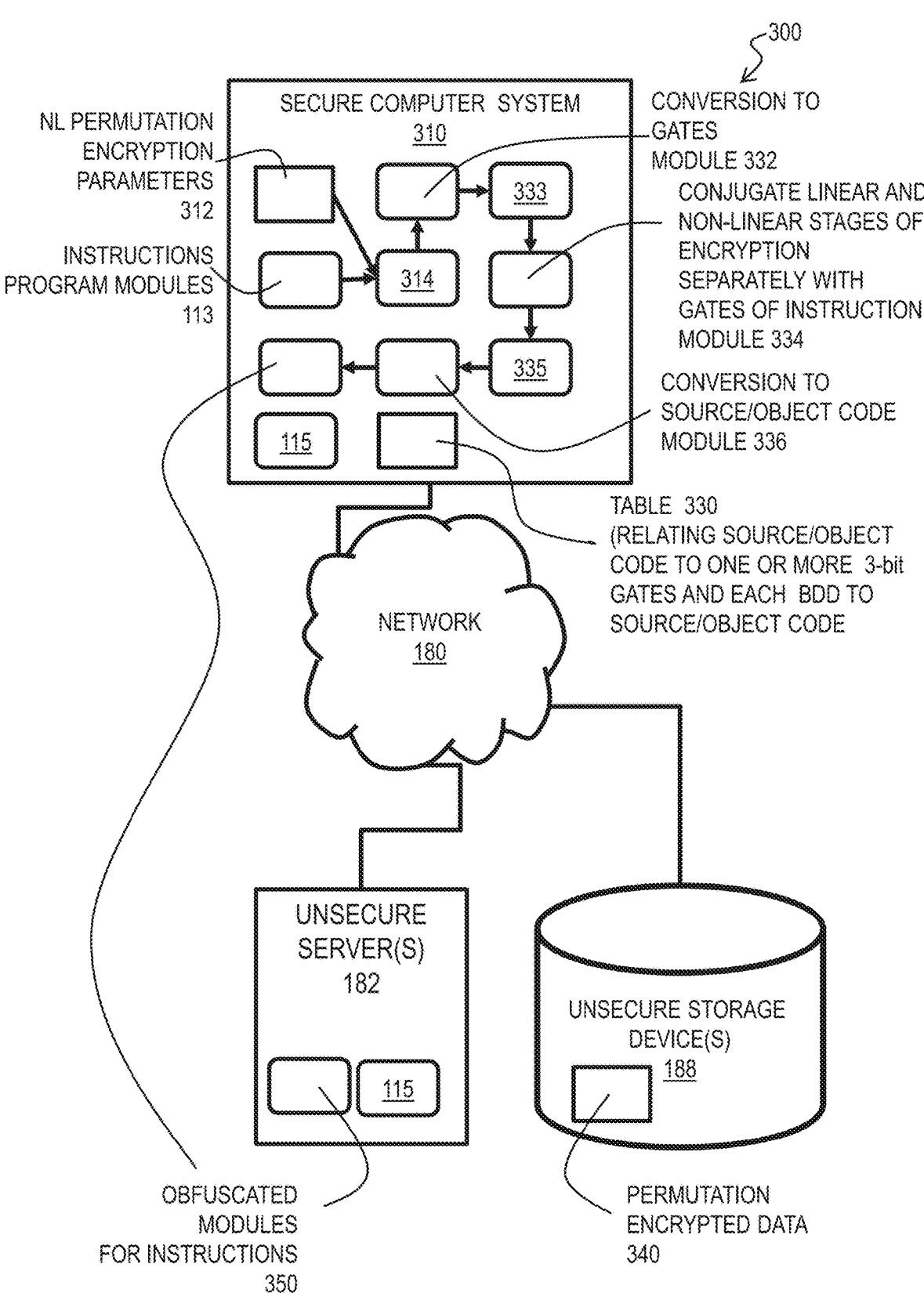
FIG. 3 is a block diagram that illustrates an example system for securely processing on a public resource encrypted data stored on a public resource, according to an embodiment.

FIG. 3 is a block diagram that illustrates an example system 300 for securely processing, on a public resource, encrypted data 340 stored on a public resource, according to an embodiment. This is accomplished by generating one or more obfuscated modules that provide operations on encrypted data and produce encrypted results without revealing the permutation parameters. The network 180, unsecure storage devices 188; and plaintext function program module 113, and store/retrieve module 115 are as described above for FIG. 1.

However, in this system the permutation encryption parameters 312 are chosen so that an encryption circuit implementing the permutation encryption includes only a first stage and a second stage. The first stage is made up of contiguous gates that can be decomposed into only linear 3-bit gates. This stage is called the linear stage represented by the symbol L; and an implementing circuit is represented by the operator L. The choice of inflationary gates is advantageous for the quality of the cipher. In the stage L all the gates need to be linear, but in the most general case some of them do not need to be inflationary, although not being inflationary decreases the quality of the cipher. The second stage is made up of contiguous gates that can be decomposed into k-bit gates including at least one non-linear k-bit gate, wherein k is not less than 3. This stage is called the non-linear stage represented by the symbol N; and an implementing circuit is represented by the operator N. Nonlinear gates are advantageous for the quality of the cipher. In the most general case, not all of the gates in N need to be nonlinear, some could be linear, even though most of them should be nonlinear for a good quality cipher. Thus herein, an Encryption operator E=NL. This provides the advantage of easier obfuscation with a limited size on obfuscation code.

The system 300 is different from prior art system 100 because the NL permutation encryption parameters 312 are different, the permutation encryption data 340 is different because it is encrypted with the specialized form of encryption composed of stages N and L. Additionally, a different module 314 performs the processes of decrypting the ciphertext, operating on the plaintext (using module 113), and encrypting the result. The module 115 then stores the encrypted result back on the unsecure storage device 188

The secure computer system 310 is further different from secure computer system 110 because system 310 now contains table 330, module 332, module 333, module 334, module 335, module 336 or module 350, or some combination. Table 330 associates relating source/object code to one or more gates and each BDD to source/object code to be executed by unsecure server 282. In some embodiments, unsecure server 382 has a compiler or interpreter module that can execute code supplied as one or more BDDs, so that a conversion module 336 from BDDs to object code can be omitted. Reversible computing ensures that the result from the total circuit is a permutation that takes an n-bit input x and returns an n-bit output y=P(x), where P(x) is a permutation acting on the space of the $2^n$ possible n-bit input x. The permutations on the 2n-dimensional bit space are generated from simple permutations using reversible 3-bit gates. All data encrypted in the database 340 is encrypted using a scheme based on permutations constructed using reversible 3-bit gates, such as the 3-bit Toffoli gate. Because the program E(x) that encrypts the plaintext data x' into ciphertext x is expressed using reversible gates, one can obtain the program $E^{-1}$ that decrypts the data by reversing the computation, using the inverse of each of the gates in the program, read in the reversed order. Thus, $E^{-1}=L^{-1} N^{-1}$. This reversed operation yields the inverse of the permutation, $x'=E^{-1}(x)$, which decrypts the data back to plaintext x.

A program $F^E$ comprising a decryption module $E^{-1}=L^{-1} N^{-1}$, a function module F, and an encryption module E=NL acts on a word made up of a number X n of bits where X is the number of n bit words used as input to the function F.

In addition, the program F that performs the intended task on the plaintext data x' is converted into a description in terms of gates, as in the circuit model of computation, or produced by compilers for a central processing unit (CPU) or field programmable gate arrays. The logic gates are then expressed in terms of reversible or irreversible gates.

This implementation has an advantage in that the action of the circuit on the input data runs faster, since it can be implemented in hardware. In other embodiments E and $E^{-1}$ are defined using other encryption schemes, such as Advanced Encryption Standard (AES), as long as these schemes are formulated in terms of reversible gates.

A program P is then constructed by piping together three stages of programs: a module $E^{-1}$ to decrypt the data for each input word for the function F, a module F to perform the intended task, and a module $E^1$ to encrypt back the data. Because each of the modules have been expressed in terms of gates, the combined program P as a whole is composed of gates. The combined reversible program is a permutation that takes one or more n-bit ciphertext words x' as input and outputs one or more n-bit ciphertext words y=P(x'), where P(x') is a permutation acting on the space of one or more $2^n$ possible n-bit words of input x'.

In some embodiments, it is advantageous to associate each object code instruction with one or more 3-bit gates, because object code tends to comprise a reduced number of commands so a total number of entries in the table can be smaller than for a table relating to higher level compound source code instructions. Also, the object code tends to operate on the level of the processing chip registers so the n-bits can be matched easily to the number of bits in the registers, simplifying the mapping. Source code can be written in any language and then compiled using the appropriate existing compiler for the unsecured servers to produce the object code that is mapped to the sequences of 3-bit gates.

The description of the full program $F^E$ in terms of 3-bit gates is not unique. There are other sequences of 3-bit gates that yield the same final result $F^E(x)$ for an input x, but the intermediate states of the machine are all different. This different sequence can be constructed as described herein so as not to reveal the permutation; and is called an obfuscated module $F^{E(o)}$. Thus, the obfuscated module $F^{E(o)}$ can be run on a shared, public computer without giving away the key to decrypting the ciphertext stored on the public storage.

It is the obfuscated module $F^{E(o)}$ that is sent to the server 382 for execution. The cloud service provider is able to perform the computation requested, reading data from the encrypted database, and outputting encrypted data. But the cloud provider is not able to discern what is being done throughout the computation, for although the final output is the same, the intermediate steps yield different results at most or all steps of the calculation. For example, a client wants to search the database for all entries that satisfy a query that is a Boolean expression. The server runs the obfuscated code, reading from the encrypted database and writing the successful queries into the encrypted output file, which is sent back to the client. The client then decrypts the answer on the secure computer. Alternatively, the results are processed on an unsecure server 382 with other obfuscated modules implementing different operations, e.g. a second function, $F2^{E(o)}$.

In some embodiments, several 3-bit gates are fused into one k-bit gate (3<k≤N). In such embodiments, table 330 includes entries or instructions that associate each source code or object code instruction with one or more k-bit gates that produce the same output one or more n-bit words from the same input one or more n-bit words as the source or object code instruction. In some of these embodiments, table 330 also includes entries that relate each k-bit gate with a sequence of one or more 3-bit gates. Thus, if that sequence of 3-bit gates is ever observed, the corresponding k-bit gate can be substituted, as desired. For example, table 330 includes rules or instructions to convert a series of 3-bit gates into a k-bit gate. In some other embodiments one can fuse two or more chips into one by composing multiple BDDs Module 332 is configured to convert source code or object code to sequences of \gates. Module 332 uses at least some of the data in table 330. In some embodiments, as described in more detail below, the module 332 breaks plaintext function into a series gates. The output of module 332 is module 333 comprising a sequence of 3-bit gates equivalent to module 314. Module 332 need not convert any source or object decryption code or encryption code or both to 3-bit gates because the encryption is defined in terms of 3-bit gates. When encryption is accomplished simply by reversing the order of the gates that perform decryption, parameters 312 only includes one series, for either decryption or encryption.

Module 334 is configured to straddle each gate of a plaintext function with the 3-bit gates of the linear stage L of encryption function E and the inverse of L. Straddling a gate with a set of reversible gates and its inverse (which is the reverse order for reversible gates) is called a conjugation process herein. Module 334 follows this process by conjugating the resulting gates with the gates of the non-linear stage N of the encryption function E using BDDs. The result of the two stages of conjugation is obfuscated $F^E$, i.e., $F^{E(o)}$ in terms of one or more binary decision trees (BDDs) as described in more detail below.

Automated conjugation procedures that take advantage of simplifications available by using only linear inflationary 3-bit gates are described in a separate section, below.

Module 336 is configured to convert obfuscated $F^E$ to obfuscated source code or object code. In embodiments in which the BDDs are executed directly on unsecure server 182, module 336 can be omitted.

The output of module 336 (or module 334 if module 336 is omitted) is module 350 comprising an obfuscated module equivalent to module 314. This module 350 can be sent safely to unsecure servers 182 with module 115, as shown, to operate on the encrypted data 340 using the module 350 and the power or efficiency or resilience of those servers 182.

Although processes, equipment, and data structures are depicted in FIG. 1 and FIG. 3 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Figure 4A:
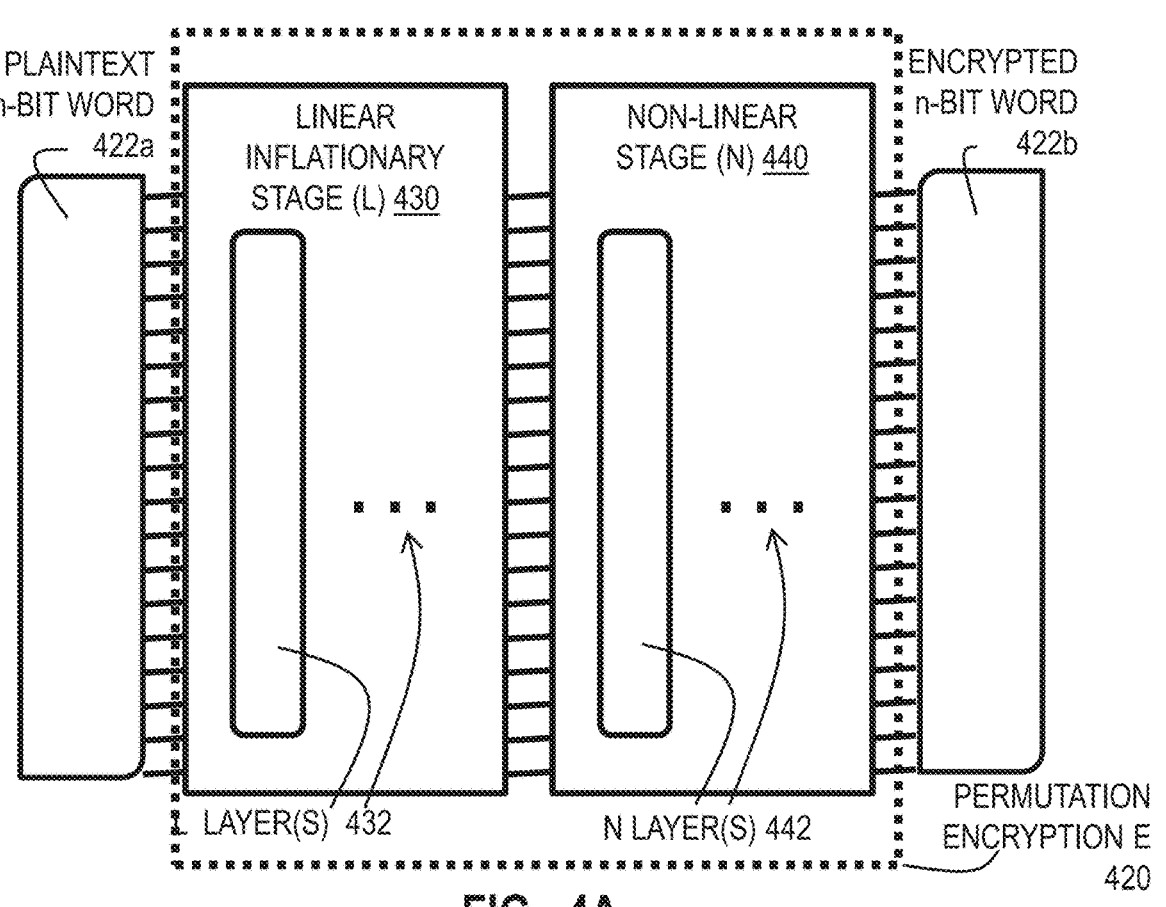
FIG. 4A and FIG. 4C are block diagrams that illustrate example circuits that implement an encryption E to encrypt one word of plaintext data into encrypted data, according to an embodiment.
Figures 4C, 4D:
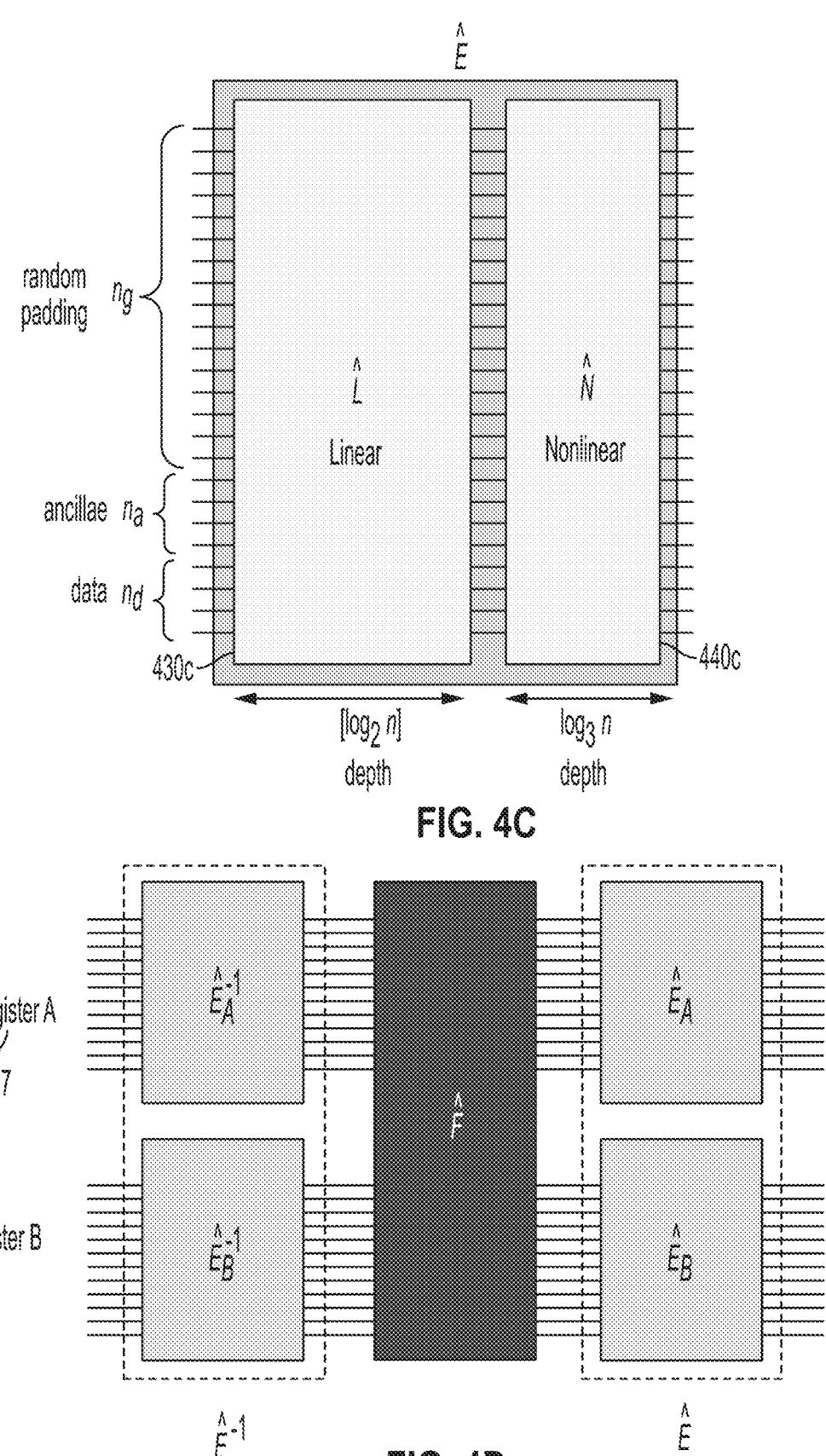
FIG. 4D through FIG. 4F are block diagrams that illustrate an example circuit that implements the function F on encrypted data, according to an embodiment.

FIG. 4A and FIG. 4C are block diagrams that illustrate example circuits that implement an encryption E to encrypt one word of plaintext data into encrypted data, according to an embodiment. In FIG. 4A, the plaintext is in n-bit word 422a and the resulting permutated cyphertext is in encrypted n-bit word 422b. The encryption operator E 420 operates on plaintext n-bit word 422a to produce encrypted n-bit word 422b. The encryption operator E 420 includes first a linear operator L stage 430 that can be decomposed into only linear 3-bit gates followed by a non-linear operator N stage 440 that can be decomposed into k-bit gates including at least one non-linear k-bit gate, wherein k is not less than 3. This separation into L and N simplifies the conjugation and obfuscation steps, described below. In an illustrated embodiment, L can be decomposed into only linear inflationary gates. This provides the advantage of limiting the types of such gates to 144 while still providing a strong cipher E, thus further simplifying the conjugation and obfuscation steps, as described below.

Any set of gates in L or N can be organized into layers of gates that can be operated in parallel. Thus, in FIG. 4A, L stage 430 includes one or more L layers 432; and N stage 440 includes one or more N layers 442.

To simplify the obfuscation steps described below, it is advantageous to select a number of L layers to on the order of $\log_2$ n, designated $O(\log_2$ n). For 64 bits, this is on the order of 6 layers, for 128 bits on the order of 7 layers and for 256 on the order of 8 layers. The more layers, the more secure the permutation; but, the fewer the layers the simpler is the conjugation and obfuscation.

Similarly, to simplify the obfuscation steps described below, it is advantageous to select a number of N layers to be on the order of $\log_3$ n, designated $O(\log_3$ n). For 64 bits, this is on the order of 3.8 (e.g., 3 or 4) layers, for 128 bits on the order of 4.4 (e.g., 4 or 5) layers and for 256 on the order of 5 layers. The more layers, the more secure the permutation; but, the fewer the layers the simpler is the conjugation and obfuscation.

FIG. 4C depicts the circuits for operators E, L and N with the use of the available n bits suitable for various functions including data bits nd, ancilla bits na and random bits used for padding ng. Ancilla bits are used so that one can express irreversible functions in terms of reversible ones. For example, the 2-bit NAND gate is irreversible, but we can get the same effect using a 3-bit Toffoli gate, but one need an extra bit. Ancilla bits play this role. We initialize them at 0 in the beginning of the computation, and at the end they are restored to 0. The padding is with random bits at the time of the encryption. When decrypting, the location of the data bits and the random padding bits bitlines are known, so the padding bits can be ignored.

FIG. 4B is a block diagram that illustrates an example circuit that implements an arbitrary function F on plaintext data, according to an embodiment. This is the function F after conversion to an operator F 410 implemented as a set of 3-bit gates organized into or more layers 412. The operator F can operate on any plaintext data in plaintext input n-bit word 402a to produce a plaintext result at plaintext output n-bit word 402b. It is often the case that a function F operates on two or more inputs variables called arguments, e.g., to order, add, multiple, divide or concatenate two or more arguments. For operator F, each argument occupies one or more bits of n-bit word 402a and all arguments fit within the n-bits for which the encryption operator E and function operator F are designed. For operators using fewer bits, the unused bits in the n-bit word are padded with zeros. It is often the case that a function F produces two or more output variables called results. For operator F, each result occupies one or more bits of output n-bit word 402b and all results fit within the n-bits for which the encryption operator E and function operator F are designed. In embodiments using fewer bits, the unused bits in the n-bit word 402b are padded with zeros. For a given function F the plaintext bits associated with each argument in 402a or result in 402b are known. Thus, for example, for functions that operate on up to two 64-bit words, a user would select n to be about 128; and, for functions operating on up to four 64-bit words, n would be 256 bits. In many applications 8 bits per variable or result suffices and n can be much smaller, e.g., on the order of 64 bits.

Because any retrieved encrypted data might be used for any of the arguments, it would be advantageous to define some functions that move plaintext data corresponding to data retrieved from data 340 into the proper bits to serve as a particular argument (e.g., first, second, third or fourth, etc.) for another function. Similarly, it would be advantageous to define some functions that move plaintext from certain bits corresponding to a particular result (e.g., first, second, third or fourth, etc.) for that other function to a word corresponding to what is stored in data 340.

In other embodiments, a function that operates on two or more arguments is set up to operate on two or more n-bit words, as depicted in FIG. 4D, described below.

Figures 4E, 4F:
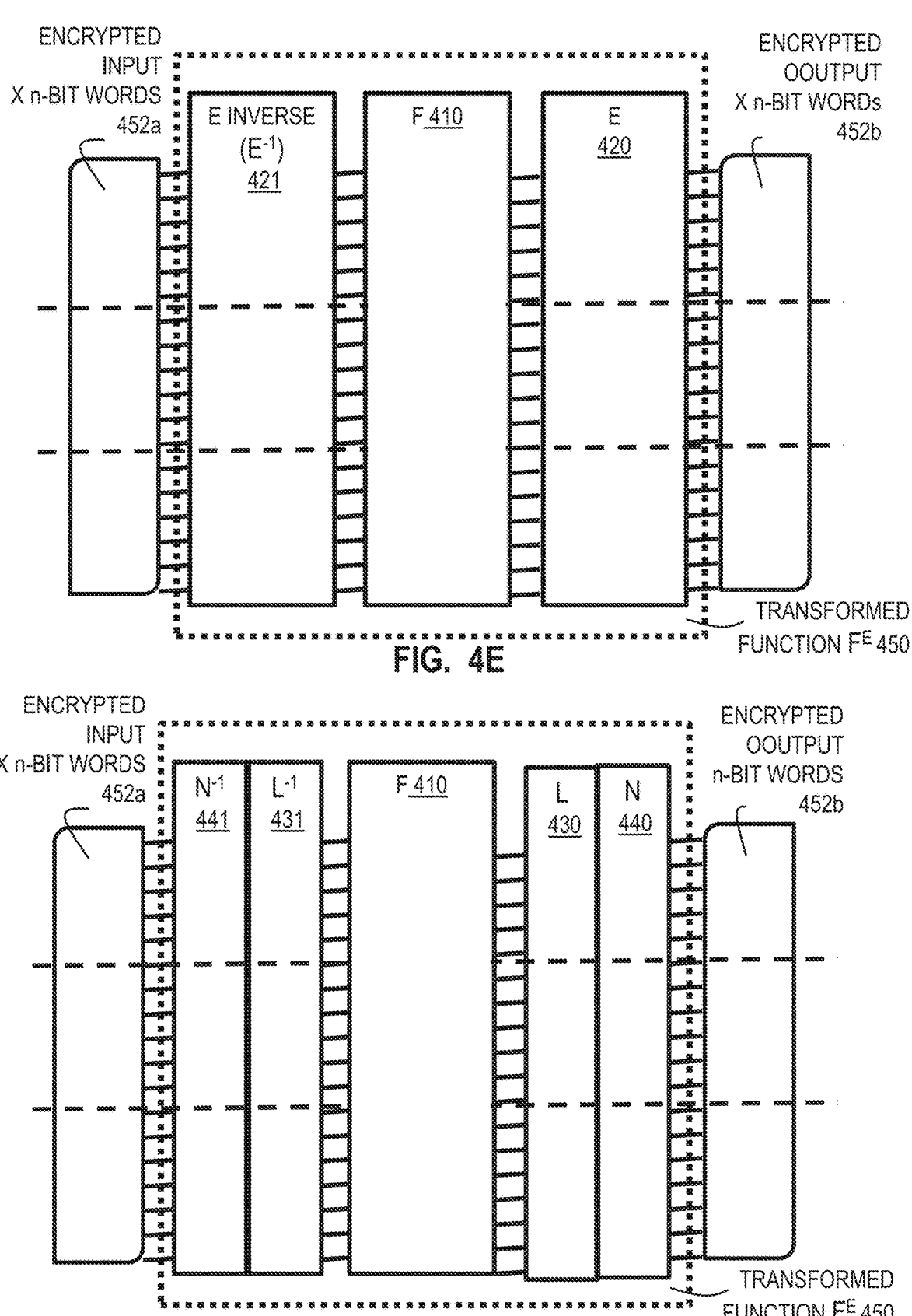

FIG. 4D through FIG. 4F are block diagrams that illustrate an example circuit that implements the function F on encrypted data, according to an embodiment. FIG. 4D depicts a function operating on two or more ciphertexts. In this embodiment, two or more registers are used, one for each argument. For example, to add two numbers, one loads them in two registers, register A 417 and register B 427. In this case the circuit E=EA⊗EB (where ⊗ indicates concatenation) acts on both separate registers, and the encryption circuits EA and EB need not use the same key. The result of the operation, the ciphertext associated to the encryption of the sum of the two plaintexts in the example of addition, can be placed in one of the registers, say register B 427.

FIG. 4E shows encrypted data retrieved from data 340 or some previous function is loaded into one or more (indicated by X) encrypted input n-bit words 452a (separate n-bit words are separated by horizontal dashed lines). A circuit allowing the function to operate on encrypted data is transformed function $F^E$ module 450. The encrypted output is presented in X encrypted output n-bit words 452b. The transformed function $F^E$ module 450 is made up of decryption using an E inverse $E^{-1}$ operator 421, which is simply encryption operator E 420, described above, in reverse order, for each n-bit word followed by the function operator F 410 described above, followed by encryption operator E 420 described above for each n-bit word FIG. 4F substitutes the stages L operator 430 and N operator 440, described above, for encryption operator E 420 in each n-bit word of the X n-bit words. Because these are reversable gates, $E^{-1}$ operator 421 can be replaced by inverse operators for L and N, designated $L^{-1}$ operator 431 and $N^{-1}$ operator 441, in the reverse order, i.e., $N^{-1}$ operator 441 followed by $L^{-1}$ operator 431 for each n-bit word. $L^{-1}$ operator 431 is just the gates of L 430 in reverse order; and $N^{-1}$ operator 441 is just the gates of N 440 in reverse order.

Figure 4G:
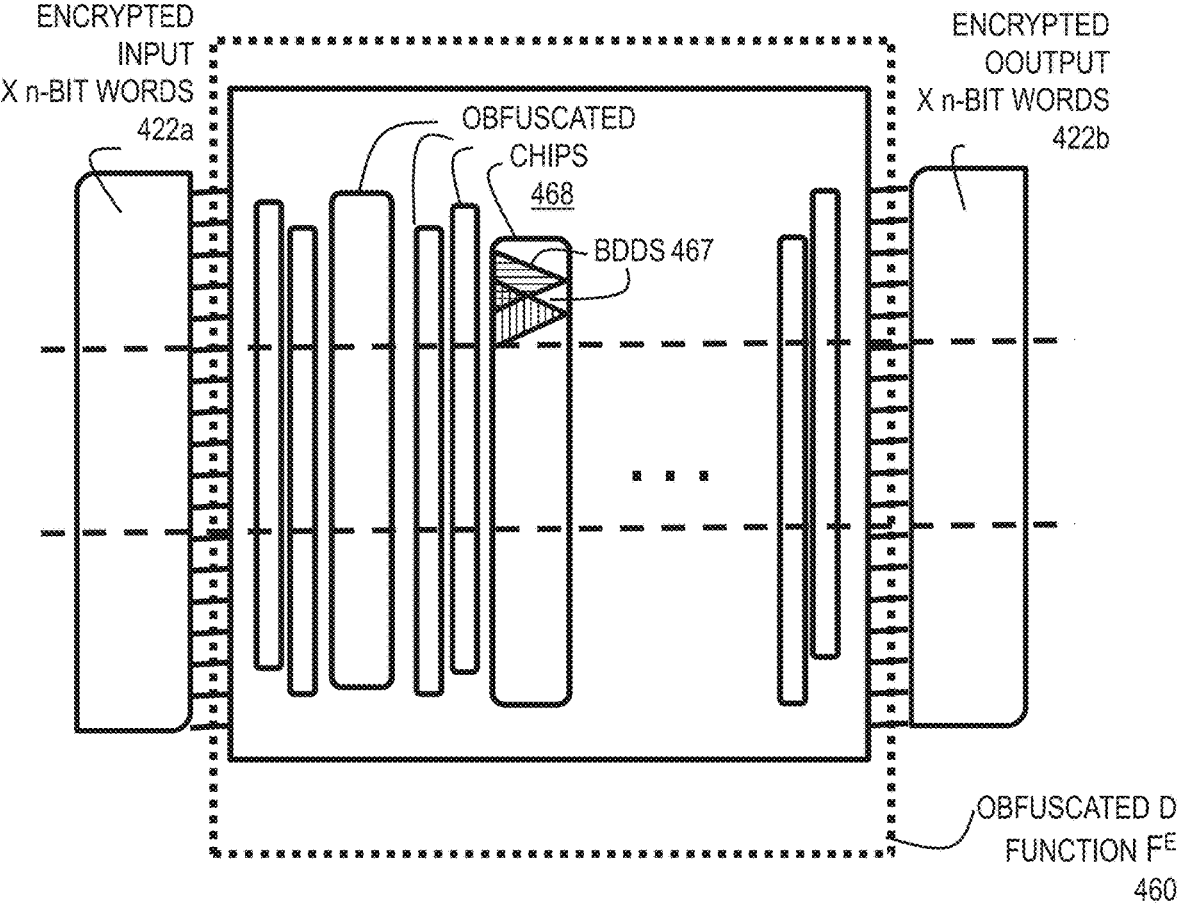
FIG. 4G is a block diagram that illustrates an example obfuscated circuit that implements the function F on encrypted data, according to an embodiment.

The circuits of FIG. 4F accomplish the operation on and production of encrypted data. However, the parameters of the premutation 312 are revealed in the gates of $N^{-1}$ operator 441 and $L^{-1}$ operator 431. Obfuscation is achieved, according to embodiments disclosed herein, by conjugating each gate in $L^{-1}$ operator 431 on each gate in F operator 410 using the conjugation rules described below for linear inflationary gates to produce a set of daughter gates. Then each gate is $N^{-1}$ operator 441 is conjugated on each daughter gate followed by arrangement into BDDS for each bit in each layer as depicted in FIG. 4G. In an illustrated embodiment, the BDDs for all layers for each output bit of the conjugation of each daughter gate are combined and assembled into a data structure called a chip.

FIG. 4G is a block diagram that illustrates an example obfuscated circuit 460 that implements the function $F^E$ on encrypted data, according to an embodiment. Here the layers of L and N and their inverses conjugate the gates of F. Conjugation with layers of L leads to a set of daughter gates each of which seeds a chip. Conjugation of each seed with layers of N evolves each chip into its form represented by the chip BDDs. A BDD 467 is generated for each output bit in each layer of the daughter gates and then combined into one BDD for a chip including all layers of one daughter gate, i.e, for the chip. For example, in one layer, two BDDs 467 are depicted showing the input bitlines that contribute to each of two output bitlines of that chip. Each BDD is depicted as a triangles that fans from one output bit at a vertex to several chip input bits at the base of the triangle.

The bases of the two triangles representing two BDDS 267 are shown to overlap not because the same bitlines in the triangles intersection are used for both output bitlines, but just to indicate the bitlines that contribute to the two different output bitlines might be interleaved among the input bitlines (e.g., as depicted in FIG. 2B). All BDDS 467 for all the output bits of all the layers of the replacement set of each daughter gate are then combined into a chip 468. The chips 468 evident to a holder of the obfuscated function $F^E$ module do not reveal information about layers 442 of N 440 or layers 432 of L 430 or layers 412 of F 410.

4. METHOD

Figure 5:
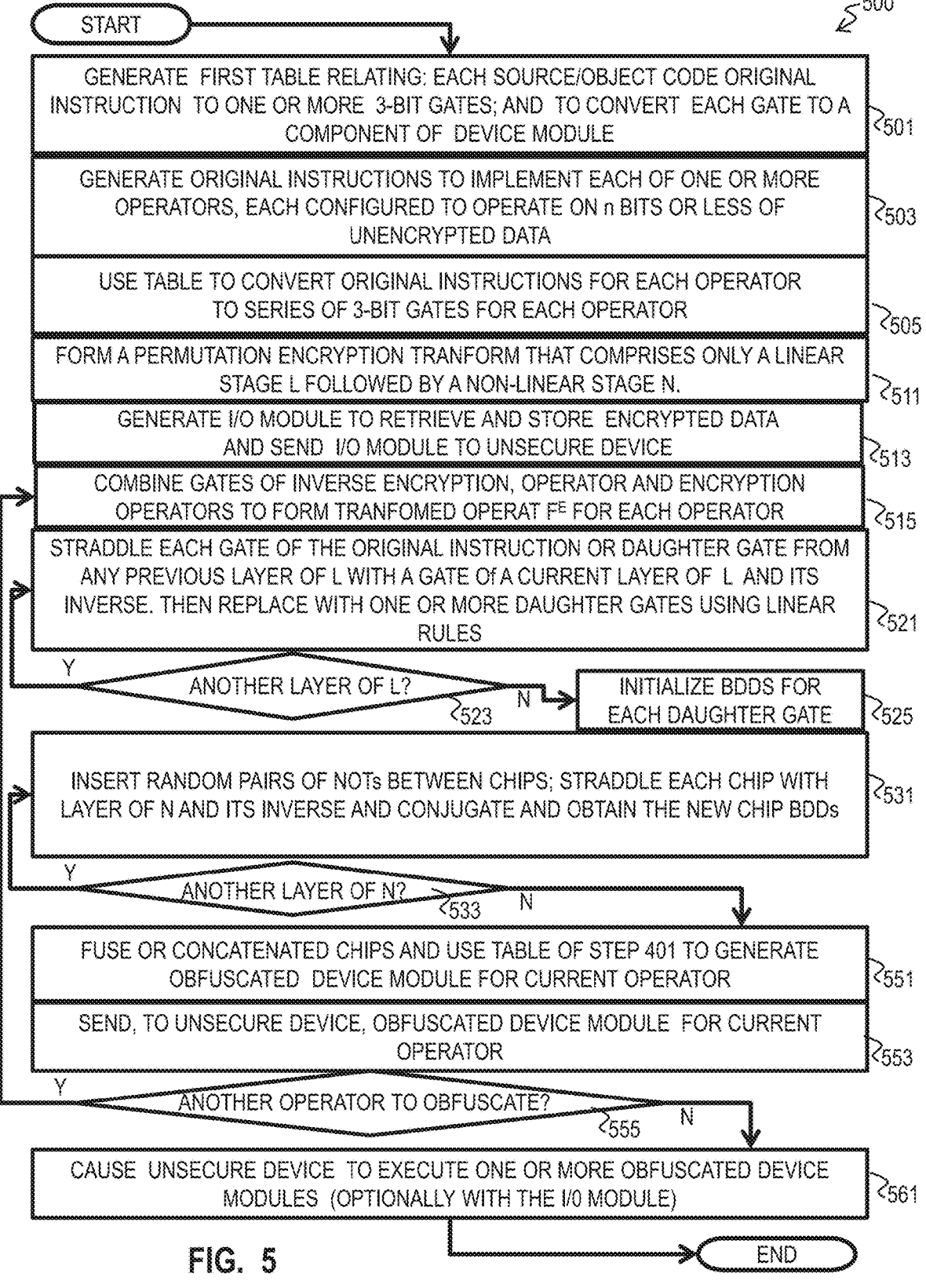
FIG. 5 is a flow chart that illustrates an example method for securely processing on a public resource encrypted data stored on a public resource, according to an embodiment.

FIG. 5 is a flow chart that illustrates an example method 500 for securely processing, on a public resource, encrypted data stored on a public resource, according to an embodiment. Although steps are depicted in FIG. 5 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 501, table 330 is generated. This can be done manually or automatically, but when completed the results are stored as table 330 on a computer-readable medium. The entries in table 330 associate at least each source code or object code instruction with one or more 3-bit gates. In some embodiments the source code or object code or gates are instructions for a field programmable gate array (FPGA). In some embodiments, different associations are used going forward from source/object code to sequence of 3-bit gates than used going backward. For example, in the forward direction each object code instruction in a reduced instruction set processor (RISP) is converted to the fewest 3-bit gates, while going backward each 3-bit gate is converted to the most efficient RISP instructions, such as SHIFT functions, to execute a single 3-bit gate. In some embodiments table 330 includes code to convert each gate to a component of a device module that implements such a gate.

In step 503, original instructions are developed for a set of one or more functions F (e.g., F1, F2, etc.) that can become operators to operate on plaintext data and produce plaintext results. In order to allow some basic function to be strung together after transformation to operate on encrypted data, several basic functions are developed along with additional functions to string together basic functions, including moving plaintext data occupying some subset of n bits to occupy various positions among the n bits for arguments used by other functions.

In step 505, table 330 is used to convert the instructions produced in step 503 to a sequence of gates. In some embodiments, a table is not used, and instead a gate compiler, that can be produced by a skilled programmer, is operated to convert source/object code to 3-bit gates. In some embodiments, a combination of a compiler and a table 330 is used. In some embodiments a complier for a FPGA is used or the gates are implemented on a FPGA, or both. In some embodiments, step 505 is performed by module 332. The output of step 505 is module 333 of reversible or irreversible gates for function F.

In step 511, a permutation encryption module for n-bit words is configured to include only a first (linear) stage L and a second (non-linear) stage N. The first stage can be decomposed into only linear 3-bit gates in order to simplify obfuscation in a later step. In some embodiments, the gates of the first stage are further constrained to be decomposed into only linear inflationary 3-bit gates, of which there are a limited number of 144 such gates, to further simplify obfuscation. In some of these embodiments, each inflationary linear 3-bit gate in the first stage is decomposed into a set of three or four 2-bit CNOT gates to simplify conjugation for obfuscation. In some embodiments, the first stage comprises separate layers, each layer comprising only a set of contiguous gates that can be operated in parallel, e.g., do not repeat any input bit of an n-bit word input to the layer, or if a bitline is shared, that bitline is not changed by any gate other than the last one. The number of layers in the linear stage is on the order of $\log_2 n$ to reduce the size of the obfuscated code without sacrificing useful security.

The second stage N can be decomposed into at least one k-bit gate including at least one non-linear k-bit gate, where k is not less than 3. In some embodiments, the second stage N includes separate layers, each including a set of contiguous gates that can be operated in parallel, e.g., do not repeat any input bit of an n-bit word input to the layer, or, if a bitline is shared, that bitline is not changed by any gate other than the last one. In some embodiments, the number of layers in the second stage is on the order of $\log_3 n$ or $\log_k n$, to further reduce the size of the obfuscated code without sacrificing useful security.

In step 513, instructions are generated for store/retrieve module 315 (also called input/output module or I/O module) to retrieve input ciphertext from encrypted data structure 340 and store resulting output ciphertext in data structure 340. This can be done manually or automatically, e.g., based on an SQL query.

In step 515, gates are combined for module 314 to implement $F^E$ operator 450 by concatenating gates to decrypt the ciphertext, apply the plaintext function, and encrypt the resulting plaintext to produce result ciphertext.

In steps 521 to 533, the $F^E$ operator 450 is obfuscated to produce obfuscated $F^E$ operator $F^{E(o)}$ 460 implemented as module 350.

In step 521, each gate of the original instruction or daughter gate from any previous layer of L is straddled with a gate of a current layer of L and its inverse. Then that set of gates is replaced with one or more daughter gates using linear conjugation rules. A set of conjugation rules for classes of linear inflationary gates is provided in the example embodiment section. The rules are manageable because of the restriction of stage L to linear gates or even more heavily constrained to 144 linear inflationary gates that fall into one of four classes, as described below. In step 523 it is determined whether there is another layer of gates in L. If so, control returns to step 521. Otherwise, control passes to step 525.

In step 525 the BDDs for the chip are initialized for each daughter gate. Control then passes to step 531.

In step 531, a logical identity of two parts (such as a pair of NOT gates) are added on a randomly selected bitline between chips at the same level of iteration during construction. Then each chip is straddled by gates of the next layer of N and their inverses and conjugated so as to obtain the new BDDs for each output bit of the chip. The chip footprint, i.e. the number input and output bits, increases in this process, Note that the footprint of the chips increases by a factor of 3 with each level of construction. Adding nodes to a BDD and implementing a BDD e.g., using tables in field programmable gate arrays are well understood. All the BDDs in the current layer for a single conjugated daughter gate are combined into an updated chip. The set of all chips is updated in this manner. In step 533 it is determined whether there is another layer of gates in N. If so, control returns to step 531. Otherwise, control passes to step 551.

In step 551, the chips are fused or concatenated to form the obfuscated code and are converted to source code or object code using table 330 to produce obfuscated source/object code module 350. In some embodiments, module 236 could be implemented on the unsecure server, provided that the gates of the chips are determined before sending out the sequence of gates in module 335. That would take advantage of the computational power available in the cloud In step 553, the obfuscated code 350 is sent to the unsecure servers 182. In step 555 it is determined if there is another function to obfuscate. If so, control passes to step 515 described above. If not control passes to step 561.

In step 561, the unsecure server is caused to execute the retrieval/storage module 315 and obfuscated code 350 for one or more functions F, F1, F2 etc. For example, one or more commands to execute those modules for one or more functions are sent in a message to the unsecure server 182.

The number of gates that are generated in the recursive process depends on which of the conjugation rules are followed in each step of the process. The final number of gates in the equivalent circuit also depends on the number of gates in the encryption scheme, as described in more detail below.

5. SIZE AND COMPLEXITY OF OBFUSCATED CODE

The block cipher E is a random permutation implemented as a reversible computation that maps a plaintext bitstring of length n. $x \in \{0,1\}^n$, which together can represent text, logical values (TRUE, FALSE), or numeric values using any standard encoding, or some combination, to a ciphertext $E(x) \in \{0,1\}^n$, with the inverse of E, represented by the symbol $E^{-1}$, being the decryption function. To be rigorous, a notion is used inspired by quantum physics, in which the permutation E operating on the binary (bit) string x is presented as an operator E acting on a state $|x\rangle$ $|x_0 \ x_1, \dots x_{n-1}\rangle$ as given in Equation 1.

$$E|x\rangle = |E(x)\rangle \qquad (1)$$

Since E represents a permutation, it is unitary and real. Note that in operator notation the operand is on the right and successive operations are listed right to left. This is opposite the implied direction in the circuit diagrams of FIG. 2A, FIG. 2B and FIG. 4A through FIG. 4F.

More generally, any reversible function, F, is translated into an operator, F. Any function can be computed using reversible logic if one allows for the introduction of ancilla bitlines, which are also included in the state vector $|x\rangle$. A goal of the herein presented Encrypted-Operator Computing (EOC) scheme is to implement the secure evaluation of reversible functions F on encrypted data E(x). A transformed function operator is defined by Equation 2.

$$F^E \equiv E F E^{-1} \qquad (2)$$

The right hand side is referred to herein as the conjugation of operator F by the operator E. The transformation of Equation 2 can then be used to rewrite the encryption of function F(x) as given by Equation 3.

$$E\,|F(x)\rangle = E\,F|x\rangle = E\,F\,E^{-1}\,E\,|\,x\,\rangle = F^E|E(x)\,\rangle \qquad (3)$$

Thus, the operator $F^E$ implements computation on encrypted data $|E(x)\rangle$, which can be thought of as computation in a unitarily-transformed basis. EOC applies to any function F.

An advance made in this approach is identifying a choice for E and a scheme that more readily allows one to obfuscate the operators (circuits) $F^E$. This advantage is enabled by two specific elements: the unitary transformation form of the conjugation operation; and a certain two stage cipher E (from inventor's own work, Chamon et al., 2022), which implements, using shallow circuits of depth of O(log n), permutations that cannot be distinguished from random via polynomial attacks. This certain cipher is given by Equation 4a, where again operator order is right to left.

$$E = N\,L \qquad (4a)$$

The operators L and N represent, respectively, a reversible circuit of O(log n) layers of special (inflationary) linear 3-bit gates, and a reversible circuit of O(log n) layers of nonlinear 3-bit gates. In various implementation different perfectors are used for the order, so the log is log of any chosen perfector for the stage and the embodiment. The actual implementation of EOC proceeds as follows In step 505 of method 500, F is decomposed as a circuit of M elementary gates (NOTs, CNOTs, and Toffoli gates) represented by component operators f, given by Equation 4b (recall operators are evaluated right to left, opposite the circuit diagrams in FIG. 4A through FIG. 4F).

$$F = f_M f_{M-1}\ \dots\ f_2 f_1 \qquad (4b)$$

In steps 515 to 533, the conjugation operation in Eq. 2 is carried out, using the two-stage structure of Eq. 4a for the cipher operator E.

In steps 521 and 523 of method 500, to start obfuscation, F is conjugated gate by gate with L, as described in Equation 4c.

$$\begin{aligned} F^E\ &= E\,f_M f_{M-1}\ \dots\ f_2 f_1 E^{-1} \qquad (4c)\\ &= N\big(Lf_M L^{-1}\big)\big(Lf_{M-1}L^{-1}\big)\ \dots\ \big(Lf_2 L^{-1}\big)\!\big(Lf_1 L^{-1}\big)\,N^{-1}\\ &= N\ {}^L f_M\ {}^L f_{M-1}\ \dots\ {}^L f_2\ {}^L f_1 N^{-1} \end{aligned}$$

where a preceding superscript indicates an operator conjugating the following gate. Each conjugated gate ${}^L f_i$ is a circuit of Qi elementary gates $g_{i,q}$, q=1, . . . , Qi, as given by Equation 4d.

$$Lf_i L^{-1} = {}^L f_1 = g_{i,Qi}\ \dots\ g_{i,2}g_{i,1} \qquad (4d)$$

The conjugation of Equation 4d is accomplished by applying collision rules for reversible gates (inventor's own work, Chamon et al. 2020). Collision rules reflect the fact that, generally, elementary gates do not commute and that interchanging the order of two gates generates additional "debris" gates. As argued below, by virtue of confinement of L to linear inflationary gates, conjugation with L leads to a polynomial proliferation of the number of gates, Qi, and, most importantly, randomizes the placement of those gates while removing information about the initial gate, $f_i$. The rules for conjugating various gates $f_i$ of F with the linear inflationary 3-bit gates of L are summarized in FIG. 6A through FIG. 10R, described below in section 6.

The number, $n_C$, of gates $g_{i,q}$ produced by conjugation of F with L is given by Equation 4e.

$$n_c = \sum_{i=1}^{M} Q_i \qquad (4e)$$

In steps 525 to 533 of method 500, to continue obfuscation of $F^E$, all of the gates produced above, are conjugated with the gates of N that has O(log n) of layers, as given by Equation 5a.

$$\begin{aligned} F^E\ &= N\ {}^L f_M\ {}^L f_{M-1}\ \dots\ {}^L f_2\ {}^L f_1 N^{-1} \qquad (5a)\\ &= N\,g_{M,QM}\ \dots\ g_{1,2}g_{1,1}\,N^{-1}\\ &= \big(N\,g_{M,QM}\,N^{-1}\big)\ \dots\ \big(N\,g_{1,2}\,N^{-1}\big)\big(N\,g_{1,1}N^{-1}\big)\\ &= {}^N g_{M,QM}\ \dots\ {}^N g_{1,2}\,{}^N g_{1,1} \end{aligned}$$

Where, again, a preceding superscript indicates an operator conjugating the following gate. As given by Equation 5b.

$$N\,g_{i,q}\,N^{-1} = {}^N g_{i,q} \qquad (5b)$$

The final line of Equation 5a describes a collection of $n_C$ groups of gates ${}^N g_{i,q}$ called chips herein The gate makeup of a chip is further obfuscated in step 531 by expressing each of the n outputs of every chip as a polynomially-sized Ordered Binary Decision Diagram (POBDD), i.e., a Binary Decision Diagrams (BDDs) with a polynomial number of nodes. Since a BDD is a normal form representing all Boolean functions of the same functionality, the resulting n POBDDs provide a concise representation of the chip ${}^N g_{i,q}$ that exposes no more information than the minimum to recover the chip's functionality. For individual chips, this last step realizes the Best Possible Obfuscation via POBDDs introduced by Goldwasser and Rothblum.

It is stressed that the two-stage process outlined above yields a polynomial number of POBDDs. This hinges on the O(log n) depth of each of the two stages, because the shallow depth ensures that the linear stage leads to a polynomial number of gates, and that the nonlinear stage produces POBDDs for each of those gates. An intuitive way to understand the scaling of this scheme is that, with a shallow cipher of depth O(log n), an exponential growth of complexity with the number of layers only translates into a polynomial overhead.

To be concrete, the complexity of the method 500 is determined by the expansion factor due to the conjugation with L and the sizes of the BDDs following conjugation with N. As determined using theoretical considerations not required to practice steps of the method 500, a feature of this approach is that conjugation with L brings an average overhead factor of Qi for every elementary gate $f_i$ of F, as given by Equation 6a through Equation 6b.

$$Qi < n^{v3} \tag{6a}$$

$$v3 = 3\log_2(7/3) \approx 3.67 \tag{6b}$$

Conjugation with N yields at most a number D of BDD nodes for each of the n BDDs of the chip given by Equation 6c through Equation 6d.

$$D < n^{\gamma} \tag{6c}$$

$$\gamma = \log_3 7 \approx 1.77 \tag{6d}$$

The overall time complexity $C_T$ of steps 521 through 533 of method 500 (per gate of F), given by the number of bits to process, is therefore given by Equation 6e through Equation 6f.

$$C_T \approx O(n^{v3+2}) \text{ if the BDDs of a chip are evaluated in series} \tag{6e}$$

$$C_T \approx O(n^{v3+1}) \text{ if the BDDs of a chip are evaluated in parallel} \tag{6f}$$

The overall space complexity (storage) $C_S$ as measured by the number of nodes in all BDDs is bounded as given by Equation 6g.

$$C_S < n^{v3+\gamma+1} \tag{6g}$$

The structure of conjugation leads to erasure of information in a "dark zone", outside of the "light cone" associated with the layer-by-layer growth of the chip footprint that is seeded by an initial gate $g_{i,q}$. The dark zone is simply invisible to the BDDs, and therefore Best Possible Obfuscation indeed provides security for individual chips. However, the result of conjugation of the full function $F^E$ involves the concatenation of a large (but polynomial) number of chips. Best Possible Obfuscation cannot be applied to the full function $F^E$ because combining multiple chips into one would lead to exponential-size BDDs for the n output lines of the full computation. One is then led to ask whether Best Possible Obfuscation of individual chips is sufficient to guarantee the obfuscation of a concatenation of multiple chips. It is not a priori apparent that correlations extracted from the collections of BDDs representing multiple chips cannot be integrated so that what is erased in one chip becomes visible in another.

To enhance the security of the full conjugated circuit representing $F^E$, in some embodiments in during step 531, identities, e.g., in the form of pairs of NOTs, are inserted randomly on some bit lines of chips connected during one level of conjugation. The elements of the pair are then distributed across the system between conjugation with consecutive layers of N. Because of the injection of random pairs of NOTs, for example, between chips, construction of chips is carried in parallel, for each layer of N. This randomization process leaves the sizes of chip BDDs unchanged, but scrambles the functionality of individual chips while preserving the functionality of the concatenation of chips representing the entire function $F^E$. The addition of randomness washes out correlations among chips and confers a greater level of security for the full function $F^E$ than provided by the Best Possible Obfuscation of individual chips.

It is the combined action of (i) the spreading gates across bitlines induced by the linear stage of conjugation; (ii) the Best-Possible Obfuscation of individual chips built via conjugation by nonlinear gates; and (iii) the incorporation of randomness in the non-linear stage, which scrambles the functionality of individual chips, that defines the obfuscation of $F^E$, an advantageous feature of such an embodiment.

6. SIMPLIFIED CONJUGATION RULES FOR LINEAR INFLATIONARY 3-BIT GATES

The linear stage L of the cipher E is a long-range packed circuit of 3-bit linear inflationary gates. Inflationary gates are useful in permutation operations that flips from 0 to 1 or vice-versa at least two output bits if one input bit is flipped at a time. There are 144 linear inflationary gates, which can all be decomposed in terms of CNOTs of both positive and negative polarities, as illustrated in FIG. 6.

Figure 6:
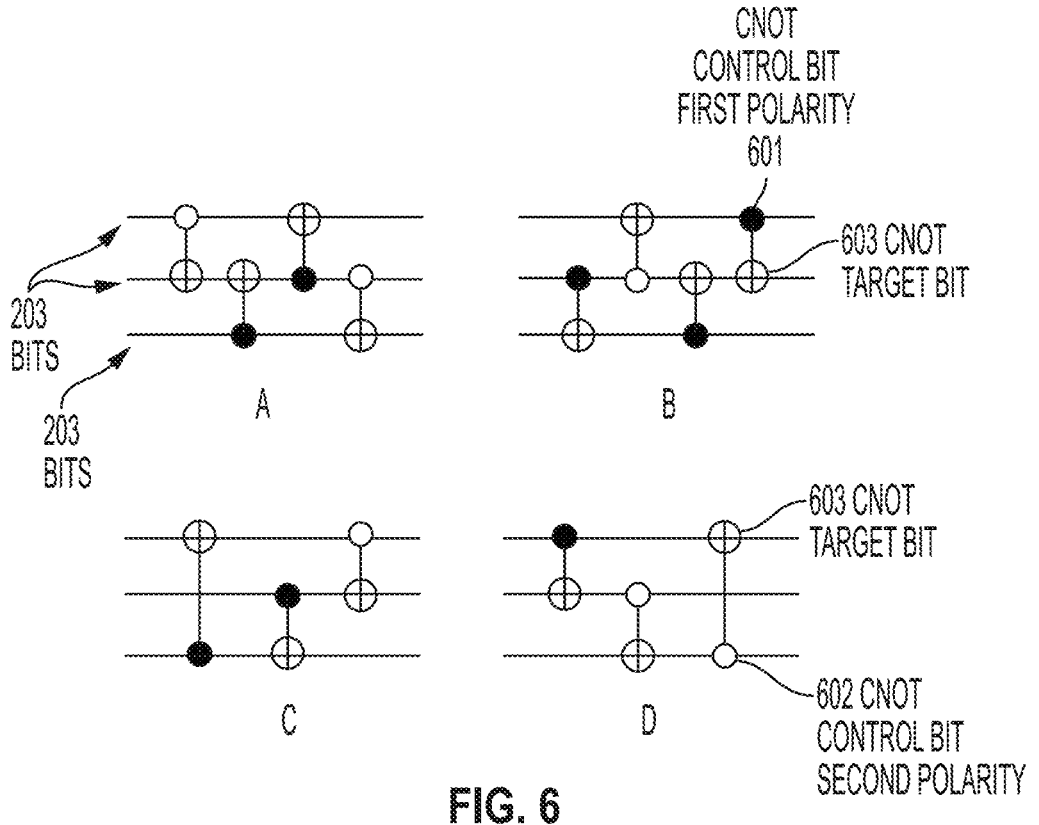
FIG. 6 is a block diagram that illustrates four classes of inflationary 3-bit gates expressed in terms of multiple 2-bit CNOTs utilized according to an embodiment.

FIG. 6 is a block diagram that illustrates four classes of inflationary 3-bit gates expressed in terms of multiple 2-bit CNOTs utilized according to an embodiment. The large circle 603 is the target bit that is flipped based on the value in the control bit. The control bit is the other small circle connected by a vertical line. The CNOT gate flips the target if and only if the control bit has the proper polarity. A solid control bit 601 indicates a first polarity (e.g., a 1); and an open control bit 602 indicates a second polarity (e.g., 0). By permuting bitlines 203 and control bit polarities 601 and 602, one obtains 24 distinct inflationary gates from topology class A, 24 from class B, 48 from class C, and 48 from class D, for a total of 144.

The conjugation with $\ell$ layers of inflationary linear gates from L is implemented gate-by-gate, following rules described graphically in FIG. 7A through FIG. 10R. These rules describe conjugation by all types of inflationary gates and all possible geometries of overlaps of their bits with the target and controls of the gate from F being conjugated. The original gate being conjugated is referred to as the "mother gate", and the resulting gates from the conjugation as the "daughter gates". While the rules presented in the figures aim at minimizing the number of "daughter gates" created in the process of conjugating the initial "mother gate", in other embodiments there are multiple functionally equivalent configurations of the same or similar size.

Figures 7A, 7D, 7G, 7J, 7M, 7P:
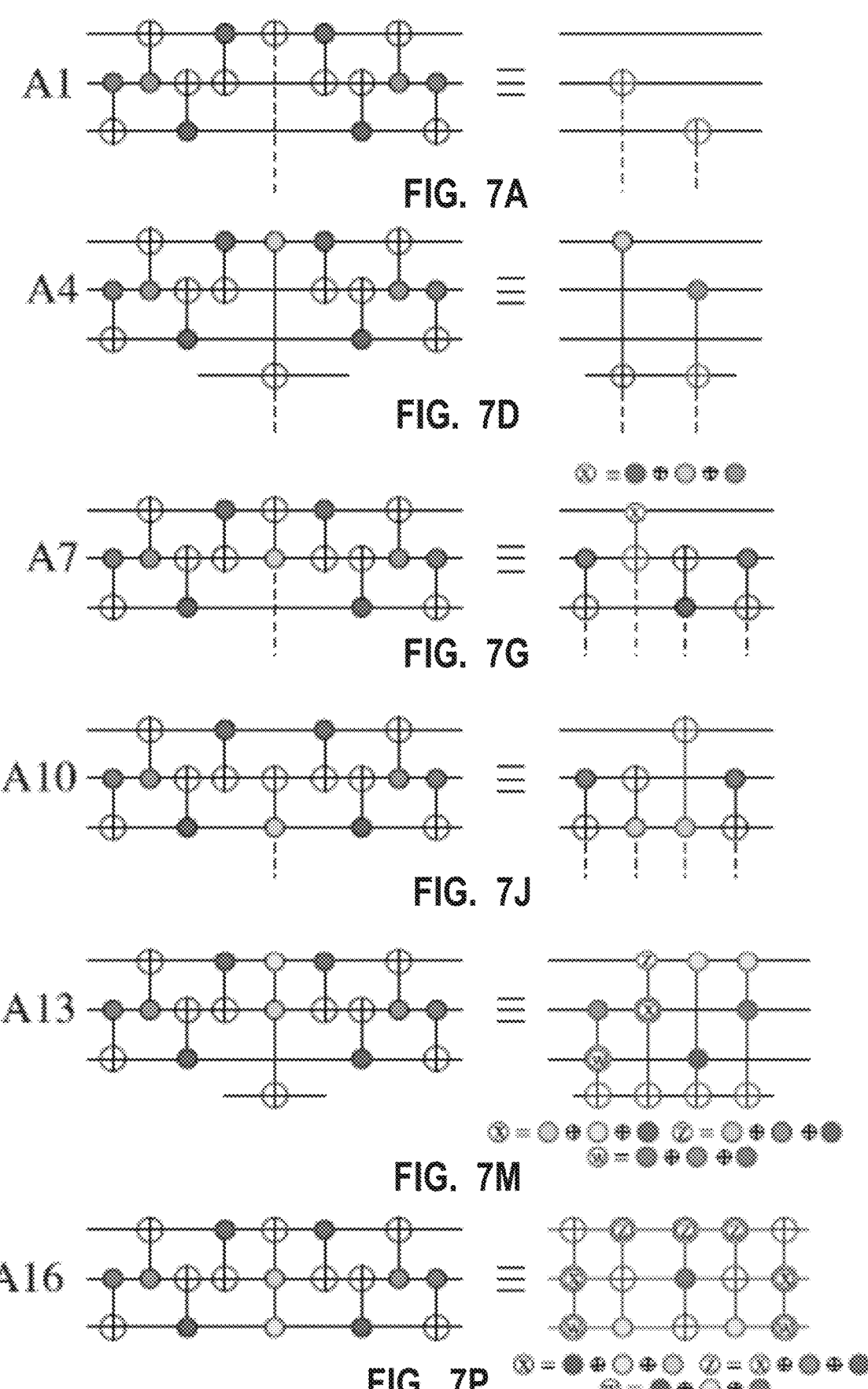

FIG. 7A through FIG. 7R are block diagrams that illustrate rules for conjugation with the inflationary gates in class A of FIG. 6, according to an embodiment. FIG. 7A through FIG. 7R depict cases A1 through A18, respectively, for conjugations of the CNOT gates of class A that interact with different bits of the 3-bit gate being conjugated. Each case comprises two circuits: pre- and post-conjugation (left and right, respectively). Bitlines are represented by solid horizontal lines. The gate being conjugated is in the middle on the left circuit, straddled by the inflationary gate block and its inverse (CNOT gates from FIG. 6 class A). The controls in the inflationary block gates have different shades so that their influence on the polarities of controls of offspring gates can be matched. The offspring gates on the right circuits correspond to the original gate being conjugated or are new gates. The dashed lines indicate connections that gates may have to additional bitlines outside the bit lines of the inflationary gate. In a case A5 (FIG. 7E) the polarity of the control of an offspring gate depends on the relative polarity of three controls (e.g., two from the inflationary gate and one from the gate being conjugated), with the minority polarity winning. In cases A7 (FIG. 7G), A12 (FIG. 7L), A13 (FIG. 7M), A14 (FIG. 7N), A15 (FIG. 7O), A16 (FIG. 7P), and A18 (FIG. 7R), when a control polarity depends on polarities from multiple pre-conjugation gates, a polarity variable "x" (or "w" or "z") is inserted and defined below the circuit where it is utilized. Circuits resulting from conjugations are not necessarily unique and other equivalent circuits are possible. Circuits with the smallest number of gates were chosen to reduce size/complexity of the obfuscated module and circuits which minimize the appearance of pre-conjugation gates were chosen to enhance obfuscation.

Figures 8B, 8E, 8H, 8K, 8N, 8Q:
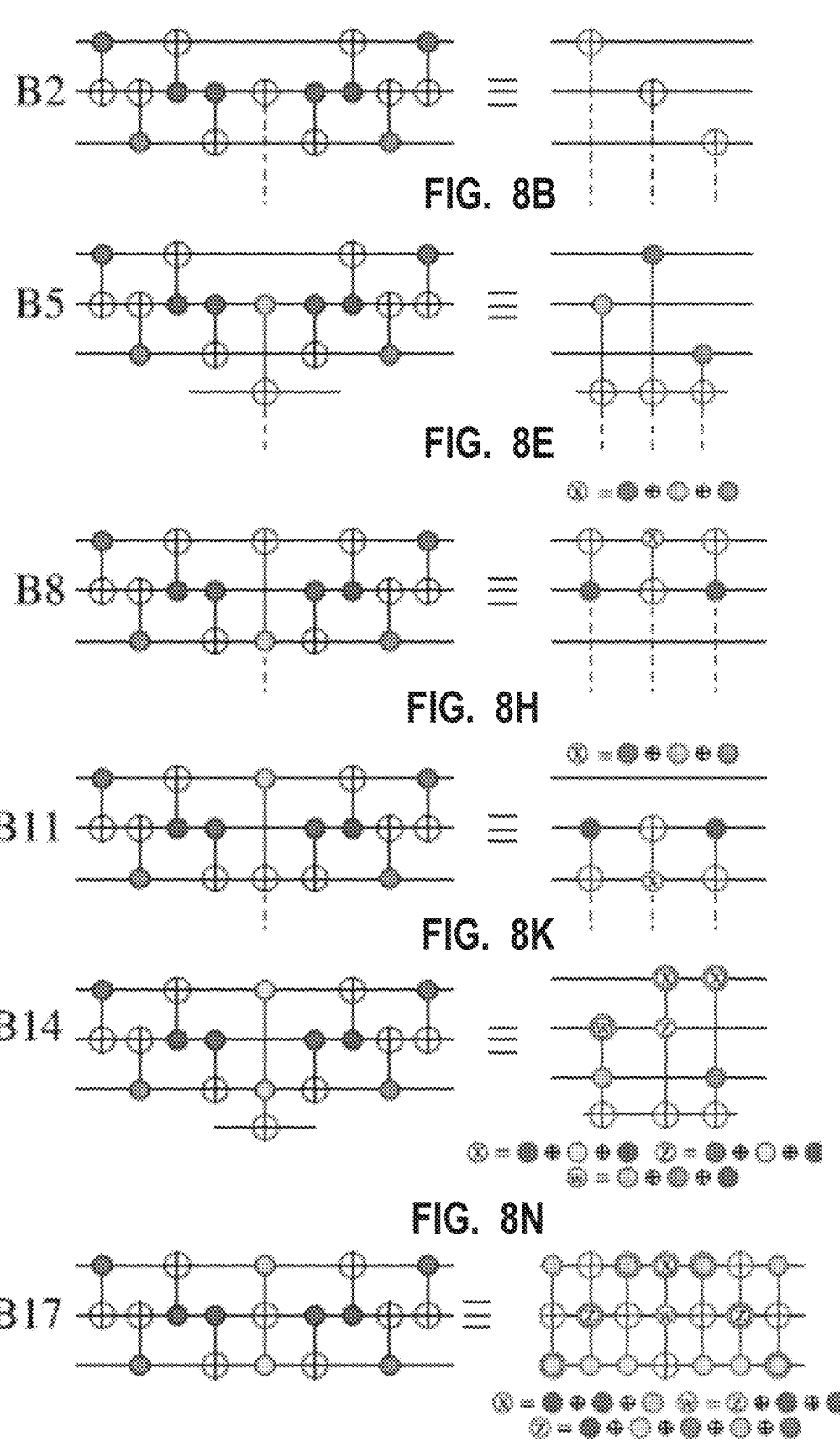
FIG. 8A through FIG. 8R are block diagrams that illustrate rules for conjugation with the inflationary gates in class B of FIG. 6, according to an embodiment.
Figures 8C, 8F, 8I, 8L, 8O, 8R:
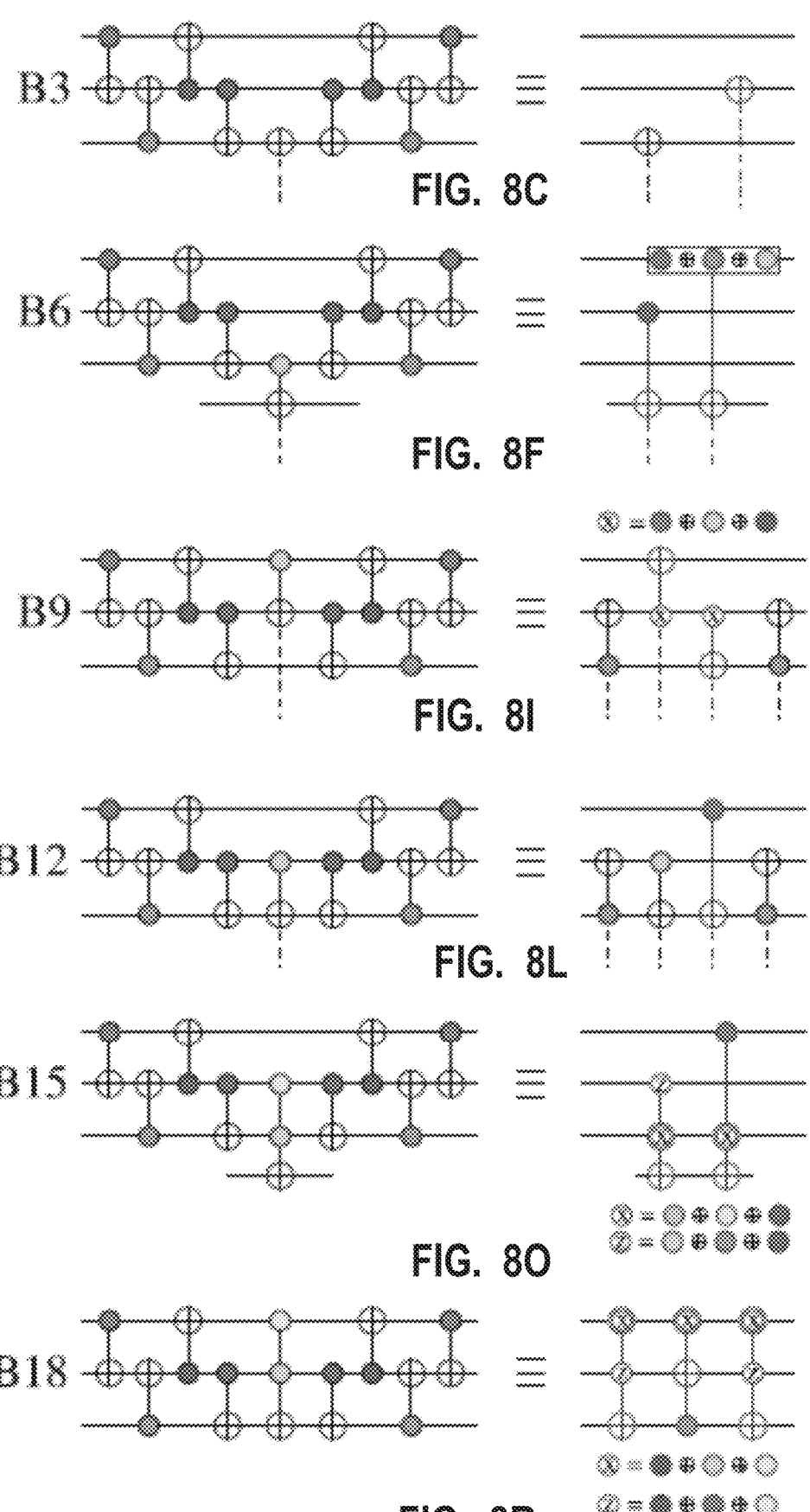

FIG. 8A through FIG. 8R are block diagrams that illustrate rules for conjugation with the inflationary gates in class B of FIG. 6, according to an embodiment. FIG. 8A through FIG. 8R depict cases B1 through B18, respectively, for conjugations of the CNOT gates of class B that interact with different bits of the 3-bit gate being conjugated in the same order as performed for FIG. 7A through FIG. 7R. The same conventions for symbols apply.

Figure 9A:
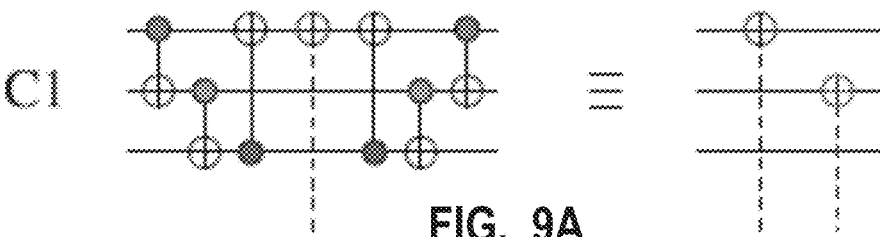
FIG. 9A through FIG. 9R are block diagrams that illustrate rules for conjugation with the inflationary gates in class C of FIG. 6, according to an embodiment.
Figure 9D:
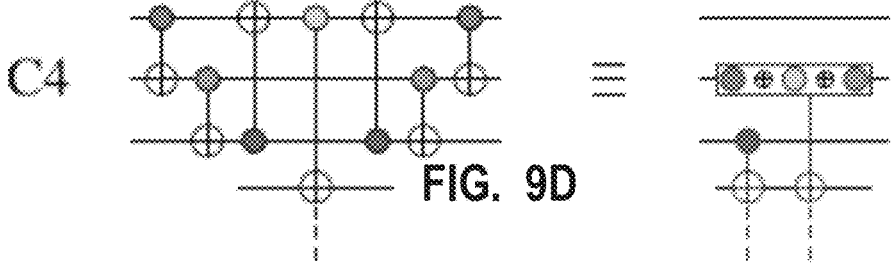
Figure 9G:
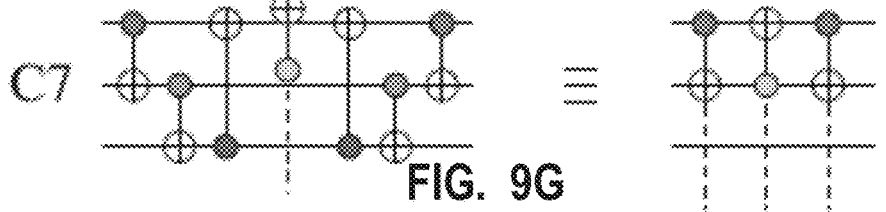
Figure 9J:
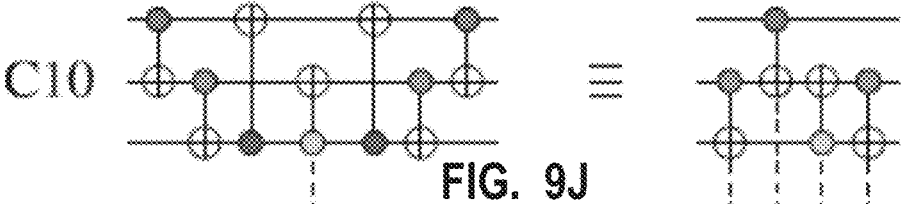
Figure 9M:
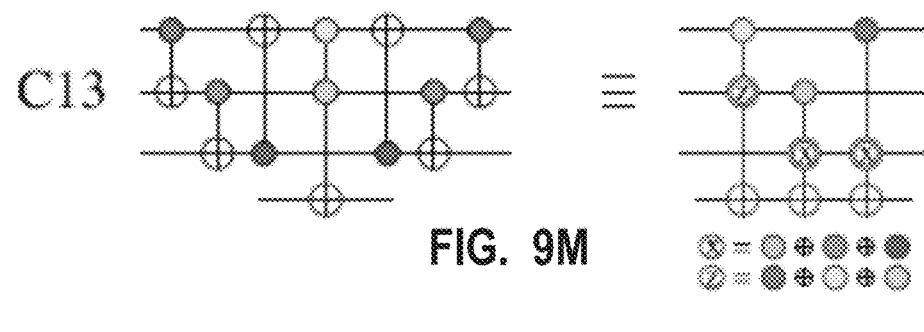
Figure 9P:
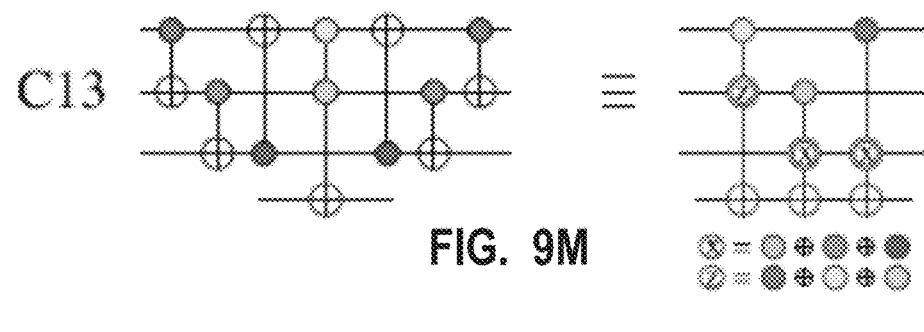
Figure 9B:
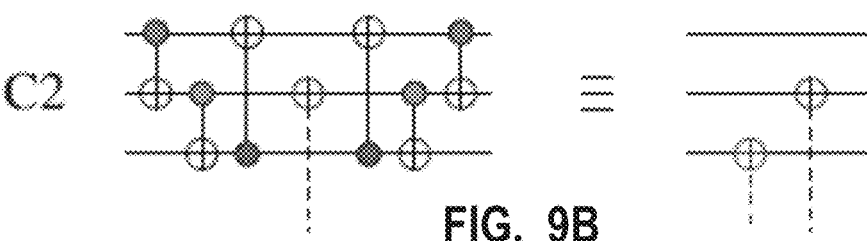
Figure 9E:
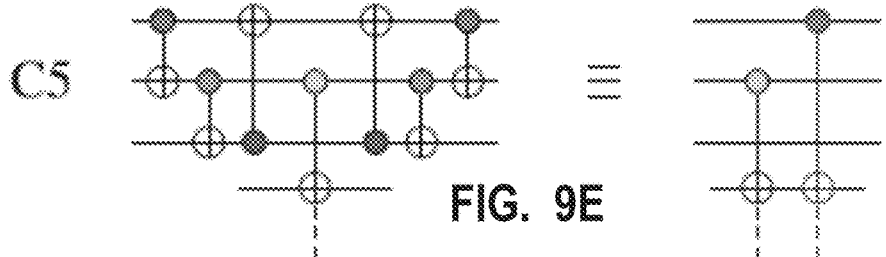
Figure 9H:
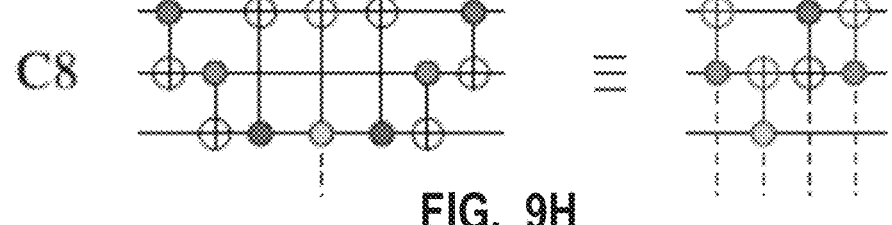
Figure 9K:
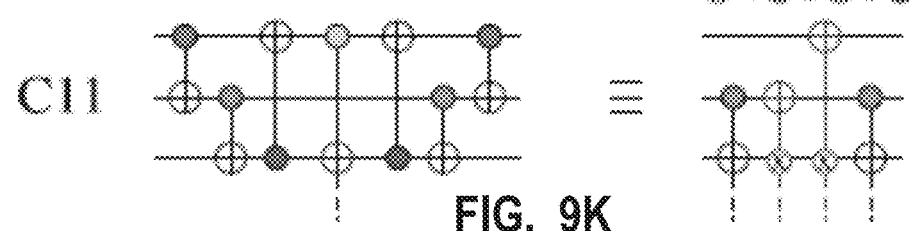
Figure 9N:
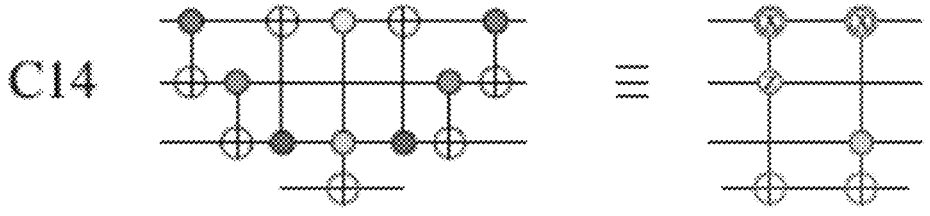
Figure 9Q:
Figure 9Q:
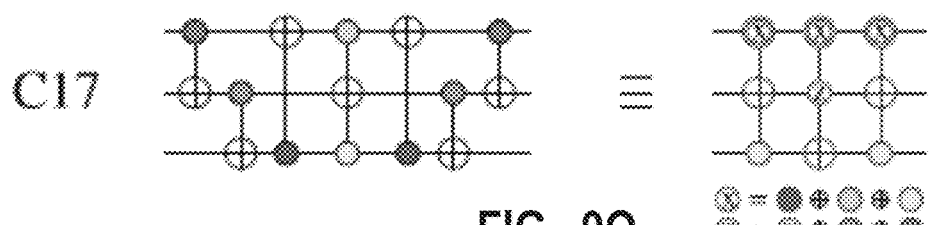
Figure 9C:
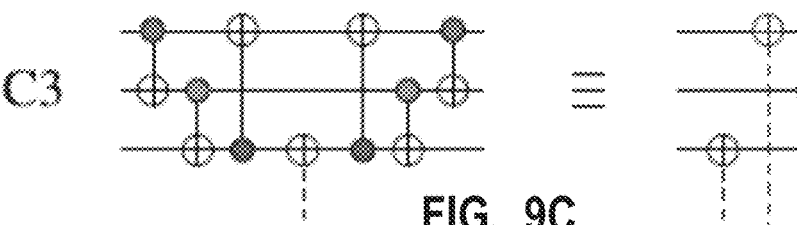
Figure 9F:
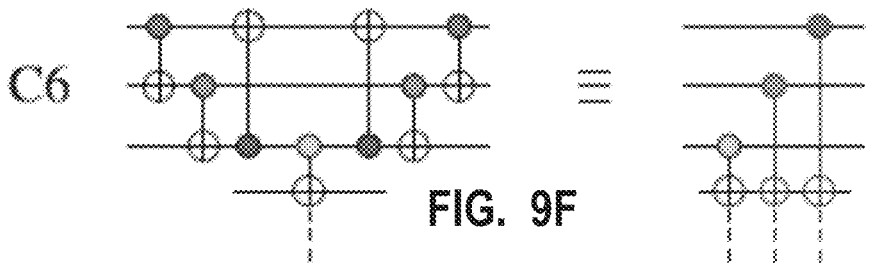
Figure 9I:
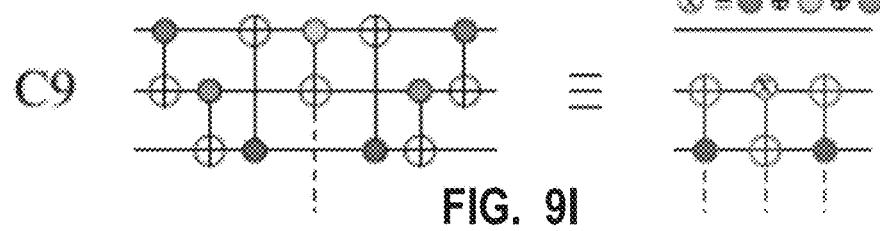
Figure 9L:
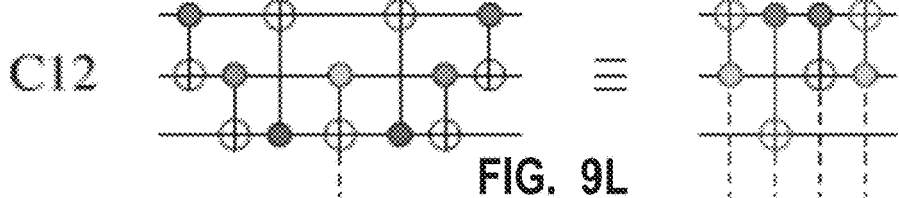
Figure 9O:
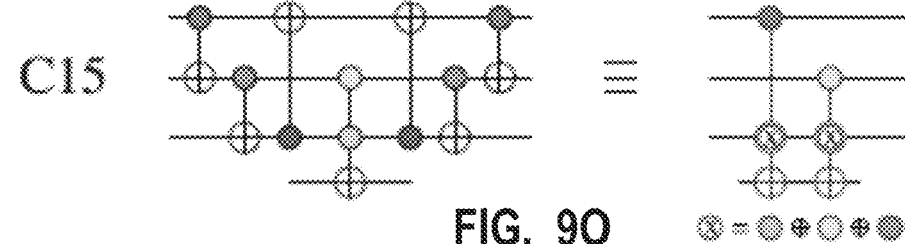
Figure 9R:
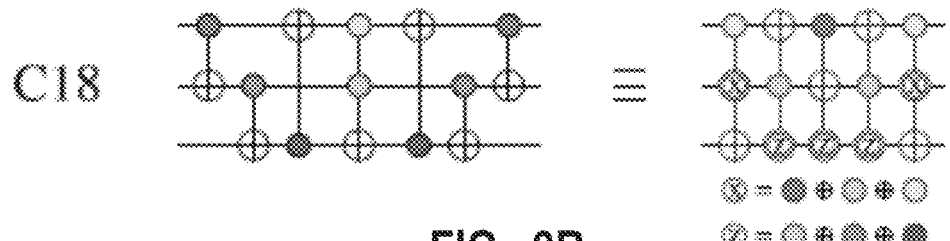

FIG. 9A through FIG. 9R are block diagrams that illustrate rules for conjugation with the inflationary gates in class C of FIG. 6, according to an embodiment. FIG. 9A through FIG. 9R depict cases C1 through C18, respectively, for conjugations of the CNOT gates of class C that interact with different bits of the 3-bit gate being conjugated in the same order as performed for FIG. 7A through FIG. 7R. The same conventions for symbols apply.

Figure 10A:
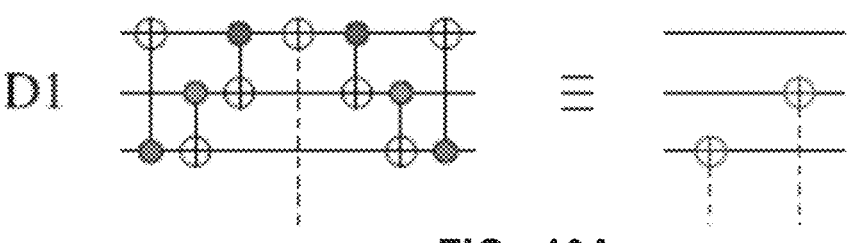
FIG. 10A through FIG. 10R are block diagrams that illustrate rules for conjugation with the inflationary gates in class D of FIG. 6, according to an embodiment.
Figure 10D:
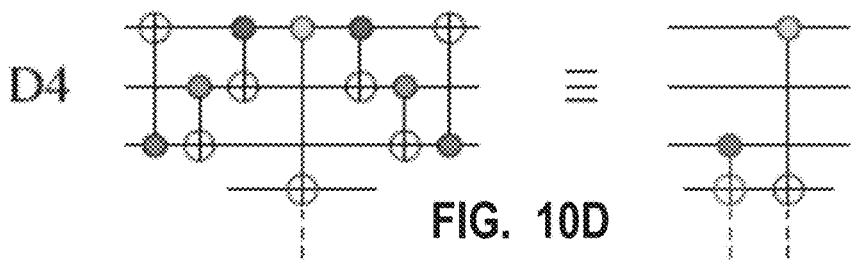
Figure 10G:
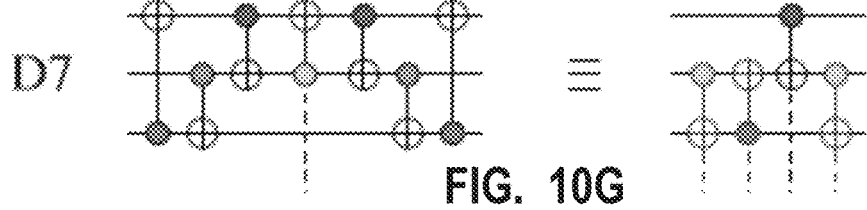
Figure 10J:
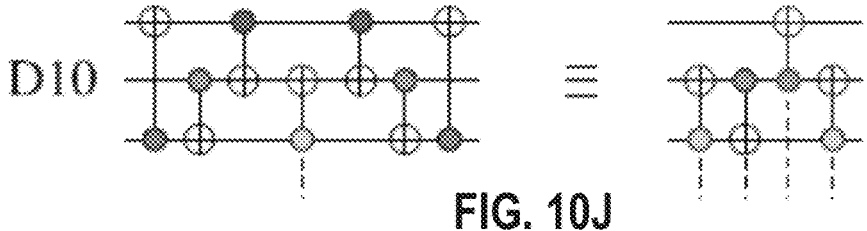
Figure 10M:
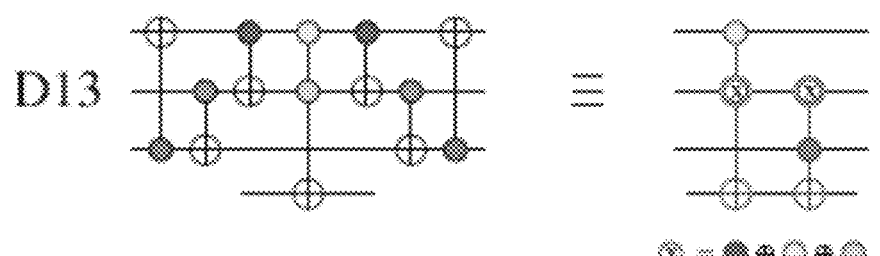
Figure 10P:
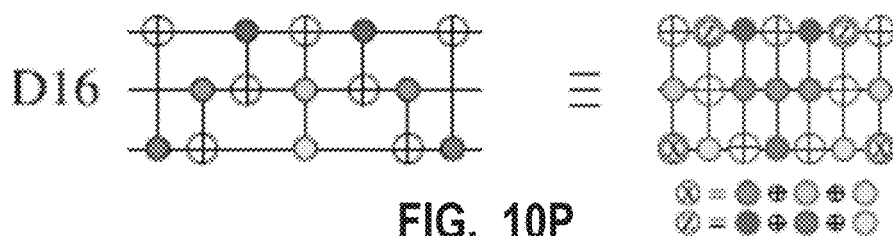
Figure 10B:
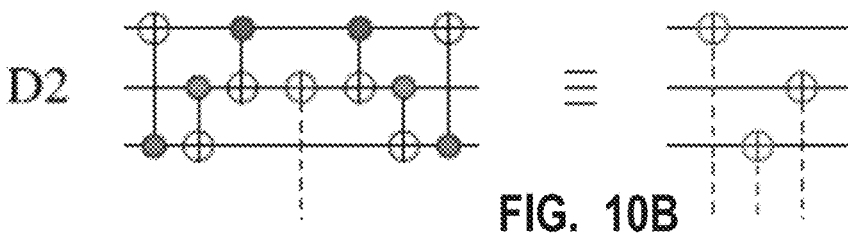
Figure 10E:
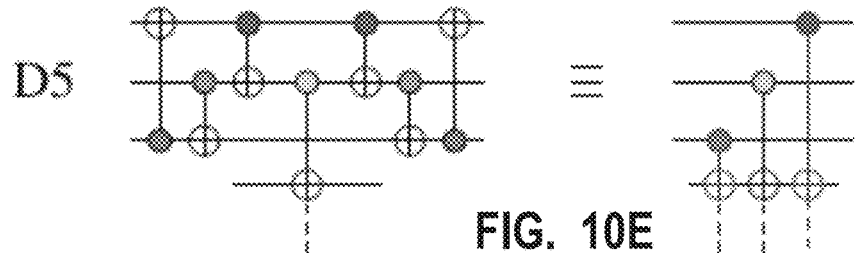
Figure 10H:
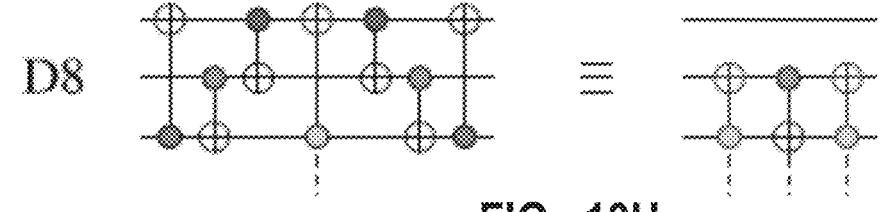
Figure 10K:
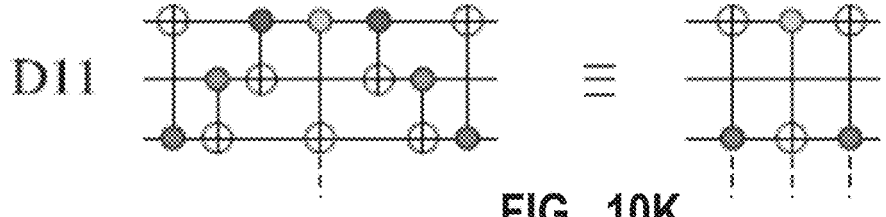
Figure 10N:
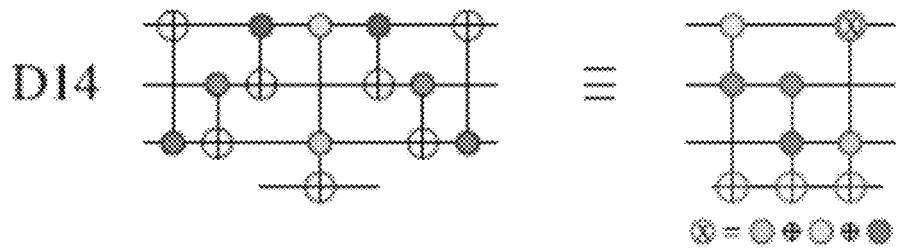
Figure 10Q:
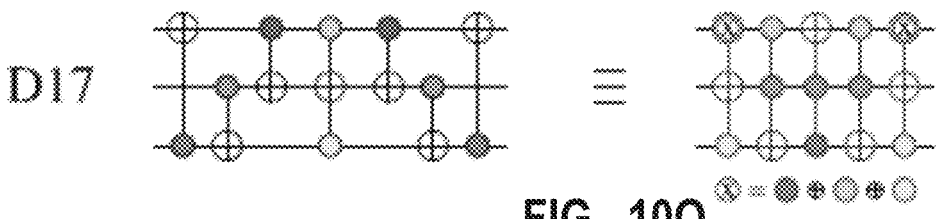
Figure 10C:
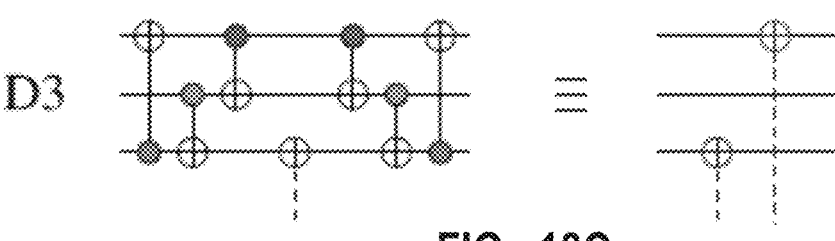
Figure 10F:
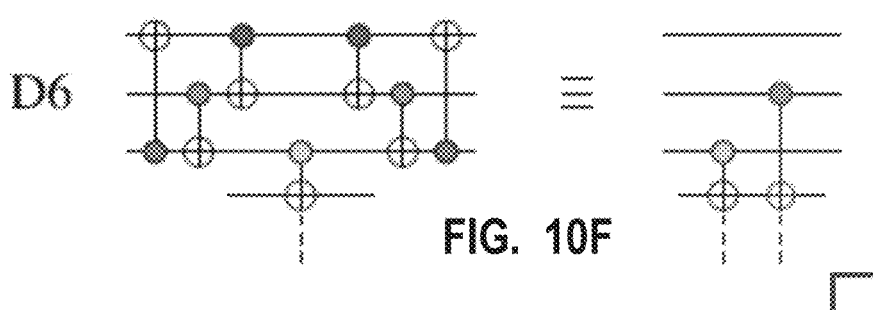
Figure 10I:
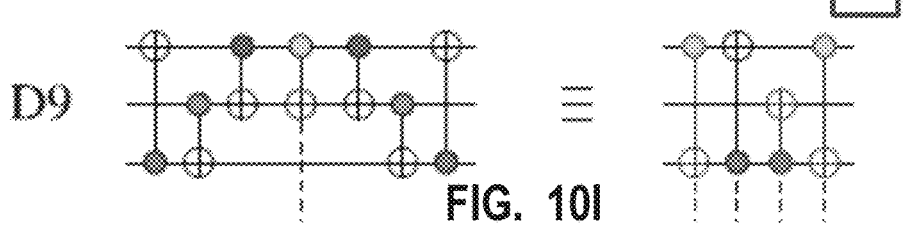
Figure 10L:
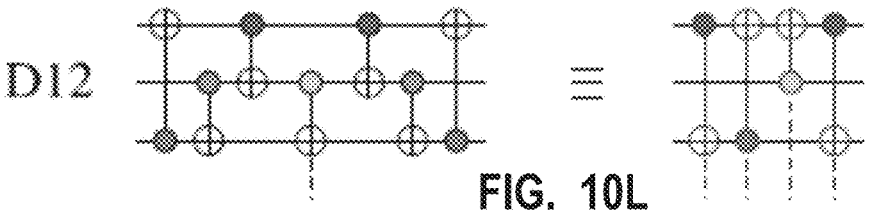
Figure 10:
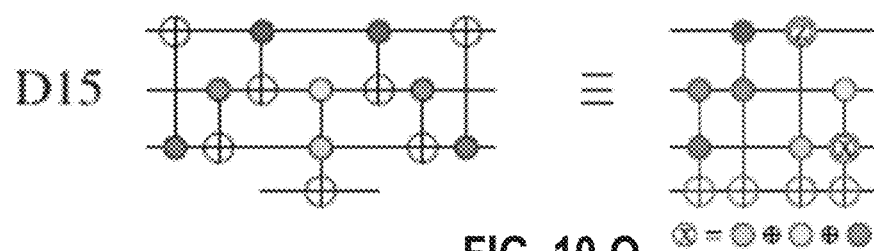
Figure 10R:
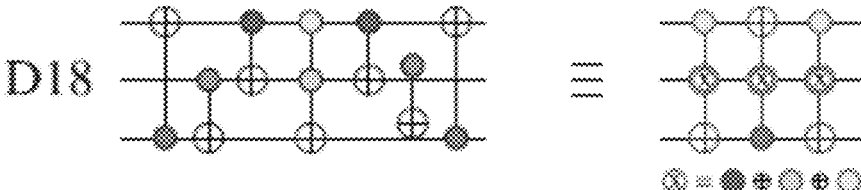

FIG. 10A through FIG. 10R are block diagrams that illustrate rules for conjugation with the inflationary gates in class D of FIG. 6, according to an embodiment. FIG. 10A through FIG. 10R depict cases D1 through D18, respectively, for conjugations of the CNOT gates of class D that interact with different bits of the 3-bit gate being conjugated in the same order as performed for FIG. 7A through FIG. 7R. The same conventions for symbols apply.

The conjugation through multiple layers of inflationary gates, which follows from the recursive application of the conjugation rules from FIG. 7A through FIG. 10R, could be viewed as a branching process, with controls and targets scattering and touching an increasing number of bitlines as more layers of inflationary gates are deployed. This process increases the number of gates, but each of these gates has no more controls than the original gate, a consequence of the linearity of inflationary gates. The growth in the number of gates and the scattering of targets and controls across all bitlines of the circuits leads to ambiguity about the specific gate $f_i$ that is being conjugated.

It is noted that, because NOTs and CNOTs are linear gates, their conjugation with L yields a linear circuit, which could be easily synthesized directly. Linearity allows the synthesis of a reversible circuit using the outputs resulting from only n+1 inputs, e.g., x=0 and x=1; 2; . . . $2^{n-1}$. For every input in this (n+1) long list, one builds the correct output (without changing outputs from previous inputs in the list) by using O(n) linear gates. Therefore, one can synthesize any linear reversible circuit with at most $O(n^2)$ NOTs and CNOTs. For an initial NOT gate, the resulting circuit would contain only NOTs, touching on average n=2 bitlines for L sufficiently deep ($\ell$ =log$_2$ n suffices, as shown in Chamon et al, 2022). Similarly, conjugation of an initial CNOT would yield a generic linear circuit, which can be synthesized with at most $O(n^2)$ CNOT and NOT gates.

Figures 11A, 11B, 11C:
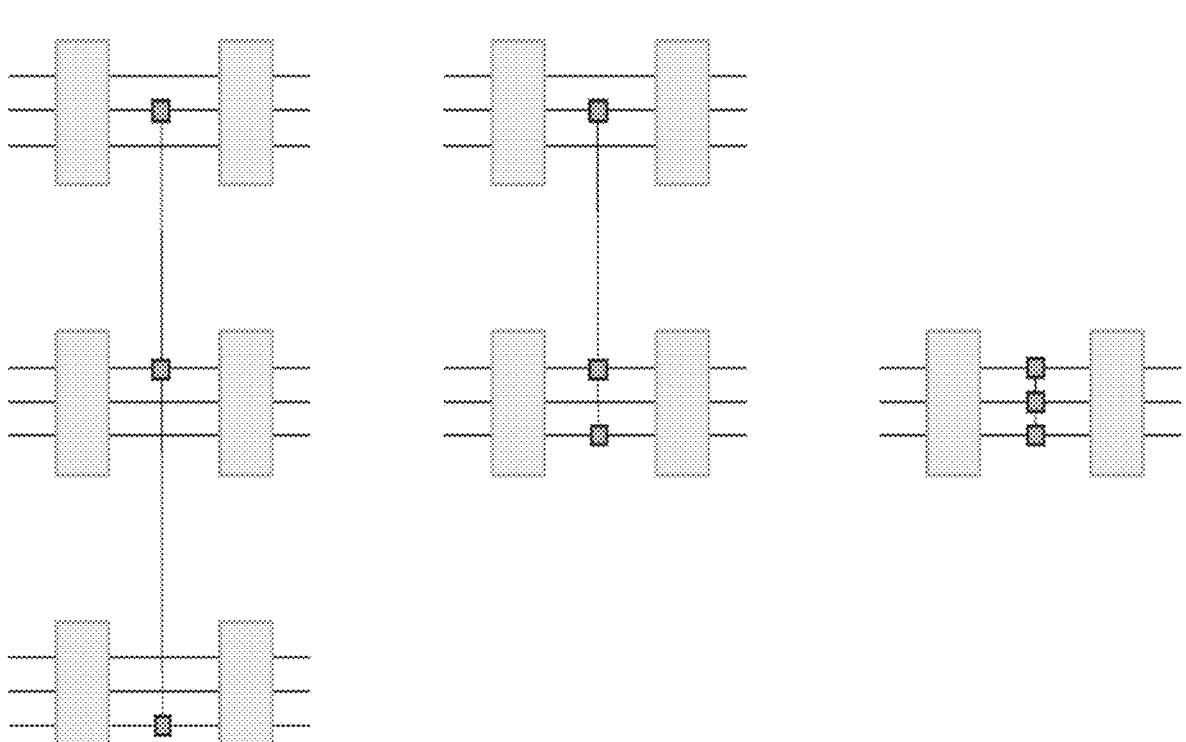
FIG. 11A through FIG. 11C are block diagrams that illustrate three example arrangements of overlaps between the three bit lines touched by a Toffoli gate onto three bitlines of inflationary 3-bit gates accommodated according to an embodiment.

These simplifying arguments about linearity of daughter gates cannot be applied to the conjugation of a nonlinear Toffoli gate, in which case the conjugation rules in FIG. 7A through FIG. 10R are used explicitly. This procedure of step 521 is implemented by separately considering the three arrangements illustrated in FIG. 11A through FIG. 11C. FIG. 11A through FIG. 11C are block diagrams that illustrate three example arrangements of overlaps between the three bit lines touched by a Toffoli gate onto three bitlines of inflationary 3-bit gates accommodated according to an embodiment.

FIG. 11A through FIG. 11C correspond to whether three, two, or one inflationary gates, respectively, in a layer of L overlap with the three bitlines covered by the Toffoli gate. Bitlines are represented by horizontal lines. Linear inflationary gates (on the left side) and their inverses (on the right side) are represented as gray boxes in each of FIG. 11A through FIG. 11C. The bitlines touched by the Toffoli gate are represented by dark gray squares connected by a vertical line that, for the purpose of illustrating the three arrangements, do not distinguish between controls and target. In FIG. 11A, each bitline of the Toffoli gate overlaps with a different inflationary gate) and its inverse) in a layer of L. In FIG. 11B two of the bitlines of the Toffoli gate overlap with one inflationary gate (and its inverse), while the remaining bitline overlaps with another inflationary gate (and its inverse). In FIG. 11C, all three bitlines of the Toffoli gate overlap with the same inflationary gate (and its inverse).

In FIG. 11A, each inflationary gate will conjugate separately only one of the three bitlines of the Toffoli gate. The conjugations in cases A1-A6 (FIG. 7A through FIG. 7F), B1-B6 (FIG. 7A through FIG. 7F), C1-C6 (FIG. 7A through FIG. 7F), and D1-D6 (FIG. 7A through FIG. 7F), respectively, describe the independent scattering of the controls and target of the Toffoli gate. In all these instances, a control or target overlapping with one inflationary gate scatters into either 2 (in ⅔ of cases) or 3 (in ⅓ of cases) controls or targets as a result of conjugation. New Toffoli gates are generated by this process, corresponding to all possible choices of groupings of two controls and one target, each of which is picked from the set of possibilities generated by separate conjugation with each of the three different inflationary gates. (The counting is made easier by considering the conjugation by the three inflationary gates one at a time.)

Figure 11D:
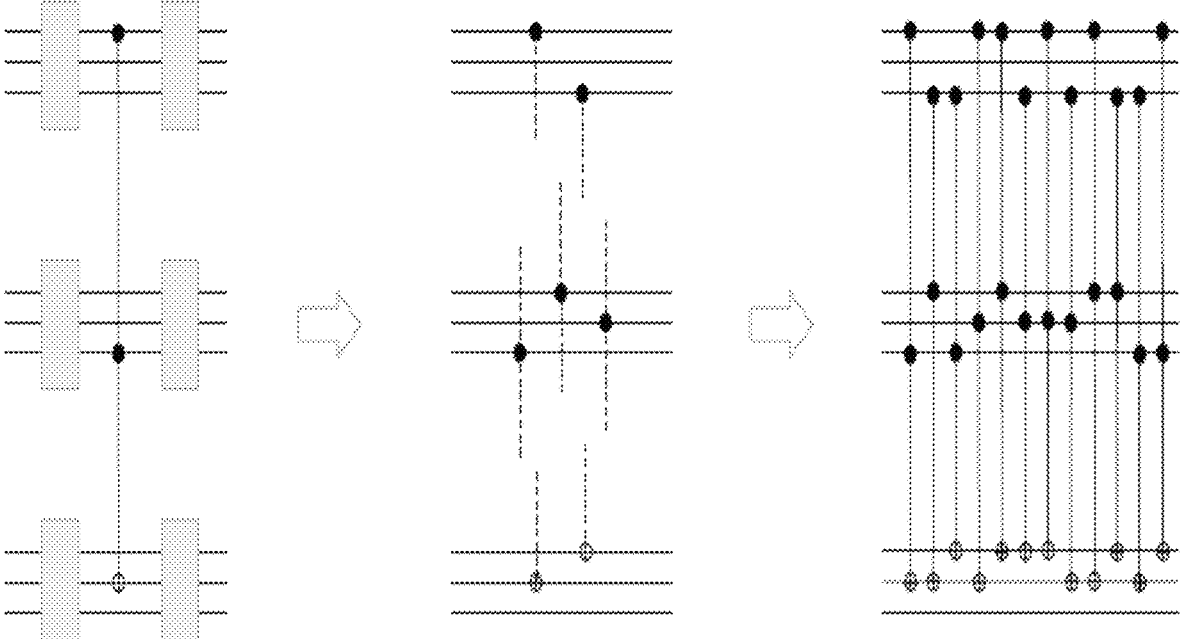
FIG. 11D is a block diagrams that illustrates example conjugation of a Toffoli gate overlapping with three different inflationary 3-bit gates, according to an embodiment.

An example is illustrated in FIG. 11D. FIG. 11D is a block diagrams that illustrates example conjugation of a Toffoli gate overlapping with three different inflationary 3-bit gates, according to an embodiment. The process generates 2×3× 2=12 Toffoli gates as follows. Conjugation of a control by one inflationary gate (on top) results in 2 possible control positions. Conjugation of a control with a second inflationary gate (in the middle) results in 3 possible control positions. Conjugation of a target with a third inflationary gate (at the bottom) results in 2 possible target positions. The 12 resulting Toffoli gates encompass all ways of choosing two controls and one target, each one from different groups of bitlines associated with each of the three different inflationary gates. In this arrangement the maximum number of Toffoli gates, $Q_{TMAX-A}$ that can be generated is $3^3$. The average number $Q_{TAVE-A}$ is given by Equation 6h.

$$Q_{TAVE-A} = \left[2 \times 2/3 + 3 \times 1/3\right]^3 = \left(7/3\right)^3 \qquad (6h)$$

The next arrangement considered is one in which two inflationary gates overlap with the three bitlines of the Toffoli gate as depicted in FIG. 11B. One inflationary gate overlaps with two of those three bitlines of the Toffoli gate, and the other inflationary gate with only one bitline of the Toffoli gate. For the inflationary gate that overlaps with only one of the three bitlines, whether the bitline contains a control or target, the scattering possibilities are the same as those considered above.

The possibilities resulting from the conjugation with the other inflationary gate, which overlaps with two bitlines of the Toffoli gate, are summarized in cases A7-A15 (FIG. 7G through FIG. 7O), B7-B15 (FIG. 8G through FIG. 8O), C7-C15 (FIG. 9G through FIGS. 9O), and D7-D15 (FIG. 10G through FIG. 10O), respectively. Notice that all these scatterings produce at most 4 possibilities, which is less than or equal to the number of possibilities that would be generated by conjugation with two independent inflationary gates as in the previous arrangement, namely 2×2; 2×3; 3×2 or 3×3. Therefore, both the maximum and the average number of Toffoli gates that can be generated are less than or equal to the values obtained in the arrangement in FIG. 11D, namely $3^3$ for the maximum ($Q_{TMAX-A}$) and $(7/3)^3$ for the average $Q_{TAVE-A}$ in Equation 6h.

For the arrangement of FIG. 11C, in which all the bitlines of the Toffoli gate falls within those covered by a single inflationary gate (and its inverse), the rules are used for the cases A16-A18 (FIG. 7P through FIG. 7R), B16-B18 (FIG. 8P through FIG. 8R), C16-C18 (FIG. 9P through FIG. 9R), and D16-D18 (FIG. 10P through FIG. 10R), respectively. The largest number of Toffoli gates generated by conjugation is 7, which is smaller than the minimum number $Q_{TMIN-A}$ of gates 2×2×2 that would be generated in the arrangement of FIG. 11A. In this case, the maximum and the average number of Toffoli gates that can be generated are (again) less than or equal to $3^3$ for the maximum $Q_{TMAX-A}$ and (7/3)3 for the average $Q_{TAVE-A}$ in Equation 6h.

Other gates of F are expected to conjugate with no more complexity than the Toffoli gates. Toffoli gates are universal, meaning that any gate in F can be broken down into a subcircuit of Toffoli gates (or of Toffoli, CNOT, and NOT gates). [Thus, it is concluded that, per layer of conjugation with L, the number of Toffoli gates is increased by a factor of no more than $3^3$, and on average no more than $(7/3)^3$. Conjugation with $\ell$ such layers yield expansion factors given by Equation 6i and 6j.

$$Q_{MAX} \leq 3^{3\ell} \qquad (6i)$$

$$Q_{AVE} \leq (7/3)^{3\ell} \qquad (6j)$$

For $\ell = \log 2\, n$, these Equations 6i and 6j reduce to Equations 6k through Equation 6n.

$$Q_{MAX} \leq n^{\mu 3} \qquad (6k)$$

$$\mu 3 = 3 \log_2 3 \approx 4.75 \qquad (6l)$$

$$Q_{AVE} \leq n^{\nu 3} \qquad (6m)$$

$$\nu 3 = 3 \log_2 (7/3) \approx 3.67 \qquad (6n)$$

Thus, memory of the initial elementary gate (NOT, CNOT, or Toffoli) is lost after conjugation with the layers of the linear stage L of the cipher E. Furthermore, the upper bound for the expansion factor for the maximum $Q_{MAX}$ and average $Q_{AVE}$ number of gates of the conjugated circuit are given by Equations 6k through Equation 6n for a Toffoli gate. The circuit resulting from conjugation by the linear stage L of the cipher E serves as the input into the second stage of conjugation, implemented by layers of nonlinear gates in N, as described in section 7.

7. CONJUGATION RULES FOR NON-LINEAR 3-BIT GATES

Each of the elementary gates (NOTs, CNOTs, and Toffoli's) of the circuit resulting from conjugation with the linear stage L of the cipher E is then conjugated with the remaining, nonlinear part N of the cipher E, according to Equation 5a. The reversible circuit resulting from the conjugation by nonlinear gates is cast as a collection of chips h given by Equation 5b. The steps described here are included in step 531 of method 500.

A chip, before conjugation, implements the combination of gates $g_{i,q}$ as a reversible computation on an n-bit register represented by a reversible function h(x) per individual gate r of N. and operator h, where x is an n-bit input and h(x) is the n-bit output for each gate. The binary function $h_i(x)$ encodes the ith output bit of h(x), and such function can be encoded as a BDD, such as depicted in FIG. 2C where $h_i(x)=f$. The function $h_i(x)$ may not depend on all the n input bits, but instead its domain is a specific subset $b[h_i]$ of those inputs, i.e., a set of locations of the input bits in the n-bit word. The width of the $h_i(x)$ encoded in the BDD is the cardinality, $|b[h_i]|$ i.e., the number of bits in the subset $b[h_i]$ of specific bits. The domain (also called footprint) b [h] of the full chip (all the input bits affecting all the affected output bits in the output n-bit word) given by function h(x) is the union of the $b[h_i]$, as given by Equation 7a.

$$b[h] = b[h_0] \cup b[h_1] \cup \ldots \cup b[h_{n-1}] \qquad (7a)$$

and the width of the chip h is the cardinality $|b[h]|$.

Consider the conjugation of the chip h by a 3-bit nonlinear gate r, starting with the BDD representation of the Boolean functions $h_i(x)$, i=0, ... n−1. The aim here is to obtain the BDD representation of the Boolean functions $'h_i(x)$, i=0, ..., n−1, which are the conjugations of the functions $h_i(x)$ by the gate r in N. The notation for the conjugation of $h_i$ and the full chip h by gate r are represented in Equations 7b and 7c, respectively.

$$'h_i(x) = r(h_i(r^{-1}(x))) \qquad (7b)$$

$$'h(x) = r(h(r^{-1}(x))) \qquad (7c)$$

The gates r; $r^{-1} \in S_8$, where $S_8$ is the group of permutations of $8=2^3$ input states to 8 output states, which encode generic reversible 3-bit computations, act on three bits labeled by j1<j2<j3, and their action can be expressed as three Boolean output functions, $r_{j1}$, $r_{j2}$, $r_{j3}$ and $r^{-1}_{j1}$, $r^{-1}_{j2}$, $r^{-1}_{j3}$. A trit is a digit in a base three numbering system, so it can have values of 0, 1, 2 and is useful to described a particular bit of a 3 bit gate. The Boolean expressions for $'h_i(x)$ are constructed in two steps given by Equation 8a to perform the inverse gate r operation on the appropriate bits as an intermediate result #h and Equation 8b to perform the forward gate r operation on the appropriate bits, respectively.

$$\#h_i(x) \equiv h_i(x_0, \ldots, x_{j1} = r^{-1}_{j1}(x_{j1}, x_{j2}, x_{j3}), \qquad (8a)$$

27

-continued $$... \; x_{j2} = r_{j2}^{-1}(x_{j1}, x_{j2}, x_{j3}), \quad ... \; x_{j3} = r_{j3}^{-1}(x_{j1}, x_{j2}, x_{j3}), \quad ... \; x_{n-1})$$

$$^{r}h_i(x) = \begin{cases} \#h_k(x) & k \notin \{j1, j2, j3\} \\ r_k(\#h_{j1}(x), \#h_{j2}(x), \#h_{j3}(x)) & k \in \{j1, j2, j3\} \end{cases} \quad (8b)$$

Starting with BDDs expressing the $h_i$, i=0, . . . , n–1, one constructs the BDDs for the $\#h_i$, i=0, . . . , n–1 of Equation 8a by using the COMPOSITION rules for BDD manipulation, and from those one proceeds to construct the BDDs for the $^{r}h_i$, i=0, . . . , n–1 using the APPLY rules, both rules available in Bryant, 1986.

Such gate conjugations through BDD manipulation are carried out for all gates in a layer of nonlinear gates in step 531 of method 500. The procedure is then iterated for all layers of the nonlinear circuit N, as enforced during step 533. At the end of the process, one has configuration for a reversible operator encoded as a vector of (at most n) BDDs the evolved chip. The footprint of the obfuscated chip grows with the number of layers of conjugation, and so does the sizes of each BDD, i.e, the number of terminal and non-terminal nodes of each BDD included in the chip. The size of the chip is defined as the size of the largest BDD in the obfuscated chip.

Figure 12:
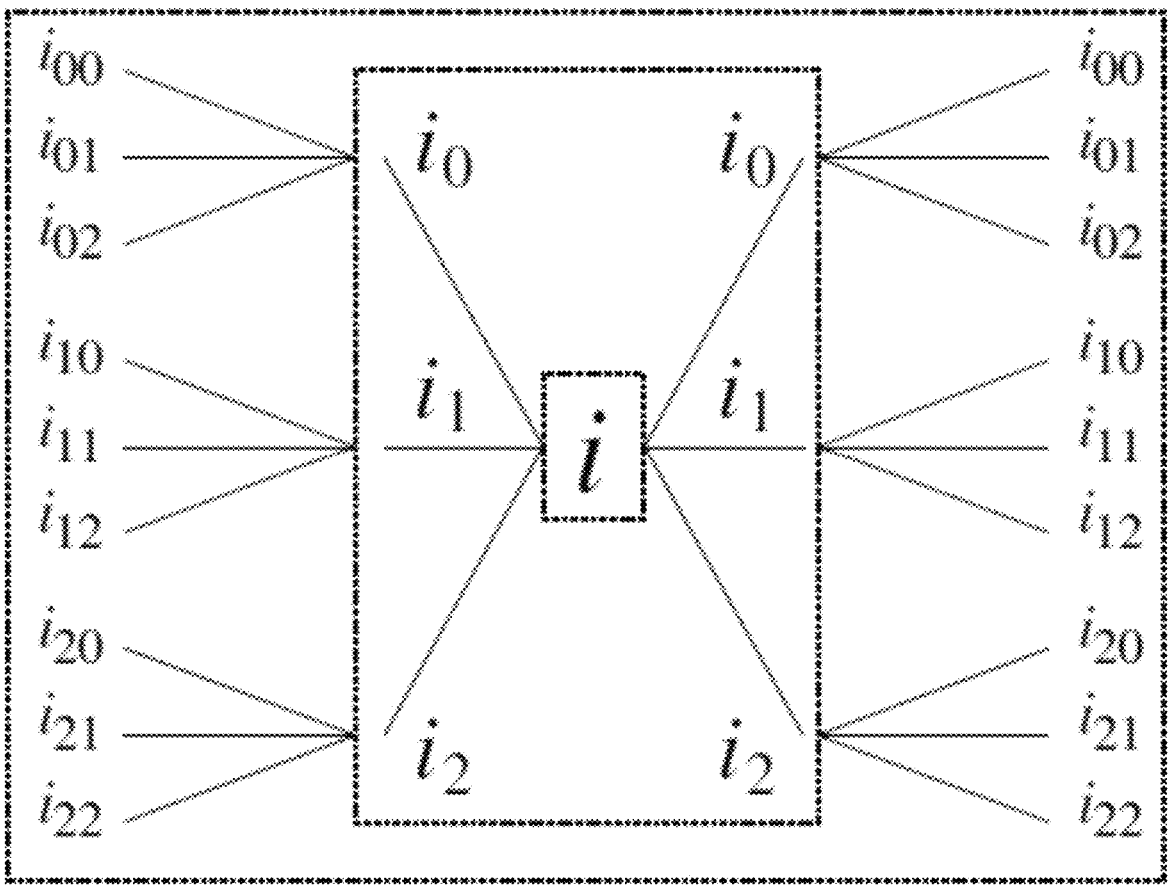
FIG. 12 is a block diagrams that illustrates example hierarchical chip construction, according to an embodiment.

FIG. 12 is a block diagrams that illustrates example hierarchical chip construction, according to an embodiment. This chip is started by conjugating a single daughter gate, a NOT gate at bitline i. The footprint of each BDD grows with the number of layers in N. At level $\ell$ =0 the BDD has a 1-bit footprint containing only bit i. At level $\ell$ =1, the footprint encompasses 3 bitlines, $i_0$; $i_1$ and $i_2$, which are obtained from i by replacing its lowest significant subscript by 0, 1, and 2, respectively. Notice that one of $i_{z0}$, z0=0, 1, 2, equals i itself; the other two are fresh bitlines, accreted to the footprint. At level $\ell$ =2, the chip encompasses 9 bitlines, $i_{z0z1}$; z0, z1=0; 1; 2, which are obtained from the 3 bitlines of the previous level by replacing the second lowest significant subscript z1 in each of $i_0$; $i_1$ and $i_2$ by z1=0, 1, 2. One of the $i_{z0z1}$, z1=0, 1, 2 equals $i_{z0}$, while the other two values of z1 correspond to the fresh bitlines added to The BDD, for each of z0=0, 1, 2. The recursion proceeds similarly for levels $\ell$ >2

It is noted that the sizes of BDDs also depend on the variable order, and different variable orders were chosen for each of the BDDs associated to different output bits in order to reduce the total BDDs' sizes.

The number of gates that are generated in the recursive process further depends on which of the conjugation rules are followed in each step of the process. The final number of gates in the equivalent circuit also depends on the number of gates in the encryption scheme, as described above.

An example of the construction of an obfuscated chip seeded by a NOT gate via conjugation by layers of nonlinear gates in N is presented in section 8.

Next is presented a method for incorporating randomness, which washes out correlations among chips due to conjugation by the same gate by scrambling the functionality of individual chips while preserving the functionality of the full circuit.

The construction of a new set of chips, $^{r\eta}g_{i,q}$, is described, which incorporate randomness, the presence of randomness is symbolized by η. For notational simplicity herein, the subscripts i, q are grouped into a super index I, and attention is concentrated on the construction of a chip with that label, i.e., a chip initiated by $g_I$. All chips at level $\ell$ +1 are built recursively (and in parallel) from the chips at level $\ell$ , according to the following three-step process. This

Figure 13A:
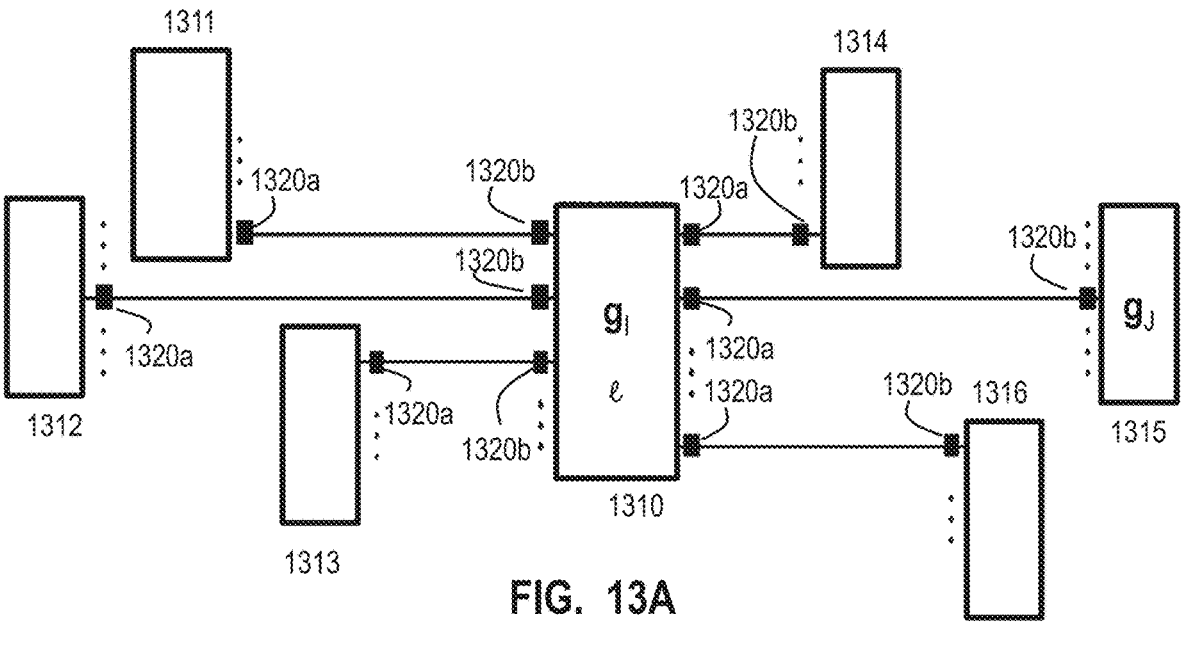
FIG. 13A and FIG. 13B are block diagrams that illustrate example construction of chips that incorporate an injection of randomness, according to an embodiment.
Figure 13B:
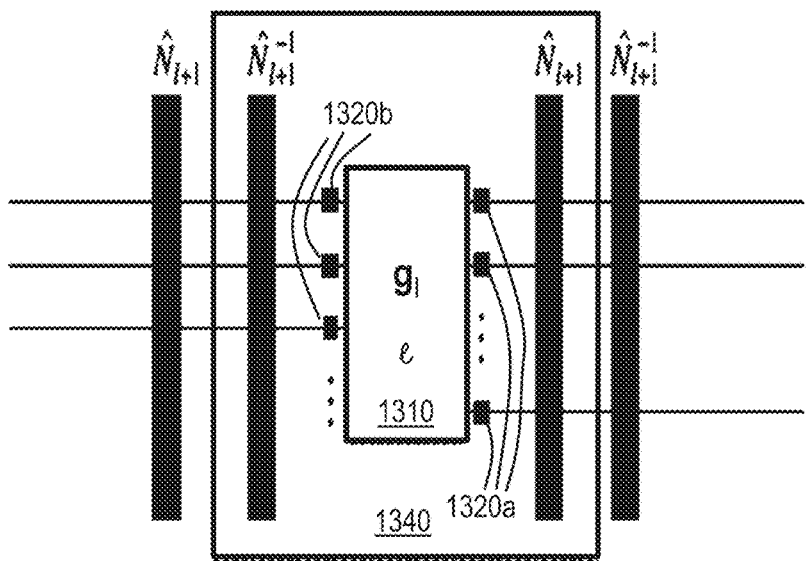

28 process is performed in step 525 in some embodiments of method 500. FIG. 13A and FIG. 13B are block diagrams that illustrate example construction of chips that incorporate an injection of randomness, according to an embodiment.

First, insert a Boolean identity, e.g., in the form of a pair of NOTs, on randomly selected internal wires connecting two chips at level $\ell$ , given by indices I and J as shown in FIG. 13A. The level of conjugation $\ell$ counts how many layers of N have thus far been used in the conjugation process and iterates from 0 to $N_L$–1, where $N_L$ indicates the number of layers, and each layer can include up to n/3 gates. Three bits for $g_I$ 1310 are connected to three antecedent pre-conjugation chips 1311, 1312. 1313 with ellipses indicating that there are other inputs of chip $g_I$ connected to other antecedent chips. Three bits output by $g_I$ are inputs of pre-conjugation chips 1314, 1315. 1316. On each bitline between chips a Boolean identity set of gates is inserted in two parts, each indicated by a small solid rectangle 1320a for a first partition and 1320b for a second portion to complete the identity, e.g., each portion 1320a and 1320b is a single NOT gate. Alternatively, instead of a single NOT gate in 1320a and 1320b, one could insert an identity gate in both locations, the equivalent of not inserting NOT gates at all in both locations. The choice of inserting a pair or NOT gates or nothing is at random (it is the source of randomness in the process).

Second, on the bitlines that received a Boolean identity, e.g., a pair of NOTs, absorb one portion (e.g., one NOT) into the output of the antecedent chip on the left and absorb the other portion (e.g., the second NOT) into the input of the dependent chip on the right using the same bitline.

Third, proceed with conjugation by layer $\ell$ +1 of N, in the exact same manner described in above, in synchrony for all gates that emerged from the linear stage L of the cipher E that, together with conjugate N, represent the full function $F^E$. Conjugating by $N_{\ell+1}$, the $\ell$ +1-th gate r of N, delivers the chip at layer $\ell$ +1, represented by the larger box 1340.

This process randomizes the functionality of individual chips while preserving the functionality of $F^E$. It is also stressed that, in general, the NOT gates that are injected into the chips do not commute with the nonlinear gates r in N and thus, the scrambling effect of the NOTs is nonlinearly amplified through the conjugation process.

Randomization induced via absorption of NOTs in the second step above is trivially reflected in the BDDs of all resulting chips. For every input of a chip that incorporates a NOT, one flips the decision branches of the corresponding nodes (with that input variable) of the BDDs, i.e., a solid edge (TRUE) is switched to a dashed edge (FALSE), and vice-versa. Similarly, for every output of the chip that incorporates a NOT, one swaps the TRUE and FALSE terminal nodes. Notice that the BDD retains its size, as no new nodes are created by the randomization process.

Inserting randomness confers significantly higher security to EOC than provided by Best Possible Obfuscation of individual chips, which by itself may be sufficient to make EOC of practical use already in the absence of disorder.

8. EXAMPLE RECURSIVE BUILD Of BDD AND OBFUSCATED CHIP

An example of the construction of an obfuscated chip seeded by a NOT gate via conjugation by layers of nonlinear gates in a particular embodiment of N is presented here. For this example, a tree-structured nonlinear stage N of the cipher E is used.

The tree-structured stage N is constructed such that each of the n bits is touched exactly once by one of n/3 3-bit gates of the layer, drawn at random from the subset of nonlinear 3-bit gates in $S_8$ that maximize the proliferation of Pauli strings at each operation as explained in Chamon et al., 2022. For simplicity, n is an integer power of 3, i.e., $n=3^u$, where u is an positive integer). The gate packing scheme is chosen such that the triplet of bits acted upon by 3-bit gates are arranged in a hierarchical (tree) structure. We proceed by forming groups of non-overlapping triplets of indices for each layer $\ell$, selected according to Equation 9.

$$\text{For } \ell = 1: \quad \text{triplets} = (0, 1, 2), (3, 4, 5), (6, 7, 8), \ldots \quad (9)$$

$$\text{For } \ell = 2: \quad \text{triplets} = (0, 3, 6), (1, 4, 7), (2, 5, 8), \ldots$$

$$\text{For } \ell = 3: \quad \text{triplets} = (0, 9, 18), (1, 10, 19), (2, 11, 20), \ldots$$

$$\text{For } \ell = 4: \quad \text{triplets} = (0, 27, 54), (1, 28, 55), (2, 29, 56), \ldots$$

$$\ldots$$

More precisely, each of the $n/3=3^{u-1}$ triplets in layer $\ell$ is indexed by (i, j, k), defined by Equation 10a through 10c.

$$i = z0 + 3*z1 + 3^2*z2 + \ldots + 3^{\ell-1}*0 + \ldots + 3^{u-1}*z_{u-1} \quad (10a)$$

$$j = z0 + 3*z1 + 3^2*z2 + \ldots + 3^{\ell-1}*1 + \ldots + 3^{u-1}*z_{u-1} \quad (10b)$$

$$k = z0 + 3*z1 + 3^2*z2 + \ldots + 3^{\ell-1}*2 + \ldots + 3^{u-1}*z_{u-1} \quad (10c)$$

Equation 10a through Equation 10c show that at layer $\ell$, the members of the triplets are numbers that only differ in the $(\ell-1)$-th triplet. A trit is a variable that take values 0, 1, or 2. The other $u-1$ trits za; $a \neq \ell-1$, account for the n/3 triplets.)

Once the triplets of indices, (i, j, k), are selected for each layer, they are mapped onto groups of three bits, $(\pi(i), \pi(j), \pi(k))$, via a (randomly chosen) permutation $\pi$ of the n bitlines. The fully-packed random circuit is defined as the collection of (nonlinear) gates $r_{ijk}$ acting on these triplets of bits Start with a NOT gate acting on bitline t. When this NOT gate is sandwiched between (straddled by) 3-bit gates r, $r^{-1}$, one obtains a 3-bit permutation $(\pi(i_0), \pi(i_1), \pi(i_2))$ that acts on a triplet of bits $(i_0, i_1, i_2)$, where $i_{z0}$ is obtained from $i=\pi^{-1}(t)$ according to the tree structure, described above, by replacing its least significant trit by z0=0, 1, 2 (notice that one of $i_0, i_1, i_2$ is equal to i). Each of the three output bits is a Boolean function represented by a BDD of footprint $x_{\pi(i0)}$, $x_{\pi(i1)}$, $x_{\pi(i2)}$ of width 3. Upon conjugating with the second layer, the width of the chip increases to 9, encompassing the bits $\pi(i_{z0z1})$, z0, z1=0, 1, 2, with the index $i_{z0z1}$ obtained by substituting the two least significant trits of i contributed by z0 and z1. Continuing along this path, after the $\ell$-th layer, the chip will have grown to width $3^\ell$, encompassing bits $\pi(i_{z0z1\ldots z\ell-1})$, where each of z0, z1 . . . z$\ell$−1=0, 1, 2, where $i_{z0z1\ldots z\ell-1}$ are obtained by manipulating the first $\ell$ trits of i. We note that the tree-like growth of the chip described above, and illustrated in FIG. 12, ensures that every bitline covered at layer $\ell$ of the conjugation scheme is always accompanied by two freshly touched bitlines at the next level, $\ell+1$.

Figure 14A:
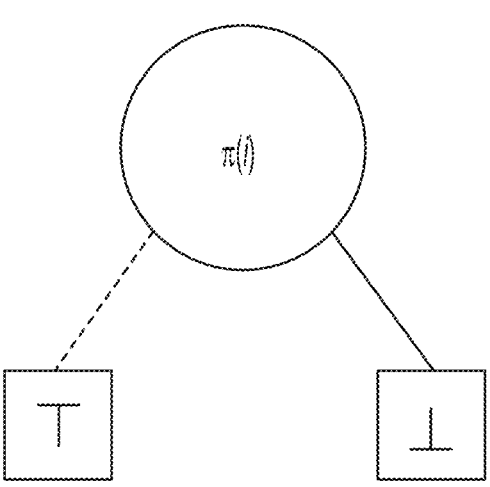
FIG. 14A and FIG. 14B are block diagrams that illustrate example expansion of a BDD for a chip at successive layers, according to an embodiment.
Figure 14B:
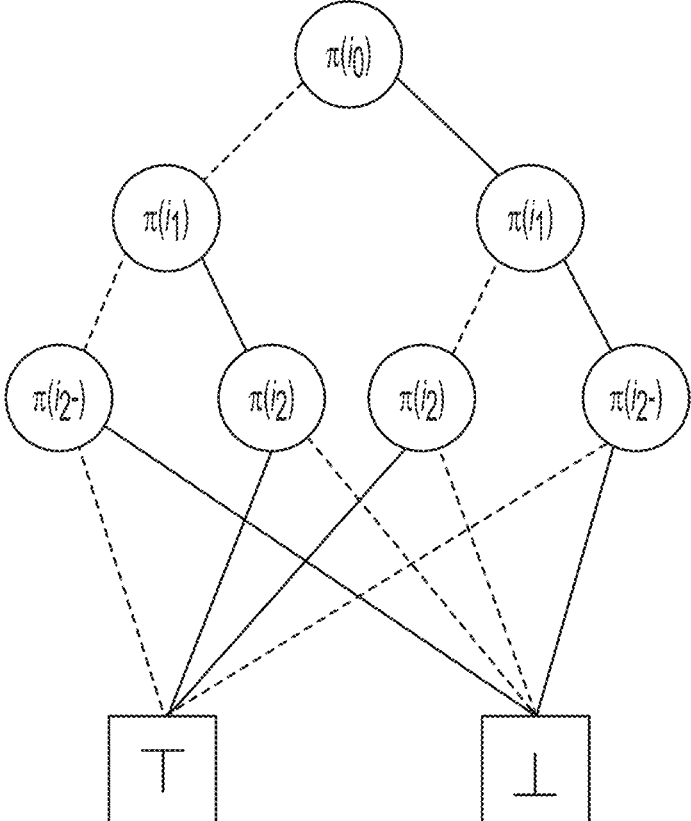

The BDDs associated with the $3^\ell$ outputs of the chip after $\ell$ layers of conjugation are obtained recursively. FIG. 14A and FIG. 14B are block diagrams that illustrate example expansion of a BDD for a chip at successive layers, according to an embodiment. As illustrated in FIG. 14A, the process starts with the BDD for the NOT gate, which has one non-terminal node with the variable value $x_{\pi(i)}$ at location $\pi(i)$ and the two terminal nodes, $\top$ and $\bot$, using Knuth's notation for TRUE and FALSE, respectively. The BDDs resulting from conjugation with the first layer, $\ell =0$, which touches the bitline $\pi(i)$ via a single gate, r, results in a chip with three outputs, $'h_{\pi(i0)}$, $'h_{\pi(i1)}$ and $'h_{\pi(i2)}$, each encoded in a BDD with three inputs, $x_{\pi(i0)}$, $x_{\pi(i1)}$ and $x_{\pi(i2)}$. These BDDs can be constructed following the prescription given above in the discussion of Eqs. 8a and 8b.

The first step is using Eq. 8a for the calculation of $\#h_{\pi(i)}$ through the substitution $x_{\pi(i)}=r^{-1}_{\pi(i)}(x_{\pi(i0)}, x_{\pi(i1)}, x_{\pi(i2)})$. This corresponds to the replacement of the single, nonterminal node $\pi(i)$ in FIG. 14A by the non-terminal nodes of a BDD involving three variables: the original $x_{\pi(i)}$ and the two fresh variables that appear in the triplet with bitline $\pi(i)$ (recall that one of i0, i1 or i2 equals i). In FIG. 14B, this substitution is illustrated with the worst-case scenario in which the function $r^{-1}_{\pi(i)}$ is represented by a BDD with 7 non-terminal nodes, the maximum size BDD on three variables. It is noted that the other two #h functions, expressing the outputs of the two fresh bitlines involved in the triplet with $\pi(i)$ (two of $\pi(i0)$, $\pi(i1)$, and $\pi(i2)$) simply equal the corresponding output bits from $r^{-1}(x_{\pi(i0)}, x\pi(i1), x_{\pi(i2)})$, as they are not affected by the original NOT gate.

The next substep in step 531 of method 500 is to implement Equation 8b for the calculation of $'h_{\pi(i0)}(x)=r_{\pi(iz0)}$ $(\#h_{\pi(i0)}, \#h_{\pi(i1)}, \#h_{\pi(i2)})$, z0=0, 1, 2, as prescribed by Eq. 8b. Notice that the #h functions associated with the two fresh bitlines (other than $\pi(i)$) are already expressible using $x_{\pi(i0)}$, $x_{\pi(i1)}$, $x_{\pi(i2)}$, and hence in transforming from the BBD for $\#h\pi(i)$ to the BDDs for $'h_{\pi(iz0)}$, z0=0, 1, 2 requires no additional non-terminal nodes beyond the maximum 7 for a 3-variable BDD.

While this statement that the BDDs for #h and $'h$ have comparable sizes is trivial for conjugation with the first layer, it has important implications for conjugation with subsequent layers. To retain this property, the input variables to the BDDs are ordered. In particular, to prepare the 3-bit chip for conjugation with the second layer, the input variable $x_{\pi(iz0)}$ is set to appear last in the BDD for the output $'h_{\pi(iz0)}$, z0=0, 1, 2. More genericly, at any level of conjugation, the BDD expressing the output of the chip on a given bitline has the input variable on that same bitline appearing last, in preparation for the subsequent layer of conjugation.

Step 533 proceeds with conjugation by the three gates in the second layer, $\ell =1$, designated r', r" and r'", which overlap separately with bits $\pi(i0)$, $\pi(i1)$ and $\pi(i2)$, respectively. As already described above, the tree structure of the cipher implies that each of these three gates adds two fresh variables accompanying each of the bitlines activated by the first layer. Following the first substitution described in Eq. 8a, each of $\#h_{\pi(iz0)}$, z0=0, 1, 2, is implemented via the three substitutions of Equation 11a through Equation 11c.

$$x_{\pi(i0)} = r'^{-1}_{\pi(i0)}(x_{\pi(i00)}, x_{\pi(i01)}, x_{\pi(i02)}) \quad (11a)$$

$$x_{\pi(i1)} = r''^{-1}_{\pi(i1)}(x_{\pi(i10)}, x_{\pi(i11)}, x_{\pi(i12)}) \quad (11b)$$

$$x_{\pi(i2)} = r'''^{-1}_{\pi(i2)}(x_{\pi(i20)}, x_{\pi(i21)}, x_{\pi(i22)}) \quad (11c)$$

Again, notice that one of the indices $i_{z0\ 0}$; $i_{z0\ 1}$ or $i_{z0\ 2}$ is the same as the original $i_{z0}$. The substitution amounts to replacing the non-terminal nodes $\pi(i0)$, $\pi(i1)$, and $\pi(i2)$ by small BDDs for the functions $r'^{-1}_{\pi(i0)}$, $r''^{-1}_{\pi(i1)}$, and $r'''^{-1}_{\pi(i2)}$, respectively. Each replacement of $\pi(i_{z0})$ by BDDs with nodes $\pi(i_{z0\,0})$, $\pi(i_{z0\,1})$ and $\pi(i_{z0\,2})$, z0=0, 1, 2, leads to an increase in the total number of nodes of the BDDs for the #$h\pi(i_{z0})$, z0=0, 1, 2. In the worst-case scenario, these substitutions inflate the number of nodes by a factor of 7 (the maximum number of non-terminal nodes in a BDD on three variables). Note that, as a consequence of the tree structure, this inflation happens independently for each of the three nodes $\pi(i_{z0})$, z0=0, 1, 2, and thus, the overall increase of the BDDs for #$h_{\pi(iz0)}$, z0=0, 1, 2, is additive instead of multiplicative.

The three 9-variable #$h_{\pi(iz0)}$, z0=0, 1, 2, were constructed from the $'h_{\pi(iz0)}$ of the previous level of conjugation, where the variable $x_{\pi(iz0)}$ appears last in the corresponding BDD. Thus, through the substitutions in Eq. 11a through Eq. 11c, $x_{\pi(iz0\,0)}$, $x_{\pi(iz0\,1)}$, and $x_{\pi(iz0\,2)}$ are the last 3 variables appearing in the BDDs for #$h_{\pi(iz0)}$, z0=0, 1, 2. Moreover, these three #$h_{\pi(iz0)}$ are each accompanied by two #h functions that only depend on the same 3 variables, and represent the outputs associated with the two fresh bitlines involved in the triplet with $\pi(i_{z0})$.

The step 531 of method 500 completes the conjugation with the second layer, as prescribed by Eq. 8b resulting in Equations 12a through Equation 12c.

$$^{r'}h_{\pi(i0z1)}(x) = r'_{\pi(i0z1)}(\#h_{\pi(i00)}, \#h_{\pi(i01)}, \#h_{\pi(i02)}) \quad (12a)$$

$$^{r''}h_{\pi(i0z1)}(x) = r''_{\pi(i1z1)}(\#h_{\pi(i10)}, \#h_{\pi(i11)}, \#h_{\pi(i12)}) \quad (12b)$$

$$^{r'''}h_{\pi(i0z1)}(x) = r'''_{\pi(i2z1)}(\#h_{\pi(i20)}, \#h_{\pi(i21)}, \#h_{\pi(i22)}) \quad (12c)$$

where z1=0, 1, 2, thus producing 9 equations and 9 conjugated gates. Each of the arguments for each of the three equations above contain one of the 9-variable #$h_{\pi(iz0)}$ along with its two companion 3-variable #h. Because the 3 variables in the two 3-variable #h always appear last in the BDD for the 9-variable #h, no new nodes are required to build the BDDs for $^{r'}h$; $^{r''}h$ and $^{r'''}h$, in the worst-case scenario in which the substitutions involve 7 non-terminal nodes, again, the maximum for a 3-variable BDD.

Finally, for this example, in preparation for conjugation with the next layer, $\ell = 2$, the last 3 variables are ordered for each of the $^{r'}h$; $^{r''}h$ and $^{r'''}h$, so that $x_{\pi(i0z1)}$, $x_{\pi(i1z1)}$, and $x_{\pi(i2z1)}$ appear, respectively, as the last variable of the BDDs describing $^{r'}h_{\pi(i0z1)}$, $^{r''}h\pi(i1z1)$, and $^{r'''}h_{\pi(i2z1)}$, z1=0, 1, 2. In other words, $x_{\pi(iz0z1)}$, z0, z1=0, 1, 2, are placed as the last variables of the BDDs for their corresponding output bitlines, $\pi(i_{z0z1})$, of the 9-bit mid-conjugation chip.

Figure 15:
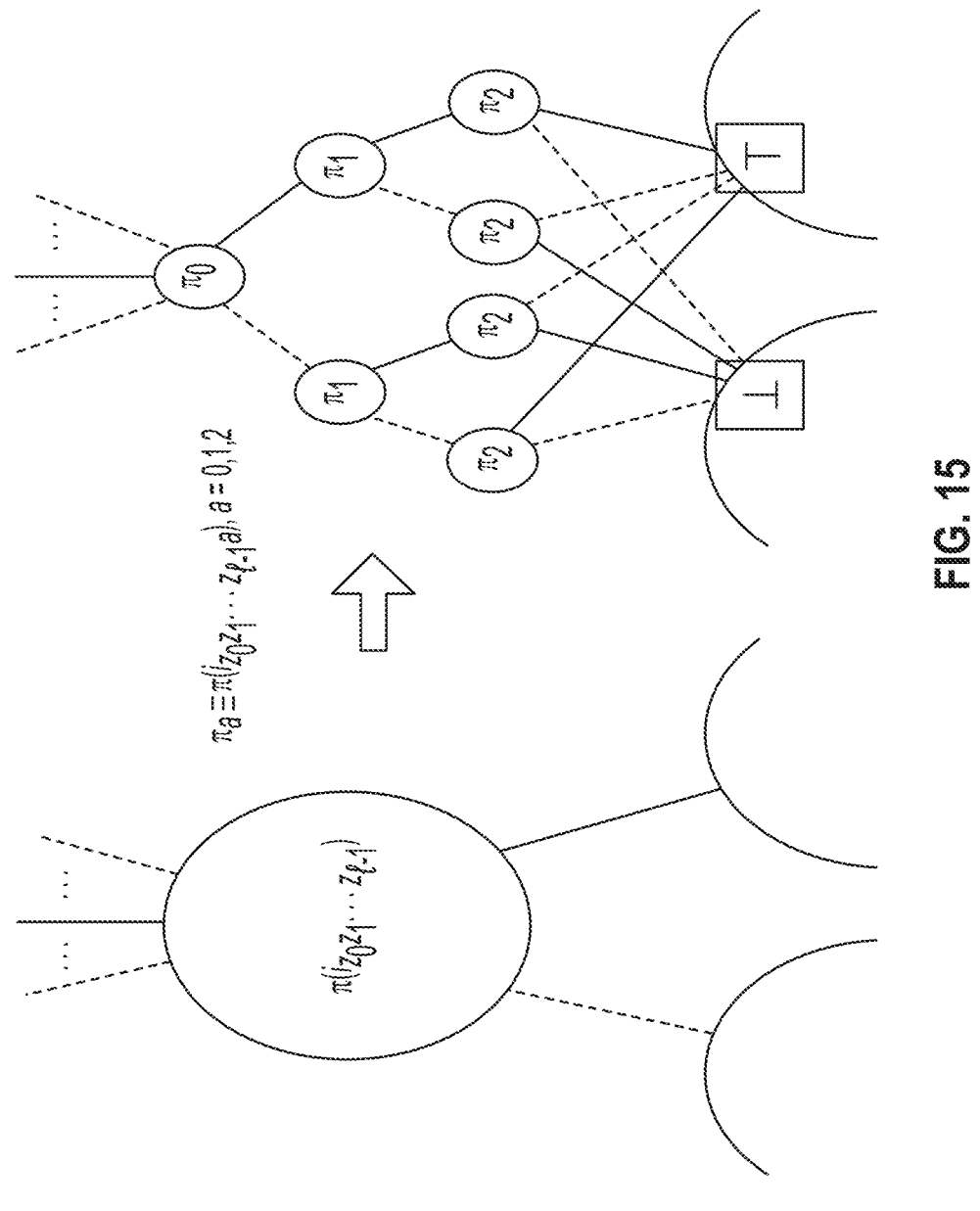
FIG. 15 is a block diagram that illustrates an example generalization of the substitution of a node by a BDD in the course of conjugation by a layer of the nonlinear stage, according to an embodiment.

These steps can be repeated for conjugation with the subsequent layers. FIG. 15 is a block diagram that illustrates an example generalization of the substitution of a node by a BDD in the course of conjugation by a layer of the nonlinear stage, according to an embodiment. As illustrated in FIG. 15, nodes $\pi(i_{z0z1\ldots z(\ell-1)})$ are substituted by a BDD with nodes labeled as $\pi(i_{z0z1\ldots z(\ell-1)z\ell})$, $z_\ell=0$, 1, 2 that represent a function $r^{-1}_{\pi(iz0z1\ldots z(\ell-1))}$ of three variables $x_{\pi(iz0z1\ldots z(\ell-1)z\ell)}$ $z_\ell=0$, 1, 2. The figure displays the worst-case scenario, in which 7 non-terminal nodes replace the original node. Note that the LO and HI branches of the substituted node $\pi(i_{z0z1\ldots z(\ell-1)})$ are replaced, respectively, by the branching lines terminating at the $\perp$ and $\top$ nodes of the substituted BDD depicted on the right side of FIG. 15. As with previous layers, the general iteration proceeds with the second part of conjugation, Eq. 8b, followed by the reordering that places the input variable on each bitline as the last one in that line's output BDD.

9. COMPUTATIONAL HARDWARE OVERVIEW

Figure 16:
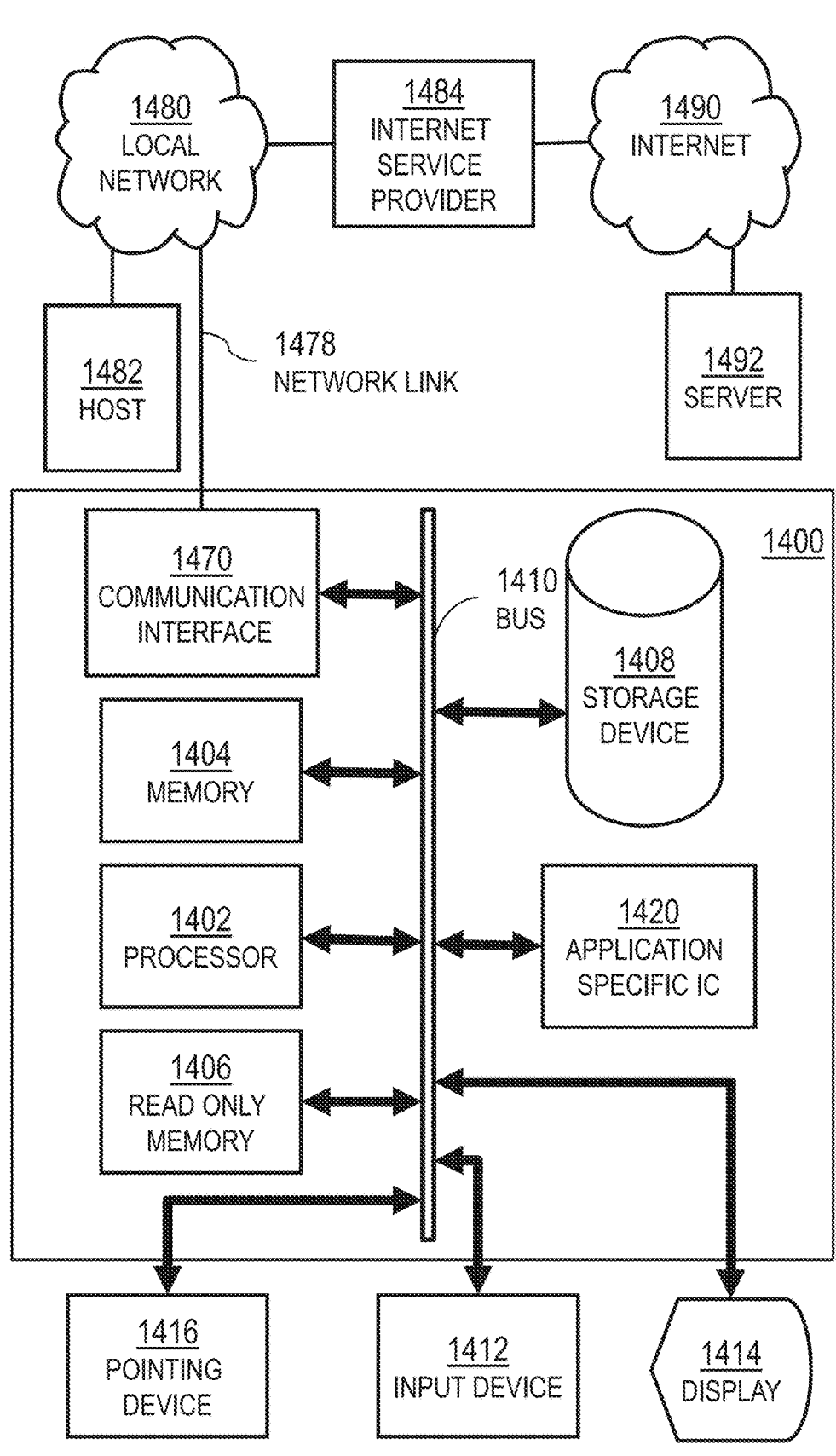
FIG. 16 is a block diagram that illustrates an example computer system upon which an embodiment of the invention may be implemented.

FIG. 16 is a block diagram that illustrates a computer system 1600 upon which an embodiment of the invention may be implemented. Computer system 1600 includes a communication mechanism such as a bus 1610 for passing information between other internal and external components of the computer system 1600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1600, or a portion thereof, constitutes a means for performing one or more steps of one or more methods described herein.

A sequence of binary digits constitutes digital data that is used to represent a number or code for a character. A bus 1610 includes many parallel conductors of information so that information is transferred quickly among devices coupled to the bus 1610. One or more processors 1602 for processing information are coupled with the bus 1610. A processor 1602 performs a set of operations on information. The set of operations include bringing information in from the bus 1610 and placing information on the bus 1610. The set of operations also typically include comparing two or more units of information, shifting positions of units of information, and combining two or more units of information, such as by addition or multiplication. A sequence of operations to be executed by the processor 1602 constitutes computer instructions.

Computer system 1600 also includes a memory 1604 coupled to bus 1610. The memory 1604, such as a random access memory (RAM) or other dynamic storage device, stores information including computer instructions. Dynamic memory allows information stored therein to be changed by the computer system 1600. RAM allows a unit of information stored at a location called a memory address to be stored and retrieved independently of information at neighboring addresses. The memory 1604 is also used by the processor 1602 to store temporary values during execution of computer instructions. The computer system 1600 also includes a read only memory (ROM) 1606 or other static storage device coupled to the bus 1610 for storing static information, including instructions, that is not changed by the computer system 1600. Also coupled to bus 1610 is a non-volatile (persistent) storage device 1608, such as a magnetic disk or optical disk, for storing information, including instructions, that persists even when the computer system 1600 is turned off or otherwise loses power.

Information, including instructions, is provided to the bus 1610 for use by the processor from an external input device 1612, such as a keyboard containing alphanumeric keys operated by a human user, or a sensor. A sensor detects conditions in its vicinity and transforms those detections into signals compatible with the signals used to represent information in computer system 1600. Other external devices coupled to bus 1610, used primarily for interacting with humans, include a display device 1614, such as a cathode ray tube (CRT) or a liquid crystal display (LCD), for presenting images, and a pointing device 1616, such as a mouse or a trackball or cursor direction keys, for controlling a position of a small cursor image presented on the display 1614 and issuing commands associated with graphical elements presented on the display 1614.

In the illustrated embodiment, special purpose hardware, such as an application specific integrated circuit (IC) 1620, is coupled to bus 1610. The special purpose hardware is configured to perform operations not performed by processor 1602 quickly enough for special purposes. Examples of application specific ICs include graphics accelerator cards for generating images for display 1614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1600 also includes one or more instances of a communications interface 1670 coupled to bus 1610. Communication interface 1670 provides a two-way communication coupling to a variety of external devices that operate with their own processors, such as printers, scanners and external disks. In general the coupling is with a network link 1678 that is connected to a local network 1680 to which a variety of external devices with their own processors are connected. For example, communication interface 1670 may be a parallel port or a serial port or a universal serial bus (USB) port on a personal computer. In some embodiments, communications interface 1670 is an integrated services digital network (ISDN) card or a digital subscriber line (DSL) card or a telephone modem that provides an information communication connection to a corresponding type of telephone line. In some embodiments, a communication interface 1670 is a cable modem that converts signals on bus 1610 into signals for a communication connection over a coaxial cable or into optical signals for a communication connection over a fiber optic cable. As another example, communications interface 1670 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1670 sends and receives electrical, acoustic or electromagnetic signals, including infrared and optical signals, that carry information streams, such as digital data.

The term computer-readable medium is used herein to refer to any medium that participates in providing information to processor 1602, including instructions for execution. Such a medium may take many forms, including, but not limited to, non-volatile media, volatile media and transmission media. Non-volatile media include, for example, optical or magnetic disks, such as storage device 1608. Volatile media include, for example, dynamic memory 1604. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1602, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, floating array flash memory, SDRAM, or any other memory chip or cartridge, a carrier wave, or any other medium from which a computer can read. The term non-transitory computer-readable storage medium is used herein to refer to any medium that participates in providing information to processor 1602, except for carrier waves and other signals.

Logic encoded in one or more tangible media includes one or both of processor instructions on a computer-readable storage media and special purpose hardware, such as ASIC 1620.

Network link 1678 typically provides information communication through one or more networks to other devices that use or process the information. For example, network link 1678 may provide a connection through local network 1680 to a host computer 1682 or to equipment 1684 operated by an Internet Service Provider (ISP). ISP equipment 1684 in turn provides data communication services through the public, world-wide packet-switching communication network of networks now commonly referred to as the Internet 1690. A computer called a server 1692 connected to the Internet provides a service in response to information received over the Internet. For example, server 1692 provides information representing video data for presentation at display 1614. In some circumstances the resources represented by some combination of host 1682, local network 1680, internet service provider 1684, internet 1690 and server 1692 are termed "the cloud."

The invention is related to the use of computer system 1600 for implementing the techniques described herein. According to one embodiment of the invention, those techniques are performed by computer system 1600 in response to processor 1602 executing one or more sequences of one or more instructions contained in memory 1604. Such instructions, also called software and program code, may be read into memory 1604 from another computer-readable medium such as storage device 1608. Execution of the sequences of instructions contained in memory 1604 causes processor 1602 to perform the method steps described herein. In alternative embodiments, hardware, such as application specific integrated circuit 1620, may be used in place of or in combination with software to implement the invention. Thus, embodiments of the invention are not limited to any specific combination of hardware and software.

The signals transmitted over network link 1678 and other networks through communications interface 1670, carry information to and from computer system 1600. Computer system 1600 can send and receive information, including program code, through the networks 1680, 1690 among others, through network link 1678 and communications interface 1670. In an example using the Internet 1690, a server 1692 transmits program code for a particular application, requested by a message sent from computer 1600, through Internet 1690, ISP equipment 1684, local network 1680 and communications interface 1670. The received code may be executed by processor 1602 as it is received, or may be stored in storage device 1608 or other non-volatile storage for later execution, or both. In this manner, computer system 1600 may obtain application program code in the form of a signal on a carrier wave.

Various forms of computer readable media may be involved in carrying one or more sequence of instructions or data or both to processor 1602 for execution. For example, instructions and data may initially be carried on a magnetic disk of a remote computer such as host 1682. The remote computer loads the instructions and data into its dynamic memory and sends the instructions and data over a telephone line using a modem. A modem local to the computer system 1600 receives the instructions and data on a telephone line and uses an infra-red transmitter to convert the instructions and data to a signal on an infra-red a carrier wave serving as the network link 1678. An infrared detector serving as communications interface 1670 receives the instructions and data carried in the infrared signal and places information representing the instructions and data onto bus 1610. Bus 1610 carries the information to memory 1604 from which processor 1602 retrieves and executes the instructions using some of the data sent with the instructions. The instructions and data received in memory 1604 may optionally be stored on storage device 1608, either before or after execution by the processor 1602.

Figure 17:
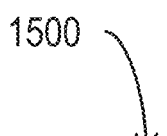
FIG. 17 is a block diagram that illustrates an example chip set upon which an embodiment of the invention may be implemented.
Figure 17:
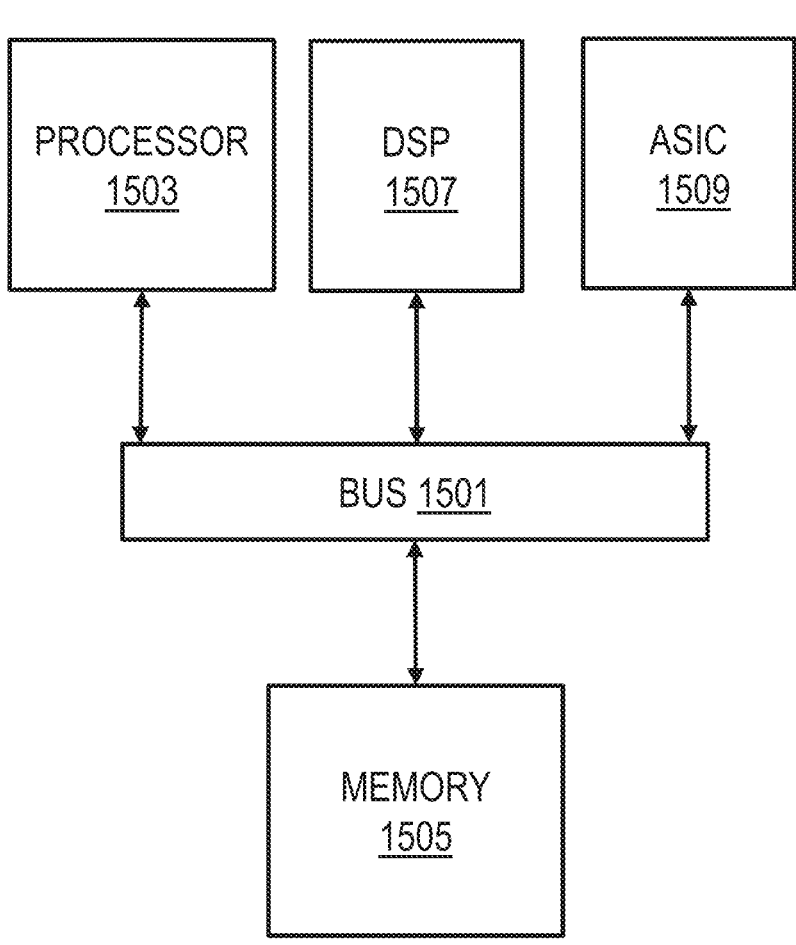

FIG. 17 illustrates a chip set 1700 upon which an embodiment of the invention may be implemented. Chip set 1700 is programmed to perform one or more steps of a method described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1700, or a portion thereof, constitutes a means for performing one or more steps of a method described herein.

In one embodiment, the chip set 1700 includes a communication mechanism such as a bus 1701 for passing information among the components of the chip set 1700. A processor 1703 has connectivity to the bus 1701 to execute instructions and process information stored in, for example, a memory 1705. The processor 1703 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1703 may include one or more microprocessors configured in tandem via the bus 1701 to enable independent execution of instructions, pipelining, and multithreading. The processor 1703 may also be accompanied with one or more specialized components to perform certain processing functions and tasks such as one or more digital signal processors (DSP) 1707, or one or more application-specific integrated circuits (ASIC) 1709. A DSP 1707 typically is configured to process real-world signals (e.g., sound) in real time independently of the processor 1703. Similarly, an ASIC 1709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1703 and accompanying components have connectivity to the memory 1705 via the bus 1701. The memory 1705 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1705 also stores the data associated with or generated by the execution of one or more steps of the methods described herein.

10. ALTERATIONS, DEVIATIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

11. REFERENCES

The following references are hereby incorporated by reference as if fully recited herein except for terminology inconsistent with that used herein.

K. Iwama, Y. Kambayashi, and S. Yamashita, Transformation Rules for Designing CNOT-based Quantum Circuits, DAC2002, pp 419-424 (New Orleans, Louisiana, USA, 2002).

C. Chamon and E. Mucciolo, Techniques for Securely Executing Code that Operates on Encrypted Data on a Public Computer, PCT/US18/66019, World Intellectual Property Organization Publication number WO/2019/126044.

C. Chamon and J. Jakes-Schauer. "3-bit gates for Securely Executing on a Public Computer Code that Operates on Encrypted Data", PCT/US21/070938, World Intellectual Property Organization Publication number WO/2022/020857.

R. L. Rivest, L. Adleman, and M. L. Dertouzos, \On data banks and privacy homomorphisms," Foundations of Secure Computing, vol. 4, pp. 169{180, 1978.

O. Regev, \On lattices, learning with errors, random linear codes, and cryptography," J. ACM, vol. 56, September 2009.

C. Gentry, \Fully homomorphic encryption using ideal lattices," in Proceedings of the Forty-First Annual ACM Symposium on Theory of Computing, STOC '09, (New York, NY, USA), p. 169{178, Association for Computing Machinery, 2009.

Microsoft SEAL (release 3.6)." on WWW at domain github in superdomain com in folder *Microsoft* in file *SEAL*, November 2020. Microsoft Research, Redmond, WA.

IBM HElib (v2.2.1)." https://github.com/homenc/HElib, October 2021. IBM Research, Europe.

I. Chillotti, N. Gamma, M. Georgieva, and M. Izabachene, \TFHE: Fast fully homomorphic encryption-over the torus," J. Cryptol., vol. 33, pp. 34{91, 2020.

HEAAN v.2.1." https://github.com/snucrypto/HEAAN, September 2018.

J. H. Cheon, A. Kim, M. Kim, and Y. Song, \Homomorphic encryption for arithmetic of approximate numbers," in Advances in Cryptology {ASIACRYPT 2017 (T. Takagi and T. Peyrin, eds.), (Cham), pp. 409{437, Springer International Publishing, 2017.

M. A. Nielsen and I. Chuang, Quantum computation and quantum information. Cambridge University Press, Cambridge, UK, 2010.

C. Chamon, E. R. Mucciolo, and A. E. Ruckenstein, "Quantum statistical mechanics of encryption: Reaching the speed limit of classical block ciphers," Annals of Physics, vol. 446, p. 169086, 2022.

C. Chamon and E. Mucciolo, \Techniques for securely executing code that operates on encrypted data on a public computer," U.S. Patent 2020/0394287 A1 (Dec. 17, 2020).

R. Bryant, \Binary decision diagrams and beyond: Enabling technologies for formal varication, "pp. 236{243, 1995.

D. E. Knuth, The Art of Computer Programming, vol. 4. Addison-Wesley, 2019.

S. Goldwasser and G. N. Rothblum, \On best-possible obfuscation," in Theory of Cryptography (S. P. Vadhan, ed.), (Berlin, Heidelberg), pp. 194{213, Springer Berlin Heidelberg, 2007.

R. Bryant, \Graph-based algorithms for Boolean function manipulation," IEEE Transactions on Computers, vol. 35, pp. 677{691, August 1986.

What is claimed is:

1. A method operating on a first processor comprising:
a. configuring a permutation encryption module for n-bit words comprising only a first stage that can be decomposed into only linear 3-bit gates and a second stage that can be decomposed into k-bit gates including at least one non-linear k-bit gate, wherein k is not less than 3;
b. receiving first data that indicates a first function to be implemented as a first obfuscated module operating on and producing only encrypted data formed according to the permutation encryption module;
c. configuring the first obfuscated module by
determining a first plurality of 3-bit gates that implement the first function,
straddling each gate in the first plurality with the first stage in reverse order and the first stage to form a linear expanded set of gates,
replacing the linear expanded set of gates using a finite set of substitution rules to form an ordered set of daughter gates,
concatenating the ordered set of daughter gates produced for each gate in the first plurality,
straddling each gate in the concatenated ordered set of daughter gates with the second stage in reverse order and the second stage to form a non-linear expanded set of gates for each daughter gate,
for each output bit of the non-linear expanded set of gates for each daughter gate, forming a binary decision diagram (BDD) that indicates a value based on 3 or more input bits of the non-linear expanded set of gates for each daughter gate, generating a module chip by combining all BDDs, and configuring the first obfuscated module by including the module chip; and
d. sending to an unsecured device the first obfuscated module for execution by the unsecured device.

2. The method as recited in claim 1, said configuring the first obfuscated module further comprising for the linear expanded set for each daughter gate, collect successively each layer of contiguous gates that can be operated in parallel in the second stage, wherein:
said forming a binary decision tree (BDD) further comprises forming a BDD for each bit in each layer; and
said generating a module chip by combining all BDDs further comprises generating a module chip by combining all BDDs for all layers of the non-linear expanded set for each daughter gate; and
said configuring the first obfuscated module further comprises including the module chip for each daughter gate.

3. The method as recited in claim 1, wherein the first stage comprises only one or more of 144 inflationary linear 3-bit gates.

4. The method as recited in claim 3, wherein each inflationary linear 3-bit gate in the first stage is decomposed into a set of three or four 2-bit CNOT gates.

5. The method as recited in claim 2, wherein the number of layers in the second stage is on the order of $\log_3 n$.

6. The method as recited in claim 1, wherein, the first stage comprises separate layers each layer comprising only a set of contiguous gates that do not repeat any input bit of an n-bit word input to the layer.

7. The method as recited in claim 6, wherein the number of layers in the first stage is on the order of $\log_2 n$.

8. The method as recited in claim 2, said configuring the first obfuscated module further comprises inserting logical identities as a complimentary pair of sets of one or more logic gates, each set, respectively, into corresponding randomly chosen bits of successive levels of iteration through the layers of the second stage.

9. The method as recited in claim 8, said inserting logical identities includes adding a NOT gate to one output bit of the non-linear expanded bits of one daughter gate and adding a second NOT gate at a corresponding input bit of the non-linear expanded bits of a successive daughter gate.

10. The method as recited in claim 1, further comprising repeating steps b, c and d for a second different function to be implemented as a second obfuscated module operating on and producing only encrypted data formed according to the permutation encryption module.

11. A non-transitory computer-readable medium carrying one or more sequences of instructions, wherein execution of the one or more sequences of instructions by a first set of one or more processors causes the first set of one or more processors to:
a. configure a permutation encryption module for n-bit words comprising only a first stage that can be decomposed into only linear 3-bit gates and a second stage that can be decomposed into k-bit gates including at least one non-linear 3-bit gate, wherein k is not less than 3;
b. receive first data that indicates a first function to be implemented as a first obfuscated module operating on and producing only encrypted data formed according to the permutation encryption module;
c. configure the first obfuscated module by
determining a first plurality of 3-bit gates that implement the first function, straddling each gate in the first plurality with the first stage in reverse order and the first stage to form a linear expanded set of gates, replacing the linear expanded set of gates using a finite set of substitution rules to form an ordered set of daughter gates, concatenating the ordered set of daughter gates produced for each gate in the first plurality, straddling each gate in the concatenated ordered set of daughter gates with the second stage in reverse order and the second stage to form a non-linear expanded set of gates for each daughter gate, for each output bit of the non-linear expanded set of gates for each daughter gate, forming a binary decision diagram (BDD) that indicates a value based on 3 or more input bits of the non-linear expanded set of gates for each daughter gate, generating a module chip by combining all BDDs, and configuring the first obfuscated module by including the module chip; and d. send to an unsecured device the first obfuscated module for execution by the unsecured device.

12. The computer-readable medium as recited in claim 11, to configure the first obfuscated module further comprising for the linear expanded set for each daughter gate, collect successively each layer of contiguous gates that can be operated in parallel in the second stage, wherein:

said forming a binary decision tree (BDD) further comprises forming a BDD for each bit in each layer; and said generating a module chip by combining all BDDs further comprises generating a module chip by combining all BDDs for all layers of the non-linear expanded set for each daughter gate; and said configuring the first obfuscated module further comprises including the module chip for each daughter gate.

13. The computer-readable medium as recited in claim 11, wherein the first stage comprises only one or more of 144 inflationary linear 3-bit gates.

14. The computer-readable medium as recited in claim 13, wherein each inflationary linear 3-bit gate in the first stage is decomposed into a set of three or four 2-bit CNOT gates.

15. The computer-readable medium as recited in claim 12, wherein the number of layers in the second stage is on the order of $\log_3$ n.

16. The computer-readable medium as recited in claim 11, wherein, the first stage comprises separate layers each layer comprising only a set of contiguous gates that do not repeat any input bit of an n-bit word input to the layer.

17. The computer-readable medium as recited in claim 16, wherein the number of layers in the first stage is on the order of $\log_2$ n.

18. The computer-readable medium as recited in claim 12, to configure the first obfuscated module further comprises to insert logical identities as a complimentary pair of sets of one or more logic gates, each set, respectively, into corresponding randomly chosen bits of successive levels of iteration through the layers of the second stage.

19. The computer-readable medium as recited in claim 18, said to insert logical identities includes adding a NOT gate to one output bit of the non-linear expanded bits of one daughter gate and adding a second NOT gate to a successive layer of the second stage at a corresponding input bit of the non-linear expanded bits of a successive daughter gate.

20. The computer-readable medium as recited in claim 11, the execution of the one or more sequences of instructions further causes the apparatus to repeating steps b, c and d for a second different function to be implemented as a second obfuscated module operating on and producing only encrypted data formed according to the permutation encryption module.

21. A system comprising:

a first set of at least one processor; and at least one memory including one or more sequences of instructions, the at least one memory and the one or more sequences of instructions configured to, with the at least one processor, cause an apparatus to a. configure a permutation encryption module for n-bit words comprising only a first stage that can be decomposed into only linear 3-bit gates and a second stage that can be decomposed into k-bit gates including at least one non-linear k-bit gate wherein k is not less than 3;

b. receive first data that indicates a first function to be implemented as a first obfuscated module operating on and producing only encrypted data formed according to the permutation encryption module;

c. configure the first obfuscated module by determining a first plurality of 3-bit gates that implement the first function, straddling each gate in the first plurality with the first stage in reverse order and the first stage to form a linear expanded set of gates, replacing the linear expanded set of gates using a finite set of substitution rules to form an ordered set of daughter gates, concatenating the ordered set of daughter gates produced for each gate in the first plurality, straddling each gate in the concatenated ordered set of daughter gates with the second stage in reverse order and the second stage to form a non-linear expanded set of gates for each daughter gate, for each output bit of non-linear expanded set of gates for each daughter gate, forming a binary decision diagram (BDD) that indicates a value based on 3 or more input bits of the non-linear expanded set of gates for each daughter gate, generating a module chip by combining all BDDs, and configuring the first obfuscated module by including the module chip; and d. send to an unsecured device the first obfuscated module for execution by the unsecured device.

22. The system as recited in claim 21, to configure the first obfuscated module further comprising for the linear expanded set for each daughter gate, collect successively each layer of contiguous gates that can be operated in parallel in the second stage, wherein:

said forming a binary decision tree (BDD) further comprises forming a BDD for each bit in each layer; and said generating a module chip by combining all BDDs further comprises generating a module chip by combining all BDDs for all layers of the non-linear expanded set for each daughter gate; and said configuring the first obfuscated module further comprises including the module chip for each daughter gate.

23. The system as recited in claim 21, wherein the first stage comprises only one or more of 144 inflationary linear 3-bit gates.

24. The system as recited in claim 23, wherein each inflationary linear 3-bit gate in the first stage is decomposed into a set of three or four 2-bit CNOT gates.

25. The system as recited in claim 22, wherein the number of layers in the second stage is on the order of $\log_3 n$.

26. The system as recited in claim 21, wherein, the first stage comprises separate layers each layer comprising only a set of contiguous gates that do not repeat any input bit of an n-bit word input to the layer.

27. The system as recited in claim 26, wherein the number of layers in the first stage is on the order of $\log_2 n$.

28. The system as recited in claim 22, to configure the first obfuscated module further comprises to insert logical identities as a complimentary pair of sets of one or more logic gates, each set, respectively, into corresponding randomly chosen bits of successive levels of iteration through the layers of the second stage.

29. The system as recited in claim 28, said to insert logical identities includes adding a NOT gate to one output bit of the non-linear expanded bits of one daughter gate and adding a second NOT gate at a corresponding input bit of the non-linear expanded bits of a successive daughter gate.

30. The system as recited in claim 21, the execution of the one or more sequences of instructions further causes the apparatus to repeating steps b, c and d for a second different function to be implemented as a second obfuscated module operating on and producing only encrypted data formed according to the permutation encryption module.

* * * * *